INVENTORS: H. H. ABBOTT
C. J. FETTE
H. A. MEISE, JR.

BY Donald M. Duft

ATTORNEY

FIG. 4
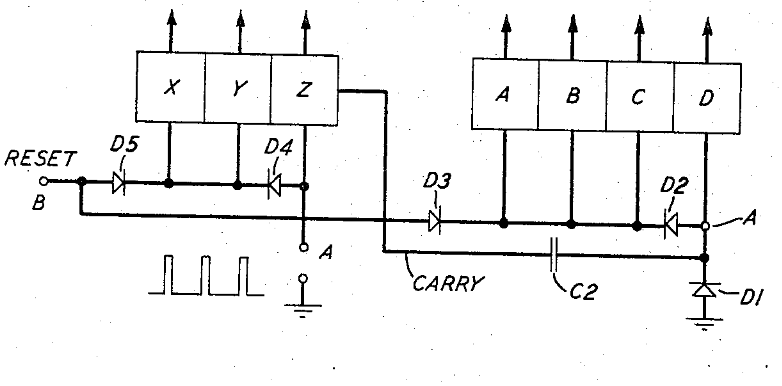
FIG. 5
| | A | B | C | D |
|---|---|---|---|---|
| X | 1 | 4 | 7 | 0 |
| Y | 2 | 5 | 8 | |
| Z | 3 | 6 | 9 | R |
FIG. 6
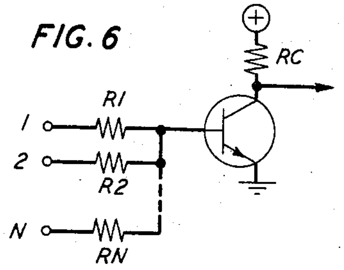
FIG. 7
INVERTING OR GATE
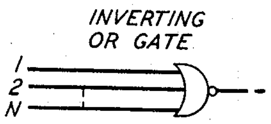
FIG. 8 INVERTING AND GATE
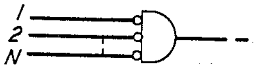
FIG. 9 NON-INVERTING OR
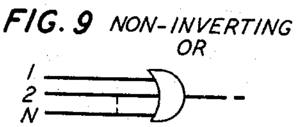
FIG. 10
NON-INVERTING AND GATE
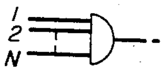
FIG. 10A
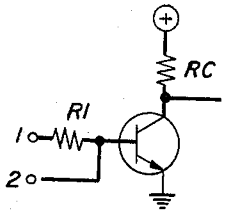
FIG. 10B
INVERTING AND GATE
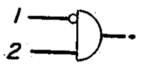

April 9, 1968 H. H. ABBOTT ET AL 3,377,432

TELEPHONE SWITCHING SYSTEM

Filed July 31, 1964

30 Sheets-Sheet 5

April 9, 1968 H. H. ABBOTT ET AL 3,377,432

TELEPHONE SWITCHING SYSTEM

Filed July 31, 1964 30 Sheets-Sheet 13

TELEPHONE SWITCHING SYSTEM

United States Patent Office 3,377,432
Patented Apr. 9, 1968

3,377,432
TELEPHONE SWITCHING SYSTEM
Henry H. Abbott and Charles J. Fette, Middletown, and Henry A. Meise, Jr., Red Bank, N.J., assignors to Bell Telephone Laboratories, Incorporated, New York, N.Y., a corporation of New York
Filed July 31, 1964, Ser. No. 386,589
35 Claims. (Cl. 179—18)

ABSTRACT OF THE DISCLOSURE

An electronic common controlled type PBX is disclosed which is entirely self-contained and which, when installed on a customer's premises, requires no modification of the central office servicing the PBX. An end marked switching network is used together with registers, trunk circuits, line circuits, and a common control circuit which coordinates the operation of the system in establishing call connections via the switching network. Each line circuit includes a transistor whose conductive state is selectively altered (1) to initiate a service request, (2) to identify a calling line circuit initiating a service request, (3) to re-identify a calling line circuit following the completion of a dialing operation, and (4) to identify a called line circuit.

INTRODUCTION

This invention relates to a telephone switching system, and more particularly to an electronic telephone switching system suitable for use as a private branch exchange. The invention further relates to an electronic private branch exchange that is entirely self-contained and which, when installed on a customer's premises, requires no modification of the central office serving the PBX.

There has been an increasing demand in recent years for an improved PBX that can be offered at attractive rates to small PBX customers currently served either by manual cord switchboards or by older type electromechanical systems now nearing a state of obsolescence. Recent studies have shown that 90 percent of all PBX installations have 80 lines or less. These studies have also indicated that most PBX customers of this size are mainly interested in the automatic switching of local and outgoing calls and are not interested in the sophisticated service features provided by the PBX systems recently developed and available for installations of this line size.

Most of the electromechanical type PBX's available for the 30- to 80-line range have incorporated therein service features such as camp-on, conference calls, dial transfer, etc., which, although desirable for certain installations, increase the cost of such PBX's beyond a price that a customer desiring only basic incoming and outgoing service is willing to pay. The electronic switching systems available for use as private branch exchanges are also equipped with similar service features and therefore similarly tend to price themselves beyond the reach of PBX customers desiring only basic service. Further, the electronic PBX systems presently available are of the type in which the PBX equipment on the customer's premises must be partially controlled by stored program equipment at the central office serving the PBX. This, in turn, requires extensive and expensive modifications to a central office at the time it is first equipped to serve one or more electronic PBX's. The cost of these modifications together with certain restrictions regarding the minimum and maximum number of PBX's, as well as PBX lines, that may be served by a single central office preclude the economical operation of such PBX's in installations having less than 100 lines. These limitations therefore automatically exclude the presently available electronic PBX's from a large percentage of the potential market since, as priorly discussed, 90 percent of all PBX installations contain 80 lines or less.

It may be seen from the foregoing that a current need exists for a PBX system that can economically provide basic service in installations having less than 100 lines and which can also be economically modified to provide additional service features for those customers who desire and are willing to pay for such services.

It is therefore an object of the invention to provide a new and improved switching system.

It is a further object of the invention to provide a new and improved PBX switching system that may economically serve a lesser number of lines than can presently available systems.

It is a further object of the invention to provide a new and improved electronic PBX switching system which, when installed on a customer's premises, requires no modifications to the associated central office above and beyond the modifications required for electromechanical PBX installations.

An electronic switching system is provided in accordance with the present invention which is suitable for use as a small to medium size PBX and which is sufficiently economical so that its cost per line is fully competitive with currently available PBX's of both the electronic and electromechanical type. A factor contributing to the economy of the disclosed system is that it is entirely self-controlled and self-contained, i.e., all of the equipment necessary for its control and operation is situated at the customer's premises. This eliminates the need for the expensive central office modifications heretofore associated with electronic PBX's. This, in turn, eliminates the priorly discussed service restrictions regarding electronic PBX's and now permits a central office to serve economically either a single or a plurality of electronic PBX's of the presently disclosed type of a cost per line that is independent of both the number of PBX's as well as the number of lines in each PBX. Thus, the same criteria applicable to electromechanical PBX's may be used in determining the suitability of the presently disclosed system for service in any potential installation.

The system of the present invention is of the common control type and basically comprises line circuits, a switching network, trunks, registers, and a common control circuit. The line circuits are connected to what may be called the "line side" of the network while the trunk circuits are connected to the "trunk side" of the network. Each register has both a line and a trunk side appearance. The switching network is of the end-marked type and, in response to the presence of a marking potential on each side thereof, it establishes, independently of the remainder of the system, a network interconnection between the terminals associated with the two marks. The paths through the network comprise the contacts of ferreed elements which are utilized as network crosspoints.

The network establishes sequentially a plurality of separate paths between the line side and trunk side circuits during the serving of each call. The common control circuit regulates and controls the order in which the various circuits of the PBX are interconnected, via the switching network, for each call. It continually monitors the condition of each circuit capable of requesting call service, such as for example, line circuits, and upon the detection of a service request, regulates the estabishment of a connection, via the switching network, between the service-requesting circuit and the other circuits of the PBX with which it must be connected. The common control circuit does not use stored program control, and instead, uses transistor resistor logic elements which are connected together in a predetermined manner to enable the common control to perform its functions. Although stored program control is advantageously utilized in many systems, its complexity and expense render its use uneconomical in installations of the size for which the present invention is most suited.

The duties of the common control in controlling the establishment of connections are limited to the selection of the two circuits that are to be interconnected, together with the placing of a mark on each side of the switching network to signify to the network the identity of the circuits selected for interconnection. The network is essentially independent of the common control circuit, and it then proceeds solely as a consequence of the two marks to interconnect the two selected circuits by establishing a network path between the two sets of marked terminals. The serving of a call may require, depending upon the call type, a plurality of connections to be established sequentially through the switching network, and the common control and the switching network together cooperate to establish the connections necessary on each call.

Each line circuit includes a transistor that may assume either an ON or an OFF condition. Connections between the common control and the transistor of each line circuit enable the common control to monitor the ON or OFF condition of each transistor and, in turn, by means of prewired logic elements, to determine whenever a line circuit requires action by the common control with regard to either a call initiated by or directed to the line circuit. The connections between the common control and the line circuits also permits the common control to directly control the ON or OFF condition of each transistor in order to facilitate the interconnection of a calling or called line circuit with other circuits of the office via the switching network.

The transistor in each line circuit is in an ON condition when a bias voltage is applied to its base circuit and is in an OFF condition whenever the bias is removed. The common control normally extends a potential of the proper polarity and magnitude via a pair of bias control leads to the base of each line circuit transistor to hold the transistor ON during the on-hook condition of the line circuit. Each line circuit contains an off-hook detection circuit which is effective when its associated subset goes off-hook to disable the potential supplied over the bias control leads and thereby remove the base bias from its transistor to switch it to an OFF condition.

The common control circuit comprises, in part, a line circuit scanner having a plurality of operative positions, each of which has an output terminal. The output terminals of the scanner are connectible on a coded basis, by means of a gate, to each of the line circuits in such a manner that each line circuit has four conductors, i.e., code leads extending to a unique combination of scanner output positions. The four code leads for each line circuit are connected to the base of its transistor in such a manner that the potentials applied to the code leads by the scanner are effective to control the ON or OFF condition of the transistor in the same manner as are potentials applied to the bias control leads. Thus, with the foregoing arrangement, the potential necessary to maintain the line circuit tranisistors in an ON state may be supplied either from the aforementioned bias control leads, from the scanner via the code leads, or from both sources depending upon the progress of the call.

The line circuits and the common control are also interconnected by a plurality of signal leads, which together enable the common control to detect a change of state of the transistor in any line circuit. The foregoing connections, including the bias control leads, the code leads, and the signal leads together enable the common control to perform the various functions required of it in connection with the establishment of a calling connection. Included in these functions are the recognition of a service request from a calling line circuit, the identification of a calling line circuit that is to be initially connected to a register, the identification and selection of a called line circuit, and the identification of a calling line circuit that is to be connected to a called line circuit.

As already mentioned, the common control supplies a potential via the bias control leads to each line circuit to hold its transistor ON during the idle or on-hook condition of the line circuit. The initiation of an off-hook condition at a calling station causes the off-hook detection circuitry in its line circuit to remove the base bias from its transistor and thereby turn it OFF. The resulting increased collector potential of the transistor is transmitted as a service request signal, via one of the signal leads, to the common control. The reception of this signal instructs the common control that one of the line circuits is requesting service without identifying the particular line that has gone off-hook.

The output of the line circuit scanner in the common control is gated onto the code leads in response to the reception of this service request signal. The scanner is normally in what is called an "end-of-scan" or "reset" state in which, due to the coding scheme used as subsequently explained, at least one of the four scanner outputs associated with each line circuit has a HIGH potential applied thereto at this time. It has already been described how a line circuit transistor may be maintained in an ON state either via the potential supplied over the bias control leads from the common control, or alternatively, from the potential applied to the coded scanning leads by the scanner. Therefore, the HIGH potential gated onto at least one of the four code leads of the calling line circuit causes its transistor to switch from its OFF back to an ON condition. The resulting decrease in the potential on the collector of this transistor is transmitted as a signal back to the common control to instruct it that the transistor of the line circuit currently bidding for service has switched back ON.

The common control energizes its scanner in response to the receipt of this signal and instructs it to initiate a line scanning operation. The scanner comprises a tens counter and a units counter, each of which in turn operates in accordance with a 3 by 4 code in such a manner that two stages of each counter are in an OFF condition while the remaining stages are in an ON condition. Thus, referring to both the tens and the units counter, four counter stages will always be OFF while the remaining stages of both counters will always be ON. Each counter output is connected to a code lead by means of an inverting gate in such a manner that the coded leads associated with the OFF stages of the counters are held at ground potential while the code leads associated with the ON stages of the counters are held at a positive potential. Each operative position of the scanner has a unique combination of four counter stages in an OFF condition and, accordingly, a unique combination of four code leads are held at a ground potential for each operative position of the scanner. Therefore, once the scanner begins a scanning operation, it grounds the four code leads associated with each of its operative positions only for the duration of time the scanner remains in each such position. At this time, the transistors in the idle line circuits are maintained in an ON condition by the potential applied to the bias control leads. However, the transistor in the calling line circuit is maintained in an ON condition solely as a consequence of a HIGH potential currently applied to one or more of its code leads by the scanner. Eventually, the scanner progresses to its operative position that is associated with the calling line circuit and, in so doing, grounds the four code leads extending from the four OFF stages of the scanner to the calling line circuit. This causes the transistor of this line circuit to switch once more from an ON to an OFF condition and, in turn, send a signal back to the common control. The common control, upon the reception of this signal, stops the scanner in the operative position associated with the calling line circuit.

The common control now marks the network termination of the calling line, selects an idle register, and marks the trunk side network termination associated with the selected register. The network responds to the presence of these two marks and establishes a connection therethrough between the tip, ring, and sleeve conductors of the calling line circuit and the selected register circuit.

The register is connected at this time with the calling line circuit and it now extends a ground over the sleeve lead to operate a cutoff relay in the line circuit. The operation of the cutoff relay disables the off-hook sensing cuitry of the line circuit and permits the potential on the bias control leads from the common control to be reapplied to the base of its transistor and turn back ON. This turn-on signal is transmitted back to the common control where it causes the scanner to return to its end-of-scan position and ground all code leads.

The register now supplies dial tone to the calling connection, and the calling party may now dial the digits representing another PBX station, an outgoing trunk, or a PBX attendant. Assuming the present call to be of the intra-PBX type, when the calling line has completed dialing, the digits stored in the register are read out by the common control and are used to identify the called PBX line. When the common control receives the register readout request, it removes the potentials applied to the bias control leads extending to all line circuits to prevent any subsequent service requests and to maintain the transistor in every line circuit in an ON condition exclusively by means of the HIGH potential applied to one or more code leads of each line circuit.

The digits stored in the register are read out by the common control and gated onto the code lead amplifier. This grounds all code leads of the called line circuit and turns the transistor in this line circuit OFF. If the dialed digits are 89, all four code leads of line circuit 89 are grounded, thereby turning the transistor in line circuit 89 OFF. At least one code lead of every other line circuit is held HIGH at this time to maintain their transistors ON.

The turn-off signal from the transistor of the called line circuit is received by the common control which, in response thereto, if the called line is idle, marks the network termination of the called line, selects an idle intercom trunk, and marks the network termination of the terminating end of the selected intercom trunk. The network responds to the presence of the two marks and establishes a path therethrough interconnecting the called line with the selected trunk.

The called line remains connected to the intercom trunk while the calling line momentarily remains connected to the register at this time. The next step in the serving of this call is the connection of the calling line to the originating end of the same intercom trunk to which the called line is connected. The register and the common control at this time initiate a call-back operation of the calling line in order that its identity may be determined.

The common control applies a potential to the line circuit bias control leads which disables the off-hook detection circuitry in each line circuit and maintains each line circuit transistor in an ON condition. The common control also removes the output of the register from the code leads. The register now extends a negative potential over the sleeve lead back to the calling line circuit where it is applied to the base of its transistor to cancel the potential from the bias control leads and thereby enable the transistor to turn off when it is scanned for the second time. The scanner now starts a second line scanning operation and, in so doing, once again advances through its various operative positions sequentially. The transistor in the calling line circuit is maintained in an ON condition by the potentials on the code leads as the scanner advances until the time the scanner advances to its operative position associated with the calling line circuit. At this time the transistor turns OFF once again as all of its four code leads are grounded by the scanner. The turn-off of this transistor is transmitted back to the common control to stop the scanner in the position associated with the calling line circuit.

The common control now releases the register from its connection with the calling line circuit, marks the network termination of the calling line circuit and the network termination of the originating end of the same intercom trunk to which the called line circuit has already been connected. The network responds to the presence of the two marks and completes a path therethrough interconnecting the calling line circuit with the intercom trunk. The intercom trunk, as a consequence of this interconnection, grounds the sleeve lead of the calling line circuit thereby operating its cutoff relay to complete the connection between the calling and called stations.

If the calling line had dialed the digits for an outgoing call or an attendant call into the register, the common control would have selected and marked an idle outgoing trunk or attendant trunk, respectively, in the same manner as described for the intercom trunk. The calling line would then be selected and marked by a call-back from the register, and the switching network and the common control would complete the connection in a manner similar to that already described.

A feature of the invention is the provision in a switching system of a calling line scanner for initially scanning a plurality of lines to determine the identity of a line requesting service and for subsequently scanning this same plurality of lines for ascertaining the identity of the line that is to be connected to a selected called line.

A further feature of the invention is the provision in a switching system of a line scanner for ascertaining the identity of a calling line a plurality of times during the service of a single call.

A further feature of the invention is the provision in a switching system of line circuits, a line scanner, and coded scan leads interconnecting each line circuit with the scanner wherein the scanner is initially used during a call for identifying a calling line requesting service and is subsequently used for ascertaining the identity of a calling line during a register call-back operation.

A further feature of the invention is the provision in a switching system of line circuits, a register, a line circuit scanner, and code leads interconnecting the line circuits with the line scanner wherein the scanner is initially used to detect a line service request and to ascertain the identity of a line circuit requesting service, wherein the register and the code leads are subsequently used for selecting a called line, and wherein the scanner and the code leads are subsequently utilized for ascertaining the identity of a calling line during a register call-back operation.

A further feature of the invention is the provision in a switching system of a line circuit having a transistor which is switched from an ON to an OFF and from an OFF to an ON condition a plurality of times during a single call in order to effect a plurality of circuit operations in connection with the establishment of the call.

A further feature of the invention is the provision in a switching system of line circuits, each of which has a transistor circuit which is used for initiating a call service request, for facilitating an initial identification of its line circuit when initiating a call, for facilitating an identification of its line circuit in connection with the completion of a call directed thereto, and for facilitating the identification of its line circuit during a register call-back operation.

A further feature of the invention is the provision in a switching system of a common control circuit which provides a plurality of different types of service during the establishment of each call connection and which has facilities for serving, in an ordered preference, simultaneously received requests for different types of service.

These and other objects and features of the invention will become apparent from a reading of the following description of the invention taken in conjunction with the drawing, in which:

FIG. 1 comprises a block diagram of the system comprising the present invention;

FIG. 2 illustrates the details of the basic circuit that is used as a pulse counter and as a scanner in the present invention;

FIG. 3 comprises a diagrammatic symbolization of the counter of FIG. 2;

FIG. 4 illustrates the manner in which the counter circuits of FIGS. 2 and 3 may be interconnected to form a two-stage counter operable;

FIG. 5 illustrates the 3 by 4 code in accordance with which the counter of FIG. 4 operates;

FIG. 6 illustrates the basic transistor resistor logic inverter circuit that is utilized extensively in the present system as both an AND gate and an OR gate;

FIG. 7 illustrates the symbolization used when the circuit of FIG. 6 is operated as an inverting OR gate;

FIG. 8 illustrates the symbolization used when the circuit of FIG. 6 is operated as an inverting AND gate;

FIG. 9 illustrates the symbol used to represent a non-inverting OR gate;

FIG. 10 illustrates the symbol used to represent a non-inverting AND gate;

FIG. 10A illustrates a modification of the circuit shown in FIG. 6;

FIG. 10B illustrates the symbol used when the circuit of FIG. 10A is operated as an inverting AND gate;

Figure 1:
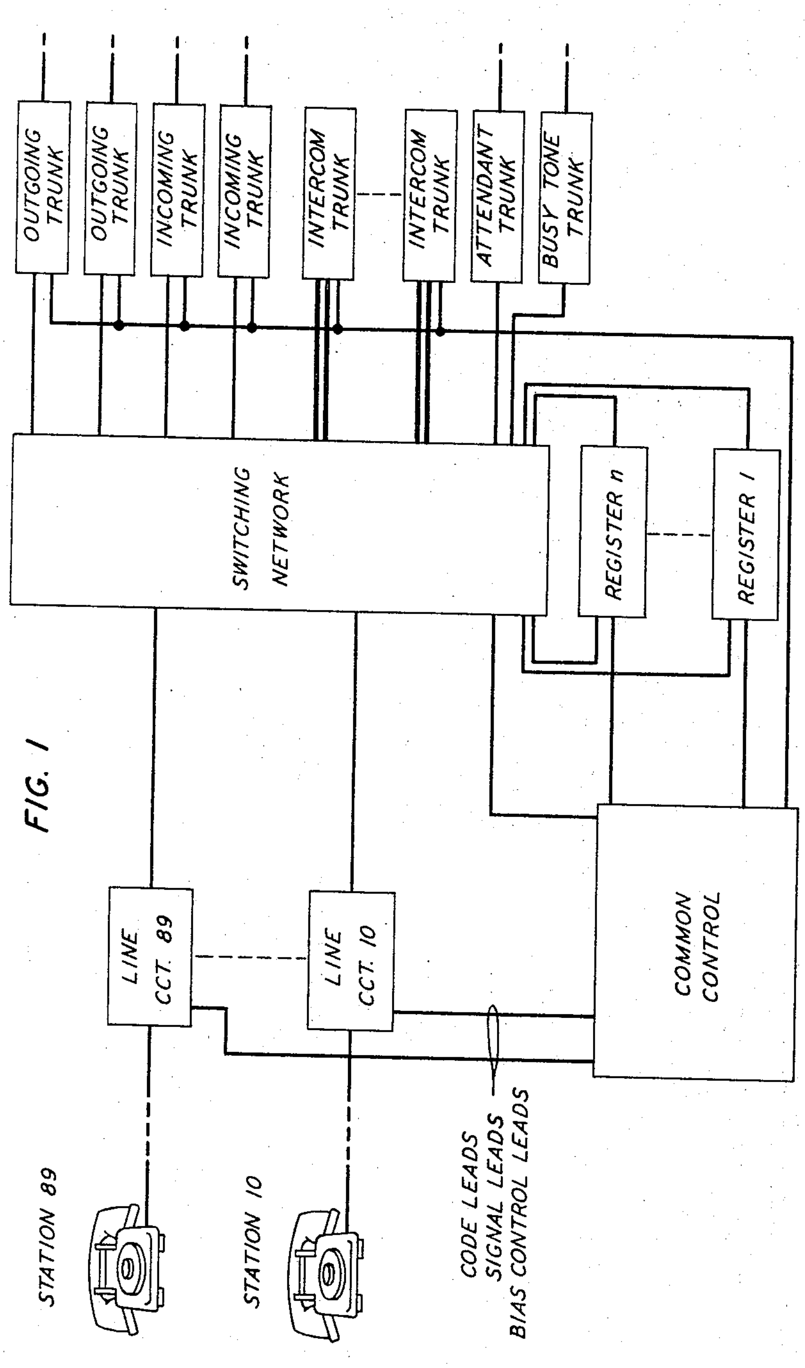
Figure 14:
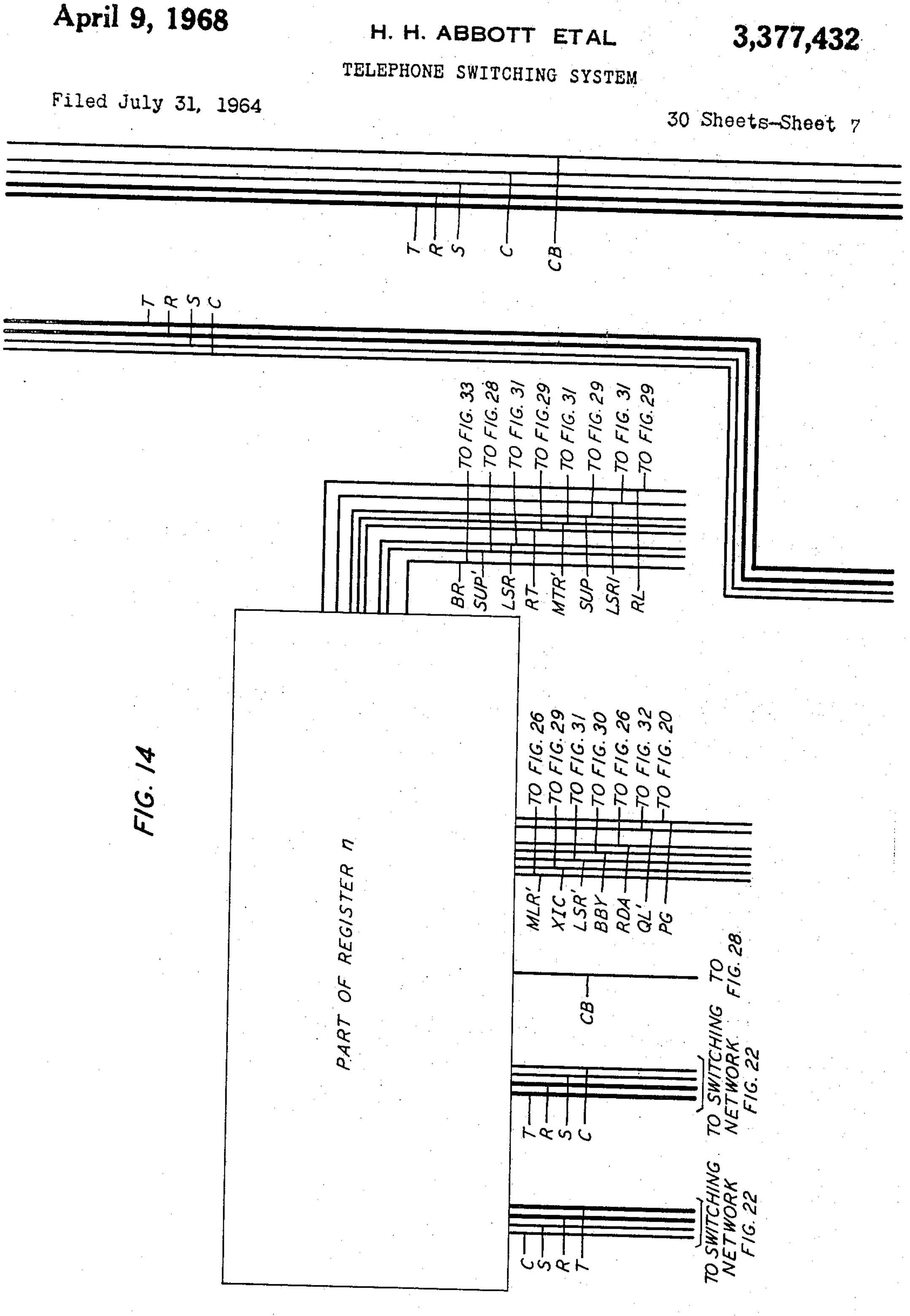
Figure 15:
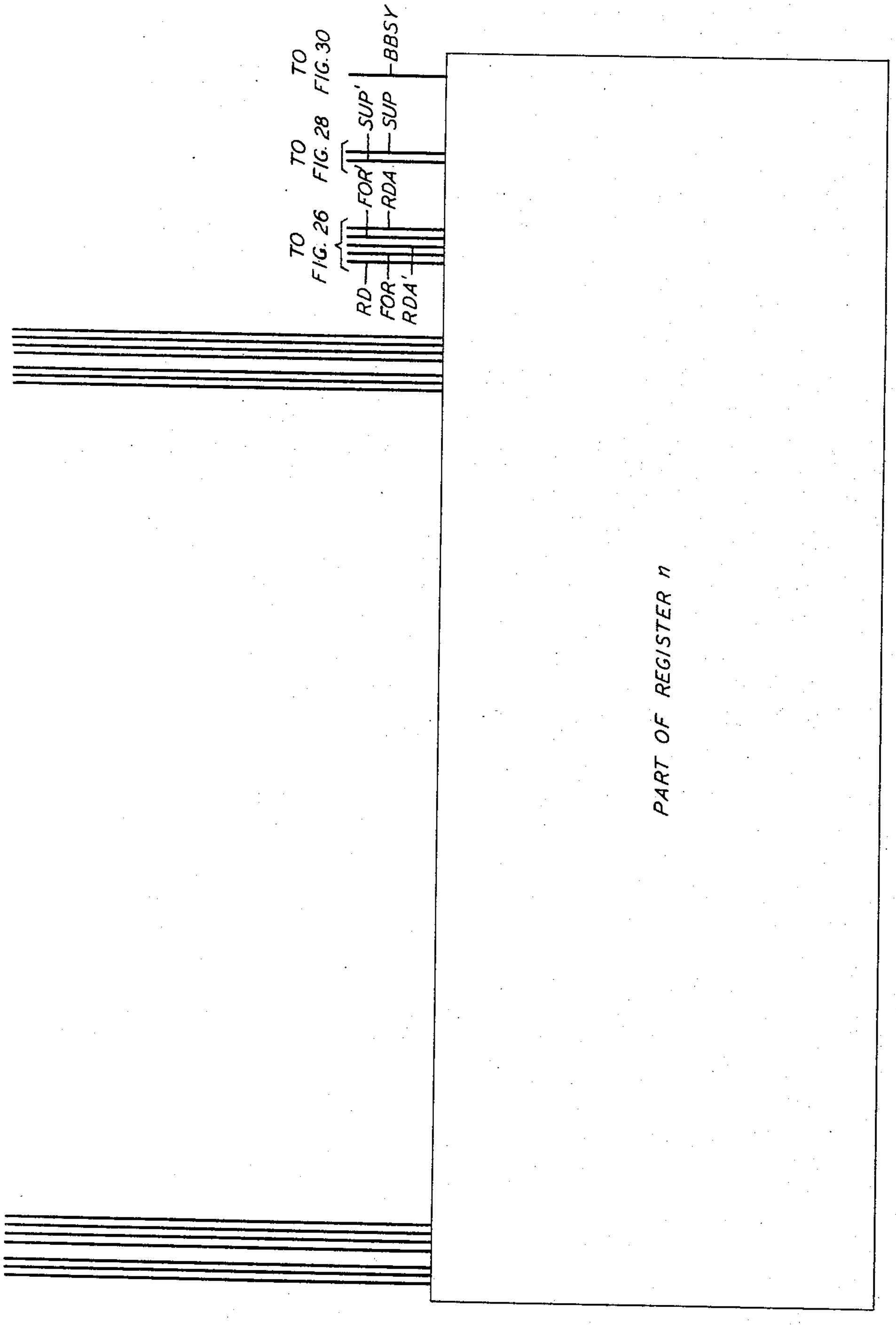
Figure 19:
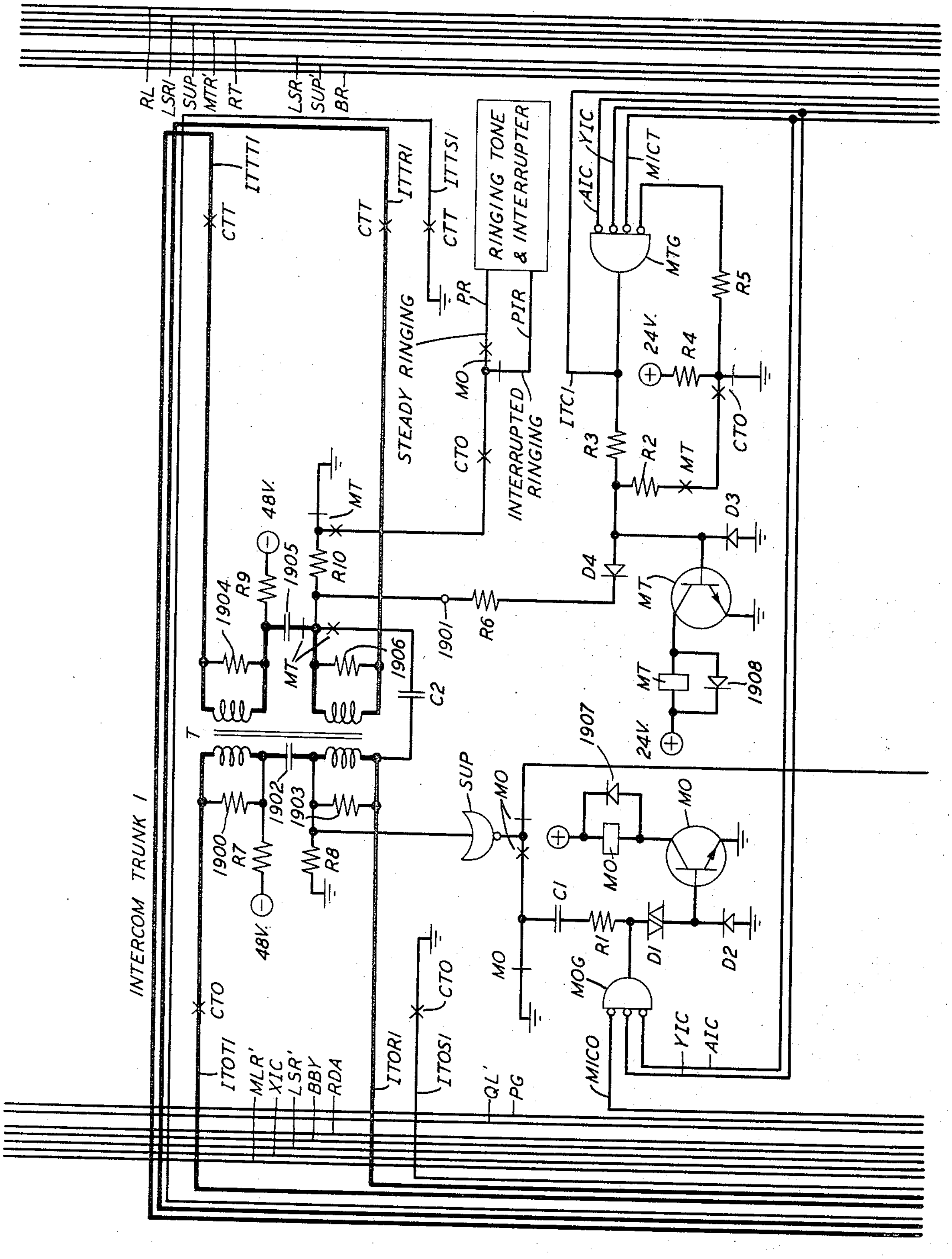
Figure 20:
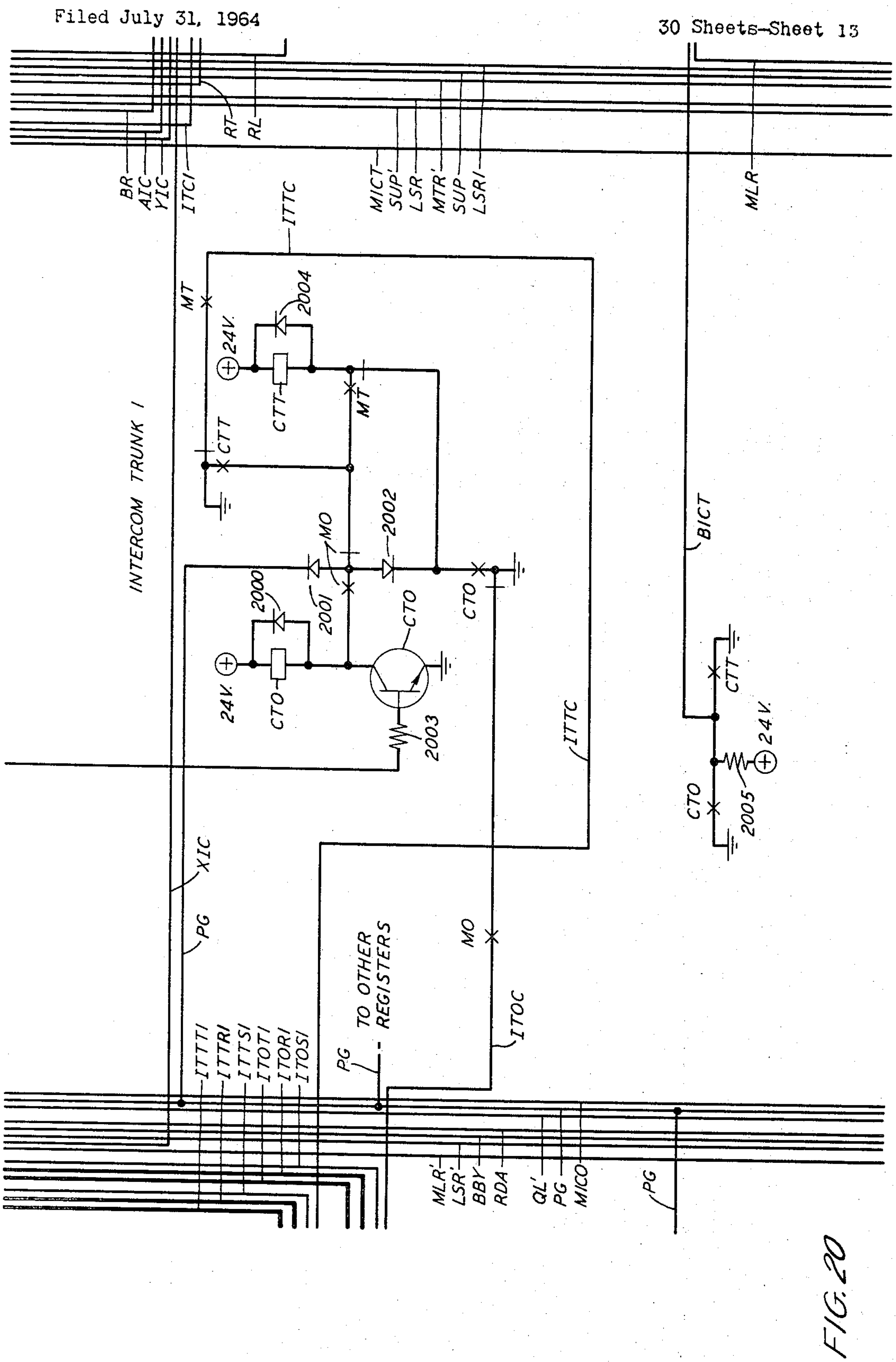
Figure 21:
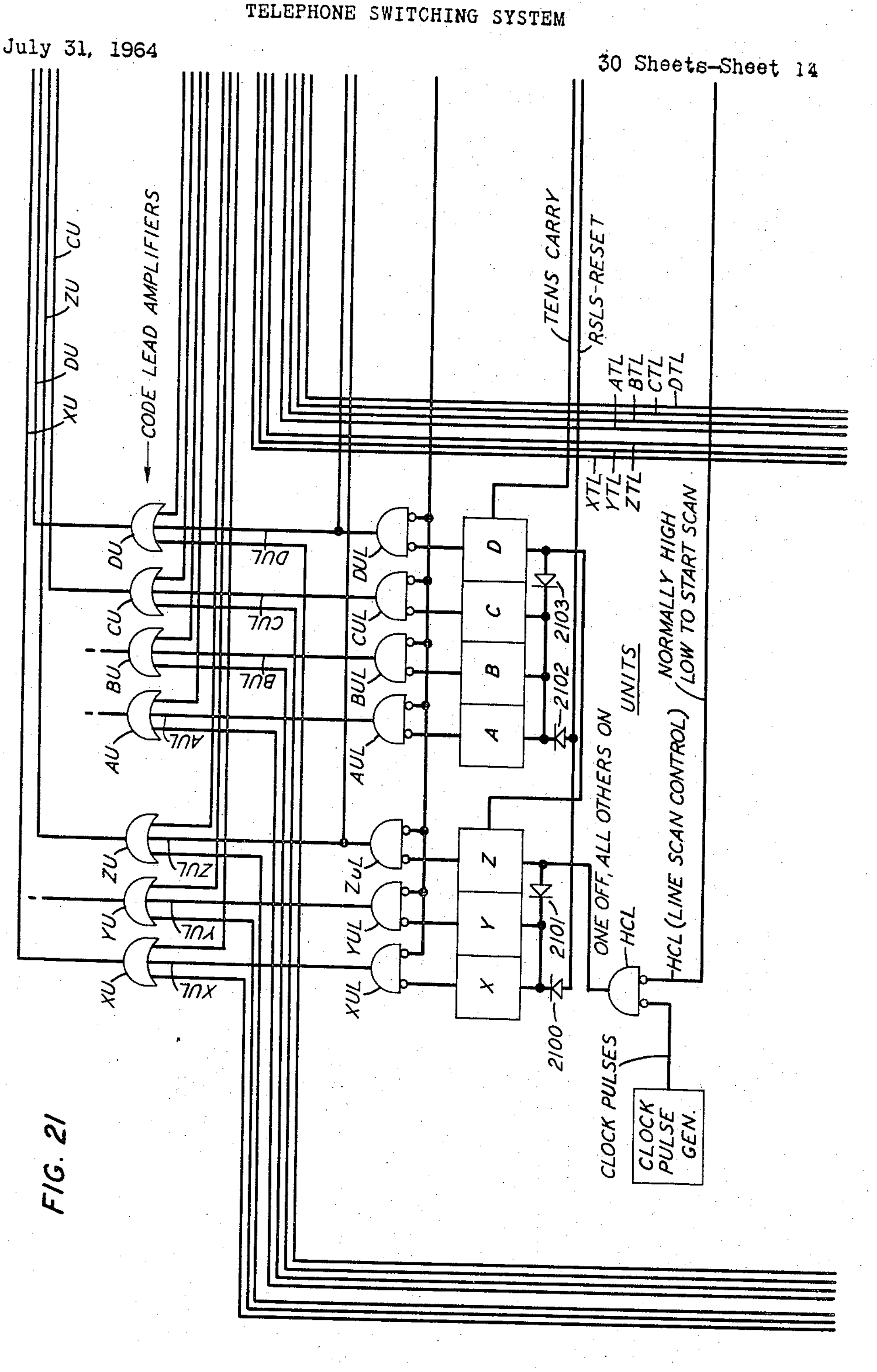
Figure 22:
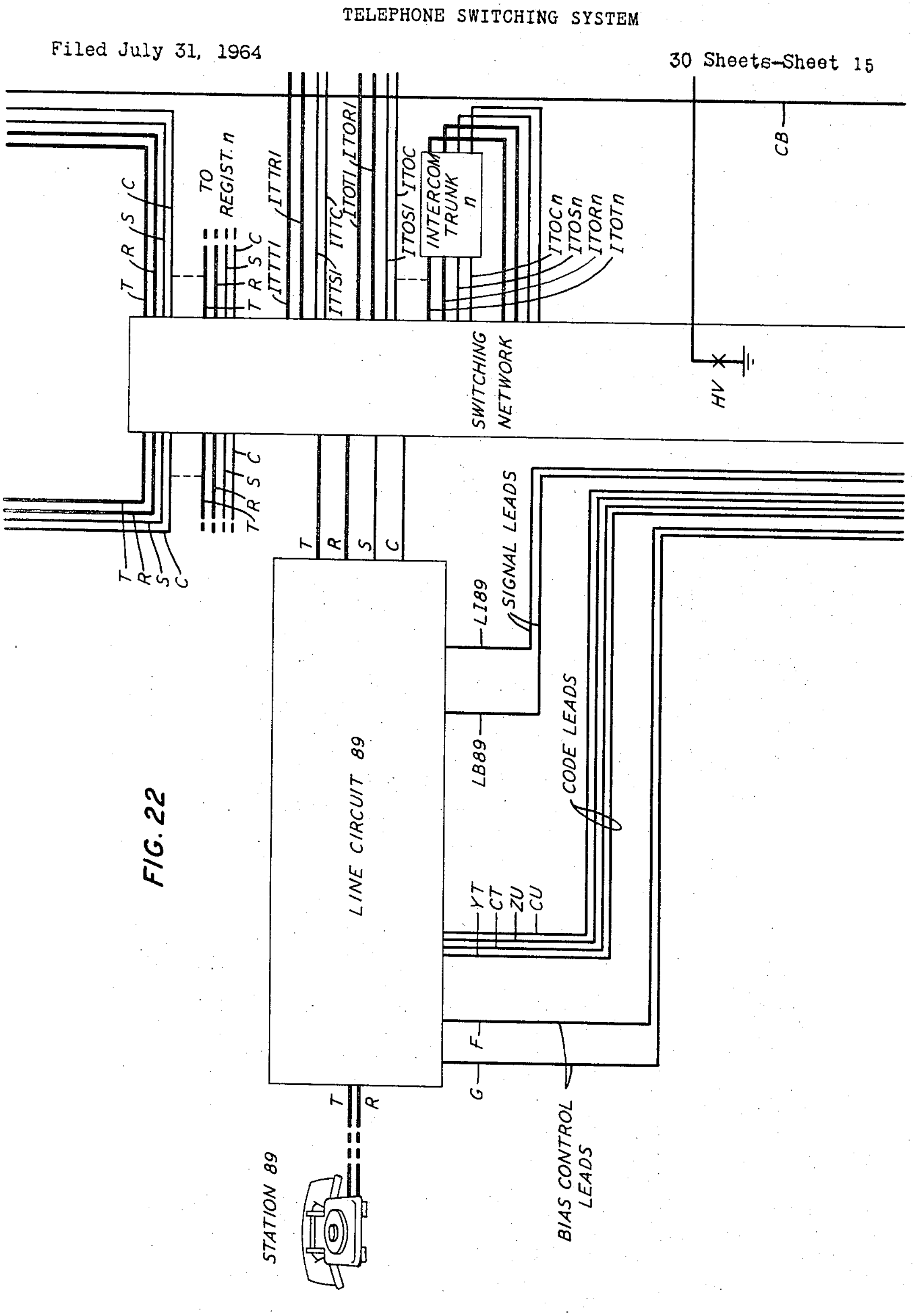
Figure 23:
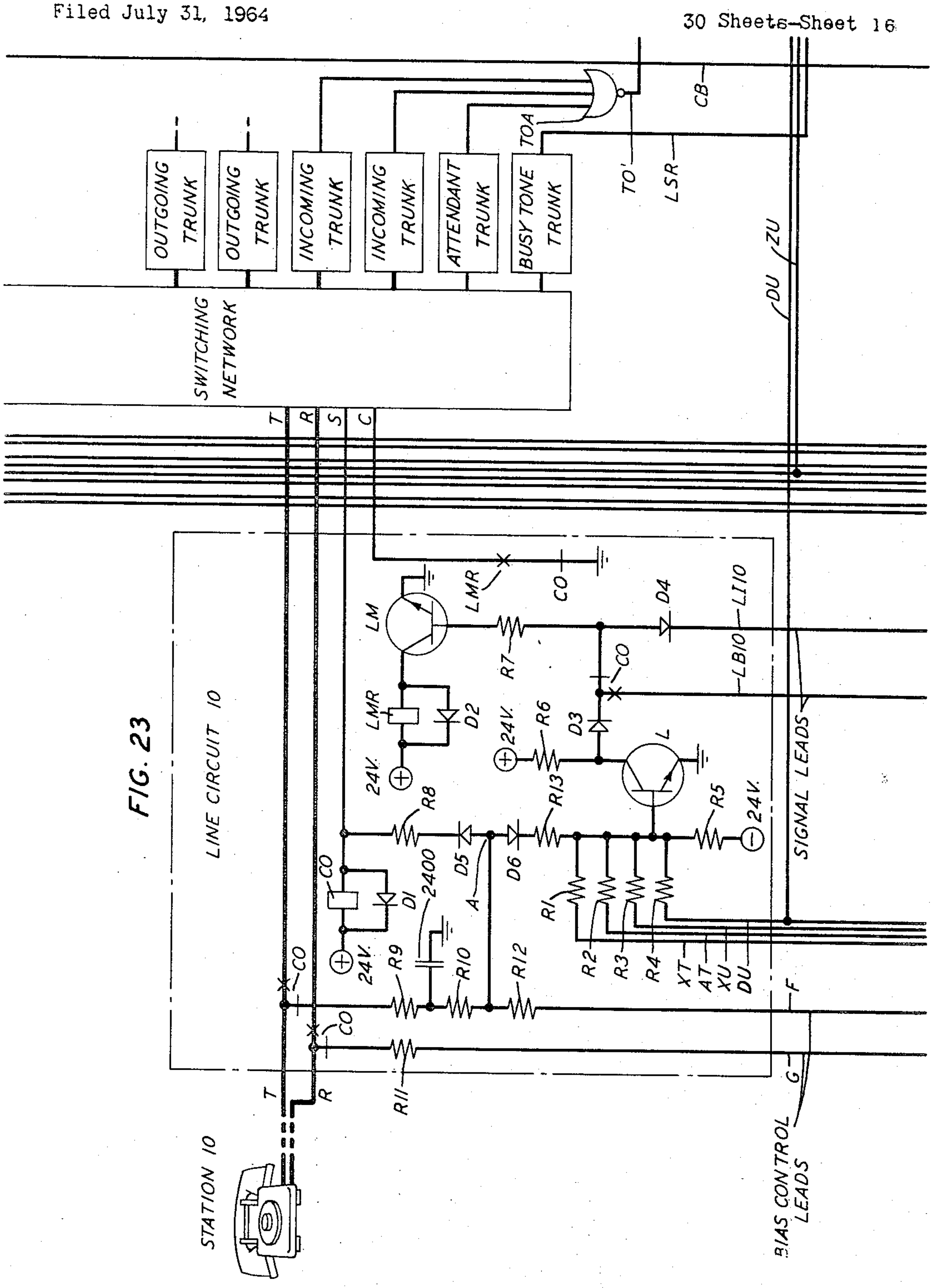

FIGS. 12, 13, 16, 17, and 18 illustrate the circuit details of one of the registers shown on FIG. 1;

FIGS. 14 and 15 diagrammatically disclose additional registers;

FIGS. 19 and 20 together illustrate the circuit details of one of the intercom trunks shown on FIG. 1;

FIGS. 22 and 23 together disclose the PBX stations, the line circuits, the switching network, and the outgoing and incoming trunks; and FIGS. 21 through 37 disclose the details of the common control circuit.

INDEX

| | Column |
|---|---|
| Introduction | 1 |
| Description of block diagram FIG. 1 | 7 |
| Detailed description | 8 |
| Pulse counters and scanners—FIGS. 2, 3, 4, and 5 | 8 |
| Logic circuits—FIGS. 6, 7, 8, 9, and 10 | 10 |
| Line circuits | 11 |
| Line scanner | 12 |
| Mode control circuit | 13 |
| Detection of a line circuit to service request | 14 |
| Line scanning operation | 15 |
| Register selection | 16 |
| Register circuit | 19 |
| Connection of register and calling line circuit | 30 |
| Dialing of called station digits | 32 |
| Register readout and called station selection | 32 |
| Connection of called station to intercom trunk | 35 |
| Sequence timing circuit | 38 |
| Callback of calling line | 38 |
| Disconnection of register from calling line circuit | 40 |
| Connection of calling line circuit to intercom trunk | 41 |
| Dial 0 and dial 9 calls | 43 |
| Attendant originated calls | 45 |
| Trunk dial tone mode | 45 |
| Reset circuit | 46 |

DESCRIPTION OF BLOCK DIAGRAM FIG. 1

The system of the present invention, as diagrammatically disclosed on FIG. 1, includes a plurality of PBX stations, 10 through 89, each of which is connected to a correspondingly numbered line circuit. Each line circuit is connected to the switching network and is additionally connected to the common control. The line circuits are connected to the left side of the switching network, while the various indicated types of trunks and the registers are connected to the right side of the network. Each register is also connected to the left side of the network. Throughout the remainder of this description, the left side of the network is referred to as the "line side" while the right side is referred to as the "trunk side." The common control regulates and coordinates the operation of every circuit of the system during the serving of calls, and, accordingly, it is connected to the line circuits, the switching network, the registers, and the various trunk circuits.

A call is initiated in the conventional manner when a calling party lifts the handset at his station preparatory to dialing the digits of the called number. The off-hook condition of the calling subset initiates the circuit actions priorly described to inform the common control that one of the line circuits is requesting service. The common control then initiates a scanning action to determine which line circuit is requesting service. Once the calling line circuit is identified, the common control selects an idle register, marks the line side network termination of the calling line circuit and marks the trunk side termination of the register. The network responds to the presence of these two marks and completes a path therethrough between the calling line circuit and the selected register.

Once this connection is established, the register returns dial tone to the calling line and the subscriber may then dial the digits of the called station into the register in the conventional manner. The register signals the common control upon the completion of the dialing operation, and the common control, in response thereto, gates the output of the register onto the code leads. The common control next selects an idle intercom trunk, marks the line side termination of the called line circuit, and then marks the trunk side termination of the terminating end of the selected intercom trunk. The network establishes a path between the intercom trunk and the called line circuit in response to the presence of the two marks.

At this stage of the call, the calling line circuit is connected to the register while the called line circuit is connected to the terminating end of the selected intercom trunk. The register now transmits a potential back to the calling line circuit which turns the transistor therein OFF and initiates a scanning operation which identifies the calling line circuit. The register is then released from the connection. Once the scanner has, for the second time, identified the calling line circuit, the register releases thereby releasing the cutoff relay in the line circuit. The common control now places a mark upon the line side network termination of the calling line circuit and also places a mark upon the originating trunk side termination of the same intercom trunk to which the called line circuit is already connected. The network then establishes a connection between the calling line circuit and the originating end of the selected intercom trunk, thereby completing the connection between the calling and called PBX stations.

A call to a subscriber outside of the PBX is completed in a similar manner as described except that it is routed via one of the outgoing trunks shown on FIG. 1. A call directed to the local operator is routed via one of the indicated attendant's trunks. An incoming call is served in a similar manner except that the circuit operations priorly discussed for the calling line circuit are performed by one of the incoming trunk circuits.

DETAILED DESCRIPTION

*Pulse counters and scanners—FIGS. 2, 3, 4, and 5*

Figure 2:
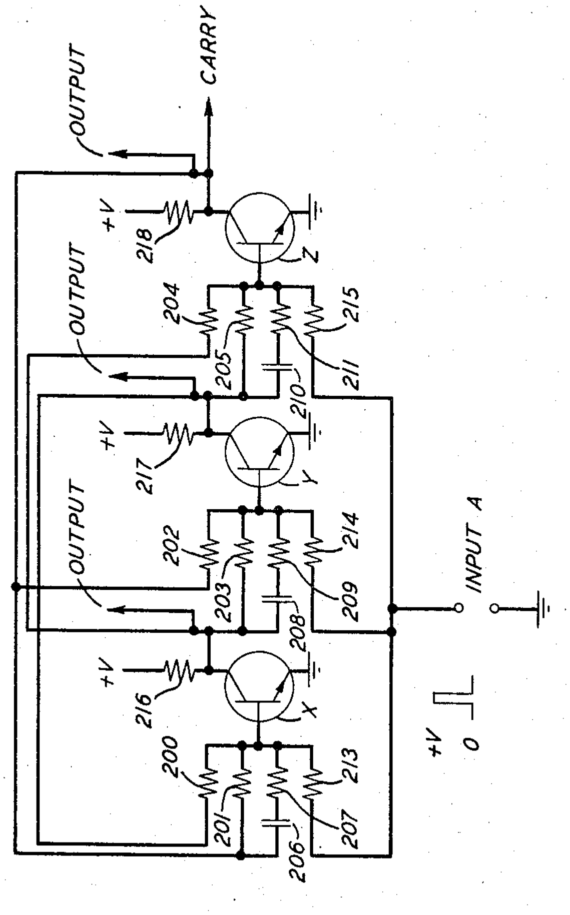
Figure 11:
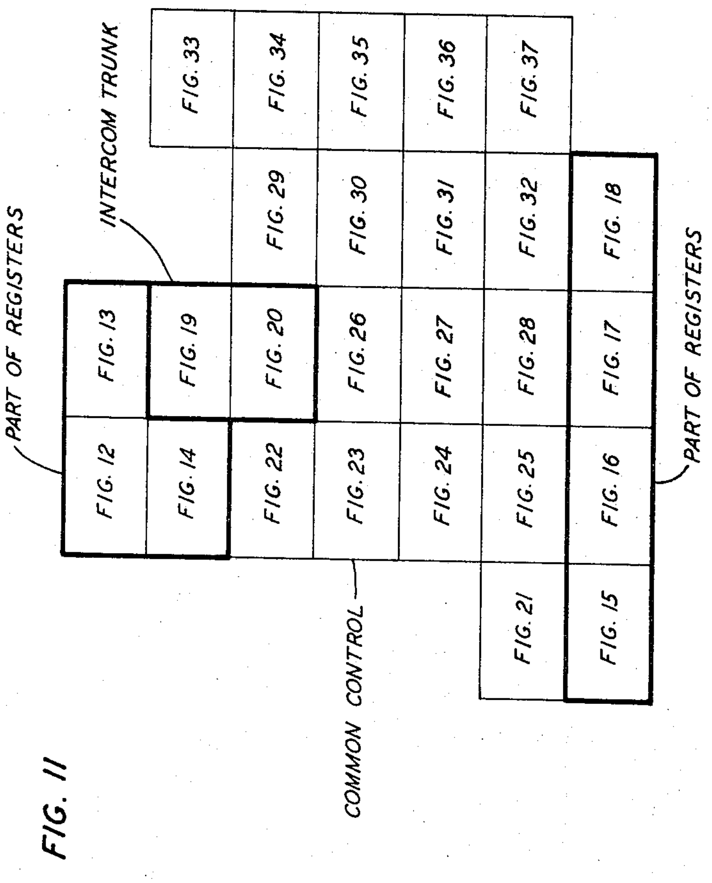
FIG. 11 illustrates the manner in which FIGS. 12 through 37 should be arranged.

The circuit of the present invention makes extensive use of circuits of the type shown in FIG. 2. These circuits are used in the present invention both as counters to provide a pulse count indication, as well as a steering circuit to control the operation of the counters. The drawing disclosing the entirety of the register have been simplified by disclosing pulse-counters and scanners in essentially diagrammatic form, and therefore, this discussion is presented in order that their circuit details and operation may be fully understood.

FIG. 2 discloses the circuit that comprises the basic building block of every counter and scanner used in the present system. The embodiment shown in FIG. 2 has three positions (X, Y, and Z), with each position comprising a transistor, a capacitor, and five resistors. Each position is directly coupled to every other position via the resistors 200 through 205. Each position is also coupled to the next succeeding position by an RC combination, such as elements 206 and 207, for example, for stage X. The signal input network to the circuit comprises resistors 213 through 215 which have a common pulse input source, with the other end of each resistor being connected directly to the base of one of the transistors.

The operation of this circuit is such that it is stable in any one of its three positions. There is only one possible mode of operation, i.e., one transistor is OFF and all other transistors are ON. The OFF transistor holds the other transistors ON, and vice versa.

A change of state occurs as follows: A positive going input pulse turns ON the transistor that currently is OFF. When the input pulse returns to its normal or 0 volts condition, the succeeding transistor turns OFF. The proper sequence is assured because the capacitor in the interconnecting network has stored a charge built up by the preceding transistor turning ON. This serves to inhibit the base current in the succeeding transistor long enough to turn it OFF when the input pulse returns to normal.

For example, assume that transistor X is OFF and that transistors Y and Z are ON. In this condition, the left-hand plate of the 208 capacitor interconnecting transistors X and Y is positive while the right-hand plate of the same capacitor is at approximately ground potential and is therefore negative with respect to its left-hand plate. A positive going pulse is then applied to the input as shown and it drives all three transistors ON for the pulse duration. The pulse duration is short, capacitor 208 does not have time to discharge, and therefore it remains charged at essentially its original potential. When the input pulse terminates, one transistor must turn OFF because this is the only stable state of the circuit. Transistor Y turns OFF at this time since the turn-on of transistor X lowers the left-hand plate of the capacitor 208 to approximately ground potential. The right-hand plate of the same capacitor is negative with respect to the left-hand plate, and therefore, holds the base of transistor Y negative for the discharge time of the capacitor. The remaining transistors, i.e., transistors X and Z, stay ON when the pulse ends, due to their direct coupling to the collector of the transistor Y, which is now at a positive potential. The ON condition of transistors X and Z lowers the potential on their collectors to essentially that of ground. The direct coupling between the collectors of these transistors and the base of transistor Y, in turn, grounds the base of transistor Y thereby holding it OFF.

The OFF transistor is propagated along the chain one position for each positive going input impulse received. A carry pulse may be obtained from the collector of any transistor and applied to the corresponding input terminal of another counter stage to provide a plural stage counter.

Figure 3:
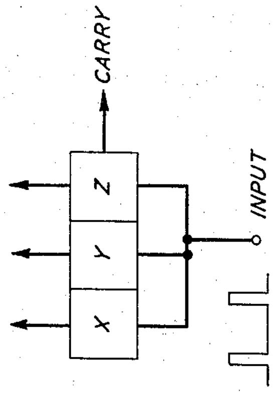

FIG. 3 discloses a diagrammatic representation of the counter circuit of FIG. 2.

FIG. 4 discloses a plural stage counter having positions designated X, Y, and Z in a first stage, and positions A, B, C, D, for a second stage, with the carry signal between stages being provided from the output of the Z position of the first stage. A differentiator comprising capacitor C2 is provided in the carry circuit in order to differentiate the steady-state D-C signals on the Z output of first stage. Diode D1 is provided to absorb the negative going differentiated pulses.

The stepping pulses for the two-stage counter are applied to terminal A and, in response thereto, the XYZ counter operates and applies a positive carry signal to the ABCD stage each time the Z position goes from an ON to an OFF condition. The carry signal is differentiated and applied as a positive pulse to the A input terminal of the ABCD counters.

A positive going reset pulse applied to terminal B resets both counter stages to their Reset (R) position in accordance with the 3 by 4 code shown in FIG. 5. At this time, the XY and ABC sections are conducting while the Z and D sections are OFF. The reset pulse is applied to sections X, Y, and ABC, through diodes D5 and D3, respectively, and is isolated from the Z and D sections by diodes D4 and D2, respectively.

*Logic circuits—FIGS. 6, 7, 8, 9, and 10*

The presently disclosed system makes extensive use of transistor resistor logic circuits in which a single transistor stage is used as an inverter, an inverting AND gate, or an inverting OR gate, depending upon the nature of the input signals applied thereto and the function to be performed by the stage. FIG. 6 discloses the details of such a circuit which comprises a single NPN transistor, a collector resistor RC and a plurality of input resistors, R1 . . . RN, of which there is one for each input to the stage. The circuit of FIG. 6 is basically a single-stage inverter since a positive going signal applied to the base appears as a negative going signal at the collector, and vice versa.

The stage may be used as an inverting OR gate by leaving the circuit normally cut OFF, i.e., all inputs LOW. In this case, a positive going signal applied to one or more input leads will turn the transistor ON and provide a negative going signal on the collector. The stage also may be used as an inverting AND gate, in which case the transistor is normally held ON by a positive signal applied to one or more of its input leads. The AND condition of the circuit is achieved by a ground potential on all input leads, at which time the transistor turns OFF and produces a positive going signal at its output.

FIG. 7 discloses the diagrammatic symbol utilized when the transistor circuit of FIG. 6 is used as an inverting OR gate, while FIG. 8 discloses the diagrammatic symbol utilized when the circuit of FIG. 6 is used as an inverting AND gate.

Conventional AND or OR gates of the noninverting type are also used in the present system. These are represented by the symbols shown on FIGS. 9 and 10. The circuit shown on FIG. 10A is a modification of the circuit shown on FIG. 6. On FIG. 6, each input terminal (1, 2 . . . N) is connected in series with a resistor to the base of the transistor. The circuit of FIG. 10A has two input terminals. The lower input terminal is connected directly to the base of the transistor. The upper input terminal is connected to the base in series with the resistor, as are the input terminals of FIG. 6. FIG. 10B discloses the symbol used when the transistor circuit of FIG. 10A is operated as an inverting AND gate. The upper input terminal has a small circle placed intermediate its input conductor and the symbol for the gate. This indicates that the terminal is connected in series with a resistor to the base of the transistor of the gate. The input conductor for the lower terminal does not have this circle. This indicates that the lower terminal is connected directly to the base of the transistor. The circuit of FIG. 10A operates as an inverting AND gate in the same manner as that of FIG. 6. The application of a positive potential to either input turns the gate ON and drives its output LOW. The removal of a positive potential from both inputs is the AND condition of the gate. This turns it OFF and drives its output HIGH.

*Line circuits*

FIGS. 22 and 23 disclose a plurality of PBX subscriber subsets (10 through 89), each of which is connected over a pair of tip and ring conductors (T and R) to a correspondingly numbered PBX line circuit. Line circuit 10 is shown in detail while line circuit 89 is shown diagrammatically, except for the connections extending thereto from other portions of the circuit.

Each line circuit is connected to the switching network by means of the four conductors T, R, S, and C. Each line circuit is also connected to the common control circuit by the leads extending to FIG. 24 and designated G, F, LB10, LI10 for line circuit 10, as well as by four code leads whose designation is different for each line circuit. The code leads for line circuit 10 are designated XT, AT, XU, and DU, while the four code leads for line circuits 89 are designed YT, CT, ZU, and CU.

Each line circuit contains a cutoff relay CO, two transistors L and LM, a relay LMR, as well as additional circuit elements comprising resistors, capacitors, and diodes as shown. The circuit details of each of line circuits 11 through 89 is identical to that shown for line circuit 10.

Figure 24:
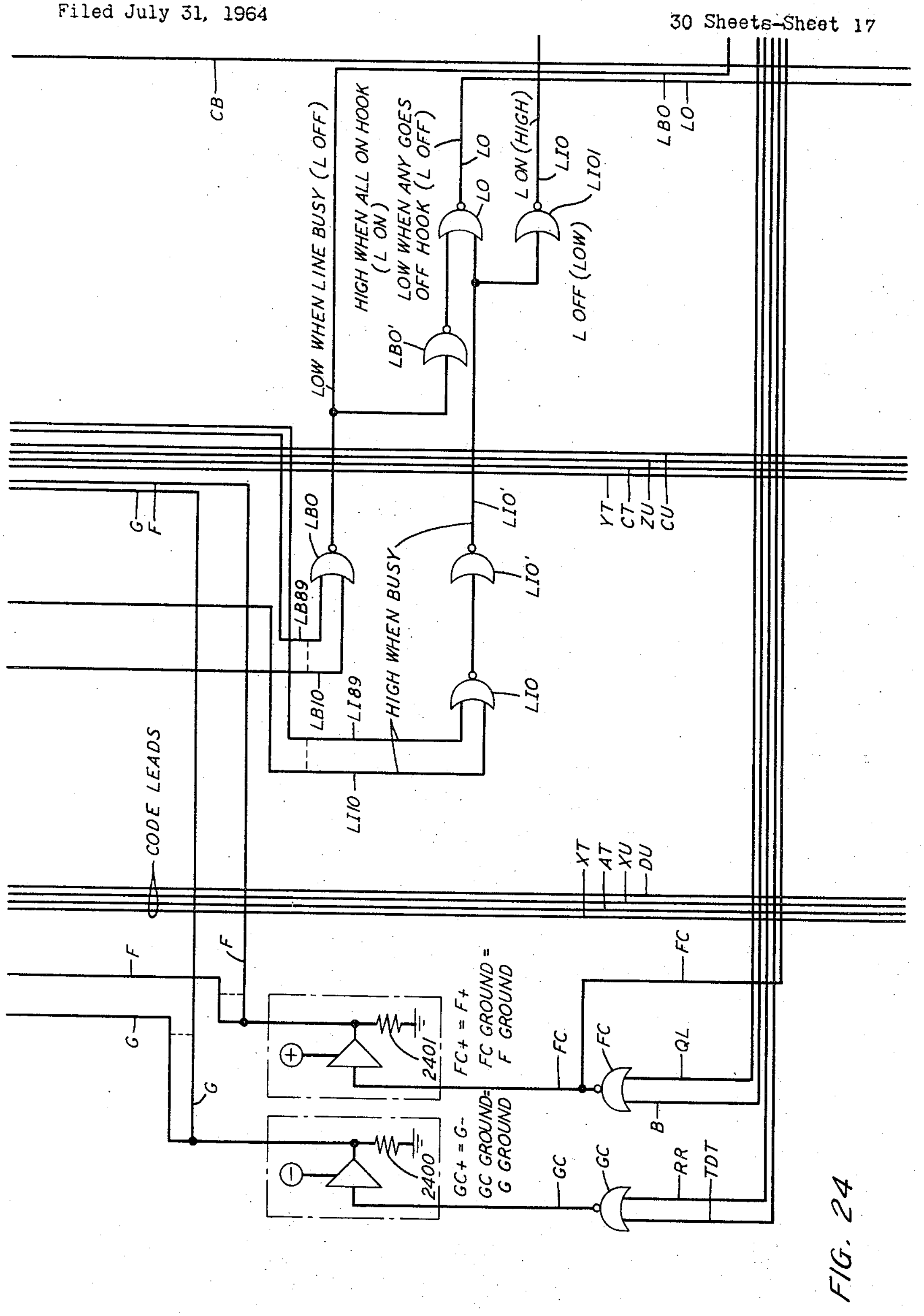

In the idle condition of the system, the circuitry shown on FIG. 24 normally applies a positive potential to the F lead extending to all lines circuits and a negative potential to the G lead extending to all line circuits. These two leads together comprise the bias control leads. Referring to line circuit 10, the positive potential on the F lead is extended through resistors R12, R10, and R9, and through break contacts CO to the tip conductor extending to station 10. The F lead potential is additionally extended through diode D6 and resistor R13 to the base of transistor L. This positive potential on the base of L forward biases the transistor, thereby maintaining it in an ON condition in which the voltage drop across the collector resistor R6 holds the collector at essentially ground potential. The negative potential applied to the G lead is extended through resistor R11 and the break contacts of relay CO to the ring conductor, and from there to the subset at station 10. The subset presents a high D-C impedance when in its on-hook condition, and therefore the negative potential on the R lead is of no effect at this time.

Let it be assumed that a subscriber at station 10 lifts the handset thereat to initiate a call. This closes the switchhook contacts of the subset, which, in turn, places a low D-C shunt across the tip and ring conductors. This low resistance shunt completes a D-C path between the positive potential on the F lead and the negative potential on the G lead. The resultant current flowing over this path produces an IR drop across resistor R12 thereby lowering the potential at terminal A below that of ground. This removes the base drive for transistor L and turns it OFF. The turn-off of transistor L raises the potential on its collector from ground to a high potential. This potential is applied through diode D3, break contacts of relay CO, diode D4, and over the LI10 conductor extending to the LIO gate on FIG. 24. The HIGH potential now on the input of this OR gate is propagated through this gate as well as the LIO′ OR gate and appears as a HIGH potential on the lead LIO′ which extends to the input of the LO and LIO1 gates. The HIGH potential appearing on the inputs of these gates causes their outputs to go LOW and thereby places a LOW potential on the conductors LO and LIO on FIG. 24. The LOW signal on the LO lead extends to FIG. 28, where it is applied to the input of gate LOO which comprises a portion of the scan control circuit. The LOW signal on the LIO lead extends to the input of the LDTC AND gate on FIG. 27, which comprises the mode control circuit. These two signals now cause the mode control and scan control circuits together to initiate a scanning of the line circuits in order to ascertain the identity of the calling line circuit as discussed in the subsequent paragraphs.

*Line scanner*

Figure 25:
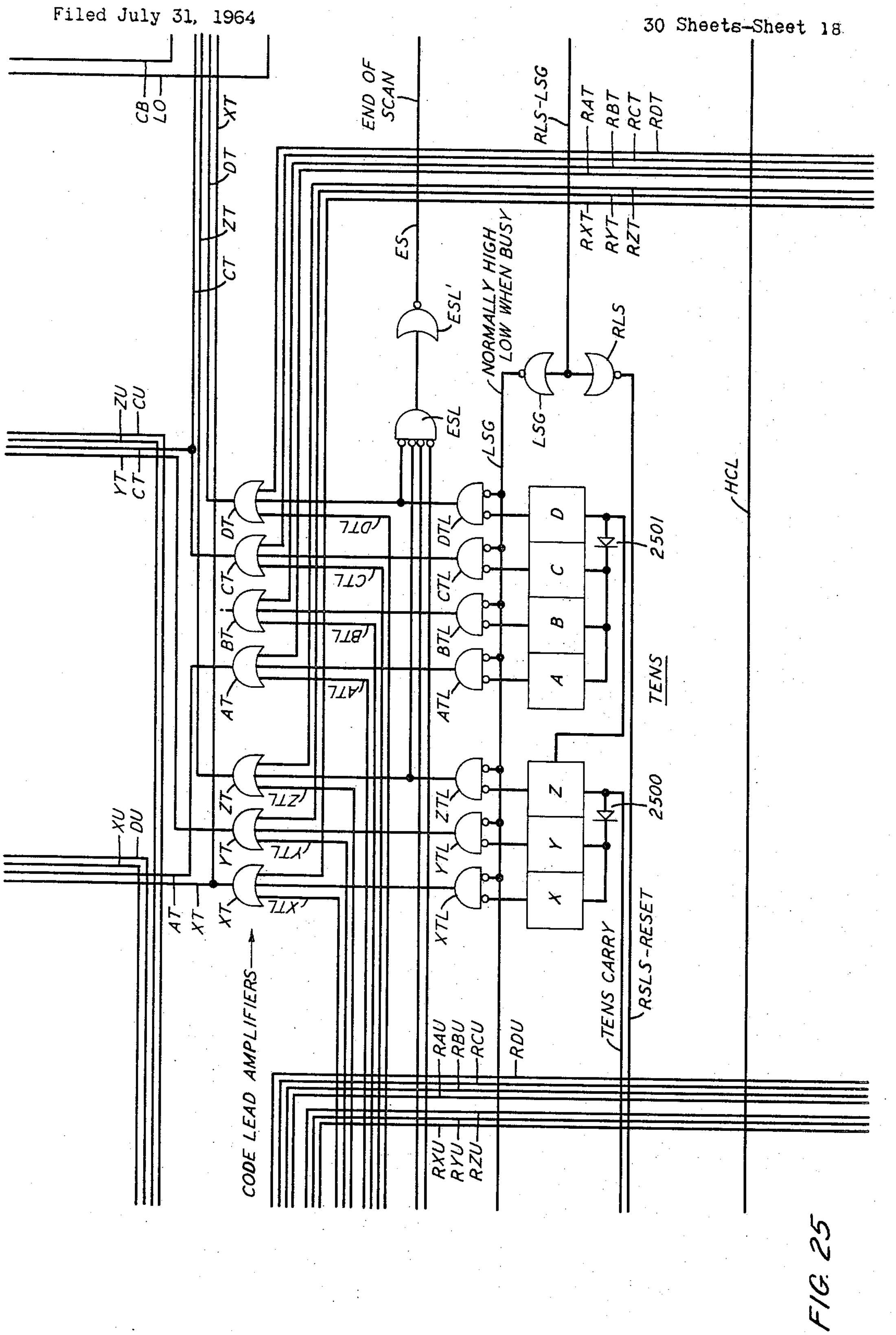

The line scanner is shown on FIGS. 21 and 25 and comprises a counter having a tens and a units order, with each order of the counter comprising a circuit of the type shown in FIG. 4, and having 10 operative positions (0 to 9) together with a reset position (R). Each order has an input lead for receiving counting pulses, a reset lead together with an output lead for each position of the scanner. The scanner operates in accordance with a 3 by 4 code as shown on FIG. 5. The output of each position of the scanner is applied through two gates in series to the various code leads of the line circuits in a coded arrangement, as determined both by the number assigned to the line circuit and the 3 by 4 output code of the counter. Thus, the tens digit of line circuit 10 is a "1," and a"1" is presented in the 3 by 4 code by an X and an A. Therefore, two of the four code leads for line circuit 10 are connected to the XT and AT output gates on FIG. 25. Similarly, the units digit of line circuit 10 is a "0"; and since a "0" is presented in 3 by 4 code by an X and D, the remaining two code leads of this line circuit are connected to the XU and DU output gates on FIG. 21. All of the code leads are held at a ground potential during an idle condition of the system.

Figure 27:
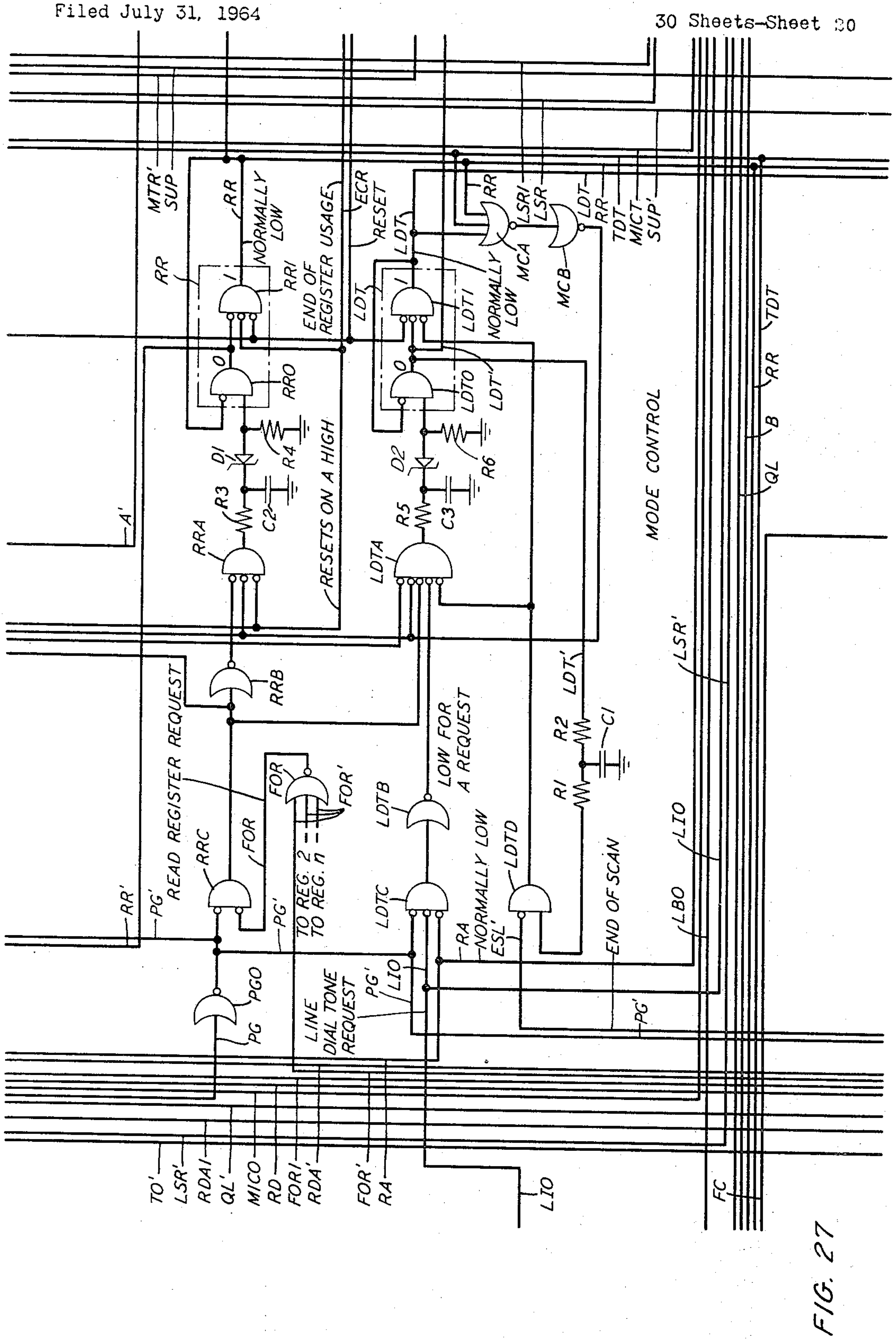
Figure 28:
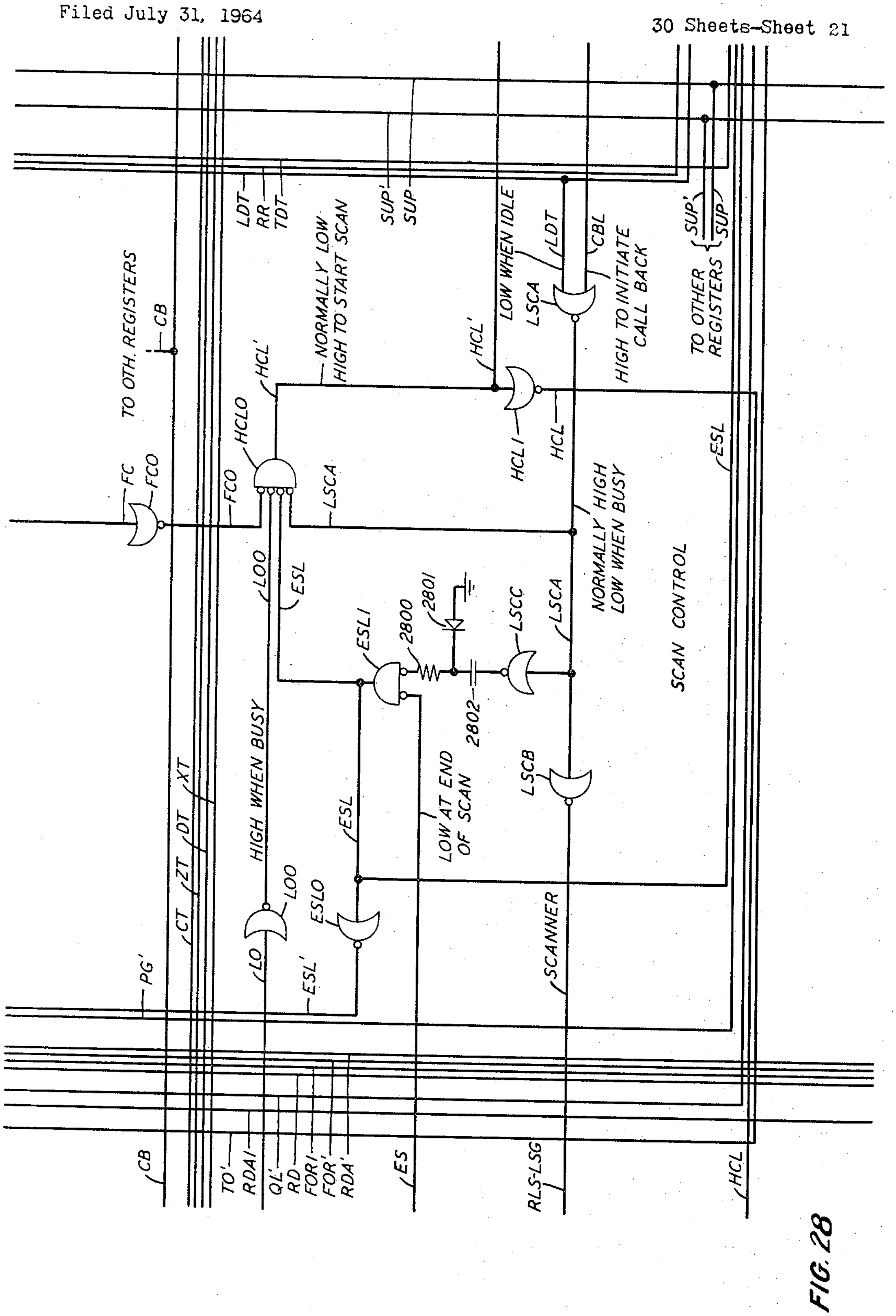

A further description of the scanner at this time requires a prior consideration of certain aspects of the mode control and scan control circuits on FIGS. 27 and 28, respectively, and in particular, a consideration of the signals that are applied thereto as a station goes off-hook and causes its line circuit to request service.

The code leads to all line circuits are normally held at a ground potential by the outputs of the XU through DU AND gates on FIG. 21 and by the outputs of the XT through DT AND gates on FIG. 25. The grounding of the code leads during the idle condition of the circuit puts the determination of whether the L transistor in each line circuit is in an ON or an OFF condition exclusively under control of the off-hook sensing circuitry comprising the F and G leads and the circuit elements connected thereto in the various line circuits as already described. The LDT and CBL leads on FIG. 28 are LOW (at ground) during the idle or no-service-request condition of the system. The reason for this is later explained. The L transistor in every line circuit is currently in an ON state. This maintains the LI– lead LOW for every idle line circuit and the LB– lead LOW for every busy line circuit. The LOW potentials on the LI– and LB– leads maintain the LO lead HIGH extending from FIG. 24 to FIG. 28. The output of the HCLO AND gate on FIG. 28 is LOW during the idle condition of the system, thereby making the HCL lead extending from FIG. 28 to FIG. 21 HIGH. The LSG–RSLS lead on FIGS. 25 to 28 is also HIGH. The output of the reset positions of the scanner (ZUL, DUL, ZTL, DTL) on the ES lead extending from FIGS. 25 to 28 is LOW at this time, which, in turn, makes ESL lead HIGH. The HIGH on the ESL lead is applied to one input of the hunt control gate HCLO, thereby making lead HCL′ LOW and lead HCL extending to the scanner on FIG. 21 HIGH. The HIGH on the HCL lead maintains the HCL AND gate (FIG. 21) in an ON condition. This holds the output of HCL gate LOW. Thus, at this time, the output of the clock pulse generator applied to the left-hand input of the HCL gate is unable to produce any corresponding output signal on the output of the HCL gate. This, in turn, prevents the output of the clock pulse generator from effectively passing through the HCL gate to the input of the counter.

It will be recalled that station 10 going off-hook as the subscriber thereat initiates a call caused the potential at terminal A on FIG. 23 to drop, thereby in turn causing transistor L of line circuit 10 to turn OFF. The turn-off of this transistor then made lead LI10 extending to FIG. 24 HIGH which, in turn, made lead LO extending from FIG. 24 to FIG. 28 LOW. Lead LI10 on FIG. 24 being HIGH at this time causes lead LIO extending from FIGS. 24 to 27 to go LOW. Lead LIO comprises the input to the mode control circuit on FIG. 27 from the output of the line gates of FIG. 24.

*Mode control circuit*

The function of the mode control circuit is to recognize the reception of a service request by the remainder of the common control equipment, to determine the nature of the request, i.e., the type of service requested, and, in response thereto, to condition or control the remainder of the common control circuit so that it may provide the type of service requested by the bidding circuit. Insofar as the present discussion is concerned, the mode control circuit has three basic modes, which are the line dial tone mode, the read register mode and the trunk dial tone mode. The line dial tone mode portion of the circuit is energized by the reception of a service request from a line circuit and, in response thereto, the mode control circuit conditions the common control circuit so that it may provide the service required by the calling line including the application of dial tone thereto. As is subsequently described, the function of the read register portion of the mode control is to recognize a service request from a bidding register and, in response thereto, to condition the common control so that it may read out the dialed digits currently stored in the register. The function of the common control circuit when in the trunk dial tone mode is to serve calls offered by incoming trunks. The read register portion of the circuit is shown on the upper part of FIG. 27 while the line dial tone mode portion is shown on the lower part of the figure. The trunk dial tone mode circuitry is shown on the lower portion of FIG. 26. There is a preference between the circuitry of each mode, with the read register portion having the highest preference. The reception of a read register request inhibits the LDTA AND gate on FIG. 27 to block the reception of any line dial tone requests.

The output signals of the mode control circuit are applied to the RR and LDT leads by means of associated flip-flops, with the flip-flop for the RR lead comprising the two gates RR0 and RR1 and with the flip-flop for the LDT lead comprising the two gates LDT0 and LTD1. The interconnections between the two gates comprising a flip-flop are such that the turn-on of one gate turns the other gate OFF, and vice versa. The normal condition of the flip-flop circuits is such that one gate is ON while the other gate is OFF. The flip-flops are operated in the circuit of the present invention in such a manner that the "0" portion of the flip-flop is normally OFF while the "1" portion is normally ON. Thus, referring on FIG. 27 to the LDT flip-flop, the LDT0 gate comprises the "0" portion of the flip-flop (it is usually OFF) while the LDT1 gate comprises the "1" portion of the flip-flop and is normally ON. The RR0 and RR1 gates, which together comprise the RR flip-flop, have their outputs designated in a similar manner.

The remainder of the presently disclosed circuit utilizes a plurality of flip-flops and, in each instance, a "0" and "1" designation is used to indicate the two gates comprising the flip-flop in a manner similar to that of the RR and LDT flip-flops.

In an idle condition of the system, all of the "1" output leads of the mode control circuit are in a LOW potential condition; that is, the RR lead is LOW and the LDT lead is LOW. The LDT lead being LOW holds the LSCA lead of the scan control circuit on FIG. 28 HIGH, thereby inhibiting the HCLO AND gate on the same figure as well as maintaining the LSG–RSLS leads on FIGS. 25 and 28 HIGH, as already discussed. A LOW on the LDT lead maintains the ESL lead HIGH in the following manner: The LOW on the LDT lead is propagated through the LSCA and LSCB gates and appears as a LOW on the lead designated RLS–LSG. The LOW on this lead is propagated through the LSG gate and appears as a HIGH on the LSG lead. The HIGH on the LSG lead maintains all of the AND gates connected to the scanner outputs on FIGS. 21 and 25 ON, thereby holding their outputs LOW. The LOW on the outputs of these gates makes the four inputs to the ESL AND gate LOW, thereby turning it ON and making its output HIGH. The HIGH on its output is then propagated through the ESL′ gate and through the ESL1 gate and appears as a HIGH on the ESL lead.

*Detection of a line circuit service request*

It has already been described how lead LIO extending to the input of LDTC AND gate on FIG. 27 goes LOW in response to the turning OFF of transistor L in line circuit 10 as subset 10 goes off-hook. The LOW applied to the input of the LDTC gate notifies the mode control circuit that a line circuit is requesting service and that the remainder of the common control circuit must be conditioned to provide the type of service required at this time by the bidding line circuit. The LOW on the LIO lead is propagated through the LDTC, LDTB, and LDTA gates and appears as a HIGH on the input of the LDT0 gate. This gate together with the LDT1 gate comprise the LDT flip-flop whose normal condition is such that the LDT1 portion is ON with the LTD0 portion being OFF. The HIGH now applied to the LDT0 gate causes it to go ON and the LDT1 gate to go OFF. This, in turn, cause the LDT lead to go HIGH and the LDT′ lead to go LOW. The HIGH on the LDT lead is transmitted to FIG. 28 where, by means of gate LSCA, it causes the LSCA input of the HCLO hunt control gate to go LOW. The HIGH on the LDT lead extending to FIG. 28 is applied to one input of the LSCA gate to turn it ON and drive its output LOW. The output of this gate is connected to the LSCA conductor which extends to the lower input of the HCLO gate, as well as to the inputs of gates LSCC and LSCB. The LO lead is currently LOW, as already described, which makes the LOO input to the HCLO gate HIGH. Both inputs to the ESL1 gate are now LOW, which makes the ESL input to the HCLO gate HIGH. The left-hand input of the ESL1 gate on FIG. 28 is LOW since the scanner of FIGS. 21 and 25 is in its RESET state at this time. As described elsewhere in the specification, all four inputs to the ESL gate on FIG. 25 are LOW whenever the scanner is in its RESET state. This causes the output of the ESL gate to go HIGH and, in turn, the output of ESL′ gate to apply a LOW to the left-hand input of the ESL1 gate on FIG. 28. The LOW on the LSCA lead, as already described, drives the output of the LSCC gate HIGH. However, the capacitor 2802 and diode 2801 differentiate the positively going output from the LSCC gate and, after a period of delay, apply the positive-going differentiated and delayed signal through resistor 2800 to the right-hand input of gate ESL1. However, the circuit actions described in the immediately following paragraphs occur prior to the time the delayed pulse is applied to the right-hand input of gate ESL1. Therefore, it may be stated that the right-hand input of the ESL1 gate remains LOW for a short time after the LOW appears on lead LSCA. Thus, at the current time, the LSCA input to the HCLO gate is LOW while the other two inputs of the gate are HIGH. The FCO input is also LOW at this time.

The LOW on the LSCA lead is propagated through the LSCB OR gate and then through the LSG and RLS OR gates on FIG. 25 to apply a LOW to conductors LSG and RSLS, respectively. The LSG lead going LOW gates the outputs of the scanner, through gates XUL through DUL, and XTL through DTL, to the input of the gates XU through DU and XT through DT. The scanner is in its RESET condition at the present time, in which, as may be ascertained from FIG. 5, its Z and D sections of each order are OFF while the remaining sections are ON. The output of an OFF section is HIGH while the output of an ON section is LOW. The LOW outputs of the ON sections, i.e., the XY and ABC sections of each order, are propagated through their associated inverting AND gates and appear on the outputs thereof as a HIGH. These HIGHS are propagated through the following associated noninverting OR gates and appear at the output thereof as a HIGH. The outputs of these noninverting OR gates comprise the code leads extending to the amplifiers and thus, at this time, the following code leads have a HIGH thereon: XT, XU, YT, YU, AT, AU, BT, BU, CT, and CU. The ZT, ZU, DT, and DU code leads are currently grounded since they are associated with the OFF portions of each order of the scanner. From a study of the code of FIG. 5, it may be determined that at least one code lead of each line circuit has a HIGH thereon at this time. The HIGH potential on each such code lead is applied thereover to the L transistor in the various line circuits thereby turning back ON any L transistor that may be OFF at this time. The high potential on a code lead at this time has no effect on the L transistor in all line circuits whose subsets are in an on-hook condition since these transistors are currently held ON by the off-hook sensing circuitry via the F lead potential. However, the transistor L in line circuit 10, which is in an OFF condition, is now turned back ON due to the HIGH on its XT, XU, and AT code leads at this time from the scanner.

*Line scanning operation*

Transistor L of line circuit 10 in turning back ON, lowers the potential of its collector to ground thereby grounding its output lead LI10 which causes conductor LO extending from FIG. 24 to FIG. 28 to go HIGH. This HIGH, in turn, is propagated through the LOO gate on FIG. 28 and appears as a LOW on the LOO input of the HCLO hunt control gate. Thus, at this time the LOO, FCO, and LSCA inputs of the hunt control gate are LOW while its ESL input is still HIGH. However, the LOW which is applied to the LSCA conductor on FIG. 28 at this time, as a consequence of the LDT HIGH output from the mode control circuit, not only made lead LSG on FIG. 25 LOW, thereby gating the output of the scanner, but, at the same time, caused the output of the LSCC OR gate to go HIGH. This HIGH signal is then differentiated and applied as a short pulse to one input of the ESL1 gate, thereby causing the output of this gate to go LOW momentarily and, in turn, apply a momentary LOW to the ESL input of the HCLO gate. The HCLO gate already has its other two inputs in a LOW condition, and therefore the momentary LOW pulse applied to its ESL input drives the HCL' lead HIGH. The HCL' lead going HIGH drives the HCL lead extending to FIG. 21 LOW, which, in turn, enables the HCL AND gate and thereby effectively connects the output of the clock pulse generator to the pulse input of the scanner. The scanner immediately starts to step in accordance with the code shown on FIG. 5. The instant the scanner steps from its reset (R) position, one of the inputs to the ESL gate on FIG. 25 goes HIGH thereby making lead ES HIGH. This HIGH on the ES lead is then propagated through the ESL1 gate and applied as a LOW to the ESL input of the HCLO gate for the duration of time that the scanner remains out of its reset condition.

The units and tens counters of the scanner advance under control of the pulse generator, with the units counter stepping once for each received pulse and with the tens counter stepping once for each completed cycle of the units counter as a consequence of an impulse received over the "tens carry" lead extending between the two counters. Each operative position of the scanner applies grounds to a unique combination of four code leads in accordance with the code shown in FIG. 5. When the scanner advances to a position in which all four code leads are grounded for a line circuit that is in an off-hook condition, the L transistor in such a line circuit turns off once again, making its LI– lead go HIGH and the LO lead on FIG. 24 go LOW. Thus, the instant the scanner steps to position 10, the four code leads for line circuit 10, namely, XT, AT, XU, and DU, will all be grounded, thereby removing the sole source of bias current for its L transistor to turn it OFF. The off-hook sensing circuitry is still maintaining terminal A on FIG. 23 at a LOW potential, and therefore the positive potential on the F conductor cannot hold transistor L ON at this time. The turn-off of transistor L on line circuit 10 drives its LI10 lead HIGH extending to the LIO gate on FIG. 24. This HIGH is propagated through the LIO, LIO', and LO gates and appears as a LOW on the LO lead extending to FIG. 28.

The LO lead going LOW at this time makes the LOO input to the HCLO gate on FIG. 28 HIGH, thereby causing lead HCL to go HIGH and, in turn, inhibiting the HCL gate on FIG. 21 to stop the scanner. The scanner at this time is in its position 10 which indicates to the common control the identity of the line circuit requesting service.

*Register selection*

Recalling that the LDT flip-flop (gates LDT0 and LDT1) on FIG. 27 is set into its SET condition, during which time the "1" output is HIGH and the "0" output is LOW, the LDT' lead extending from FIG. 27 to FIG. 31 to the input of AND gate MTR0 is LOW at this time. A second input to this same gate is the LIO lead extending to the line gates on FIG. 24. This lead is now at a LOW potential since the LI10 output of line circuit 10 is HIGH. A third input to this same gate is the ESL lead extending from the line scan control on FIG. 28. The three inputs of the MTR0 AND gate on FIG. 31 being LOW causes its output to go HIGH thereby extending a HIGH signal over the MTR lead to the input of the ICSCA OR gate on FIG. 29. This same HIGH signal is also propagated through the MTR1 OR gate, from which it appears as a LOW, and then extends over an MTR' lead to the MTR' inputs of all registers. The MTR' input for the register whose details are shown in the present specification is shown on FIG. 13, where it extends into AND gate MTR. The XIC input of the MTR gate extends back to a scanner shown on FIG. 29 of the common control circuit. The SUP input of this gate is internal to the register. The MTR gate on FIG. 13 of the register comprises the idle register selected circuit, and it is the circuit which enables the common control to select one register circuit out of a plurality of available idle register circuits.

Figure 13:
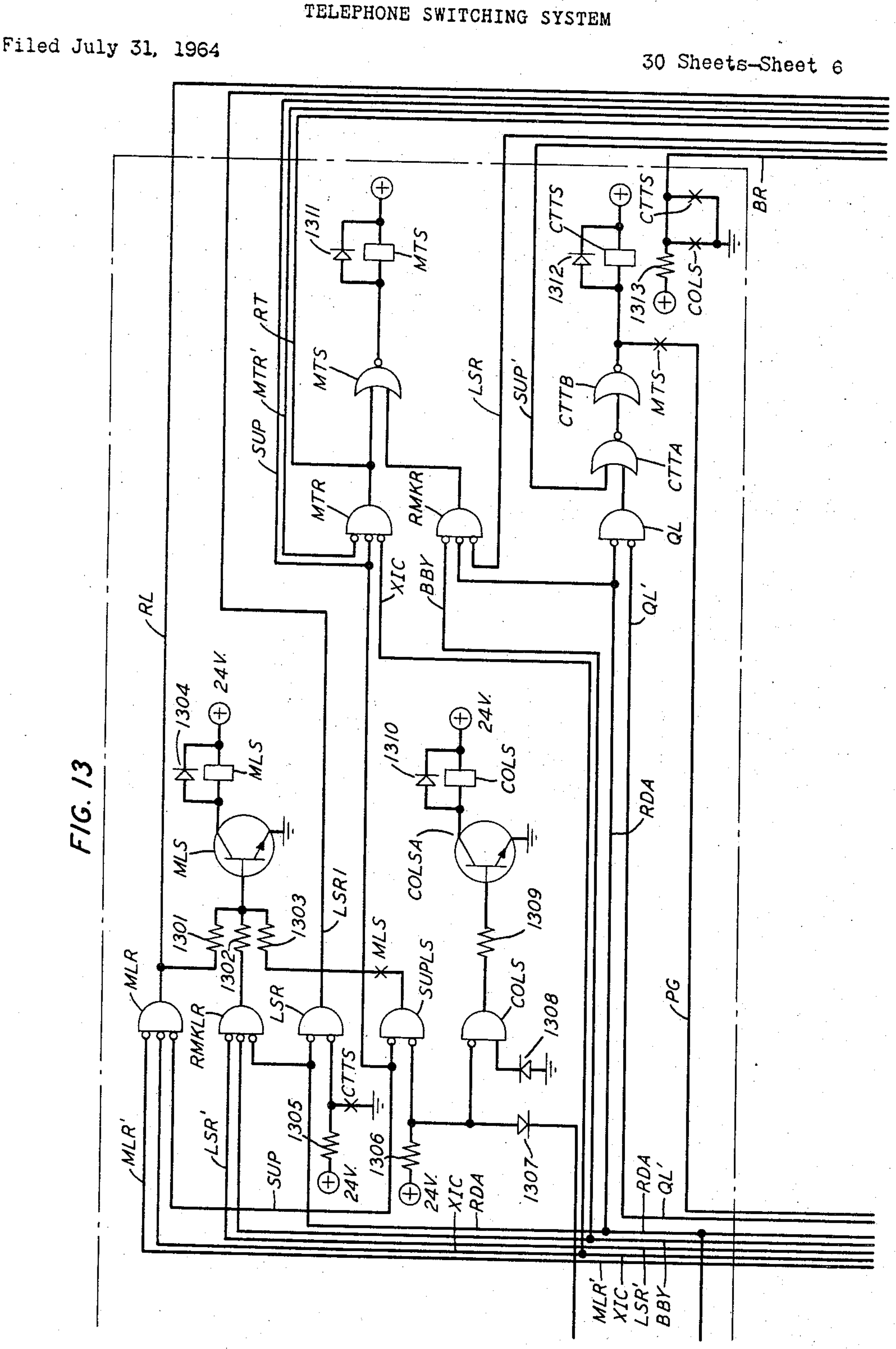

An idle register, such as register 1, is selected by making LOW all inputs (MTR', SUP, XIC) of its MTR gate on FIG. 13. The MTR' lead extends from FIG. 13 to FIG. 31 and is made LOW to all registers simultaneously by the common control when it attempts to select a register. The SUP input of the MTR gate is internal to a register and is LOW when the register is in an idle state. The lower input of the MTR gate on FIG. 13 is designated XIC only for register 1 and is made LOW by the scanner of FIG. 29. This XIC conductor extends back to the XIC output of the idle circuit scanner on FIG. 29. The lower input for the MTR gate of each register whose details are not shown would be designated differently (YIC, ZIC) and would be connected to other (YIC, ZIC) outputs of the scanner of FIG. 29. This scanner is similar to the line circuit scanner of FIGS. 21 and 25; however, the scanner of FIG. 29 has two additional positions, namely, an M and an N. This enables the scanner to have 24 operative positions. The output of this scanner is connected to the trunk circuits and register circuits the common control must select during the serving of calls.

Figure 29:
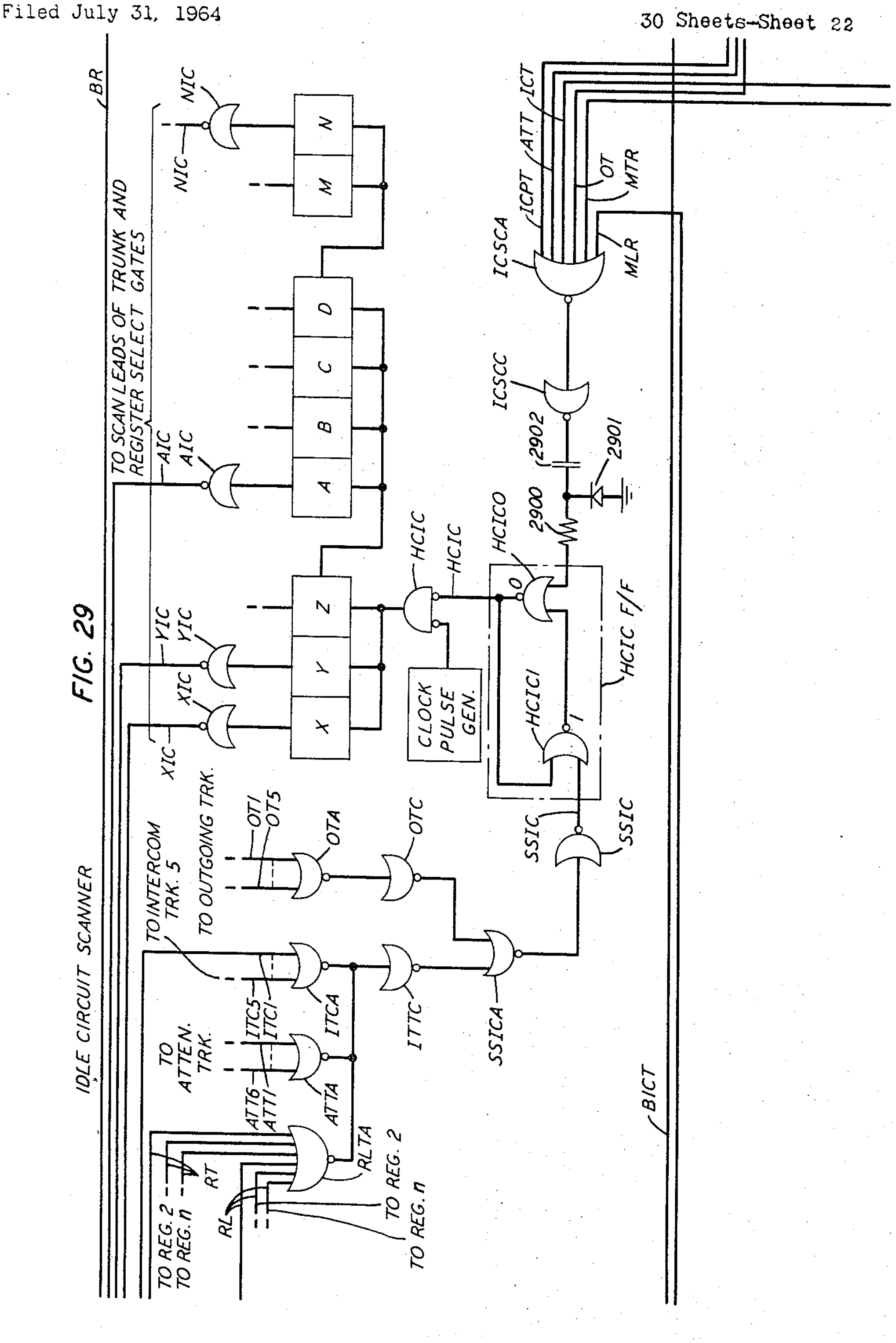

The output conductors (XIC . . . NIC) of the scanner of FIG. 29 are connected to the register circuits and trunk circuits in a coded manner so that each operative position of the scanner represents a unique register or trunk circuit. The lower input of the MTR gate of each register is connected to a different output conductor of the scanner. This permits the scanner to select a register by applying a LOW potential to the conductor extending from the scanner to the lower input of the MTR gate of the selected register. Each trunk circuit is connected to two output conductors of the scanner. A trunk circuit is selected by the scanner of FIG. 29 in the same manner as a line circuit is selected by the scanner of FIGS. 21 and 25.

The XIC input to the register MTR AND gate on FIG. 13 is connected to the output of the scanner in position X, which is designated XIC. The corresponding input for the MTR AND gate in another register would be connected to a different position of the scanner, such as for example, position Y, and therefore, the YIC output of the scanner would be connected from FIG. 29 of the common control to the input of the MTR gate of the other register.

A register is selected for use on a call by making all inputs of its MTR gate LOW. The middle input (SUP) of the MTR gate of a register is LOW if the register is currently in an idle state. The upper input (MTR′) of the MTR gate in all registers is driven LOW by the common control when it attempts to select a register. The lower input (XIC on FIG. 13 for register 1) of the MTR gate in a register is made LOW when the scanner advances to its position that is connected to the MTR gate of the register. Thus, register 1 is selected when the scanner of FIG. 29 advances to its position X. This applies a LOW to the XIC output conductor extending to the lower input of the MTR gate on FIG. 13. The other two inputs of this gate are currently LOW since the register is assumed to be idle and the common control is attempting to select an idle register.

The operation of the idle circuit scanner on FIG. 29 is controlled by the enabled or nonenabled condition of the HCIC AND gate connected to the X, Y, and Z stages of the scanner. The clock pulse generator is connected to one input of this gate while the other input of the gate is the HCIC inhibiting lead which determines whether or not the output of the pulse generator is to be connected through the AND gate to the counter. The HCIC lead is held HIGH during periods when the scanner is not running in order to hold the output of the gate LOW and thereby block the output of the pulse generator from the counter. The HCIC lead is made LOW when it is desired to initiate a scanning operation. The LOW on this lead puts the AND gate under control of the pulse generator thereby enabling its output pulses to be applied to the X, Y, and Z scanning stages.

This scanner is similar to that already described for the line circuit scanner of FIGS. 21 and 25 and is similar to the counter whose circuit details are shown on FIG. 2. The only difference between this scanner and the one already discussed is that it has an additional binary stage designated M and N, thereby enabling the scanner to have 24 rather than 12 operative positions. The output of the XYZ stage of the scanner is transmitted once every three counts to the ABCD stage, while the output of the ABCD stage is transmitted as a carry pulse to the MN stage. This arrangement enables the counter to have 3 by 4 by 2, or 24, operative positions.

It will be recalled from the previous discussion of FIG. 2 and the scanner of FIGS. 21 and 25 that the mode of operation for each counter stage is to have one section turned OFF and to have the remaining sections turned ON. The output of each section is taken from the collector of its associated transistor and therefore, the outputs for the ON section are LOW while the output for the single OFF section in each stage is HIGH. Each output of the scanner on FIG. 29 is fed to an associated inverting OR gate and therefore, the OR gate outputs associated with the ON sections of the counter are HIGH while the OR gate output associated with the OFF section is LOW. With this arrangement, a single stage of the scanner has one of its associated OR gate outputs LOW while the remaining associated OR gate outputs are HIGH.

The particular embodiment of the invention shown on the present drawings assumes the use of a maximum of three registers, each of which would have its associated scanning lead uniquely connected to one of the outputs of the XYZ stage of the scanner on FIG. 29. A particular register out of the plurality available is selected by the common control by making the MLR′ lead LOW together with one of the scanning leads. Thus, register 1 is connected by conductor XIC to stage X of the scanner, register 2 (not shown in detail) would be connected to stage Y by conductor YIC, and register 3 (not shown in detail) would be connected to scanner stage Z by a conductor ZIC (not shown). One of the scanning leads associated with the XYZ section of the scanner will always be LOW, and the particular lead that is LOW will determine which register is to be used at any given time. If it is desired to provide four registers, the register scanning outputs would then have to be taken from the ABCD section of the scanner in order to ensure that one, and only one, register scanning lead will be LOW at any given time. If it is desired to use more than four registers, each register would then have to be provided with two scanning leads and would then be connected to the scanner of FIG. 29 on a combinational code basis in a manner similar to that for which the line circuits are connected by means of a plurality of code leads to the scanner shown on FIGS. 21 and 25.

It has already been stated that the potential on the HCIC lead determines whether the scanner is held in a rest state, or whether it is operated under control of the clock pulse generator through the HCIC gate. The HCIC flip-flop determines the potential on the HCIC lead. The HCIC flip-flop is usually set in its RESET position, during which time its "0" stage output is HIGH. This HIGH is applied to the HCIC lead thereby inhibiting the following HCIC AND gate and holding the scanner OFF.

Figure 31:
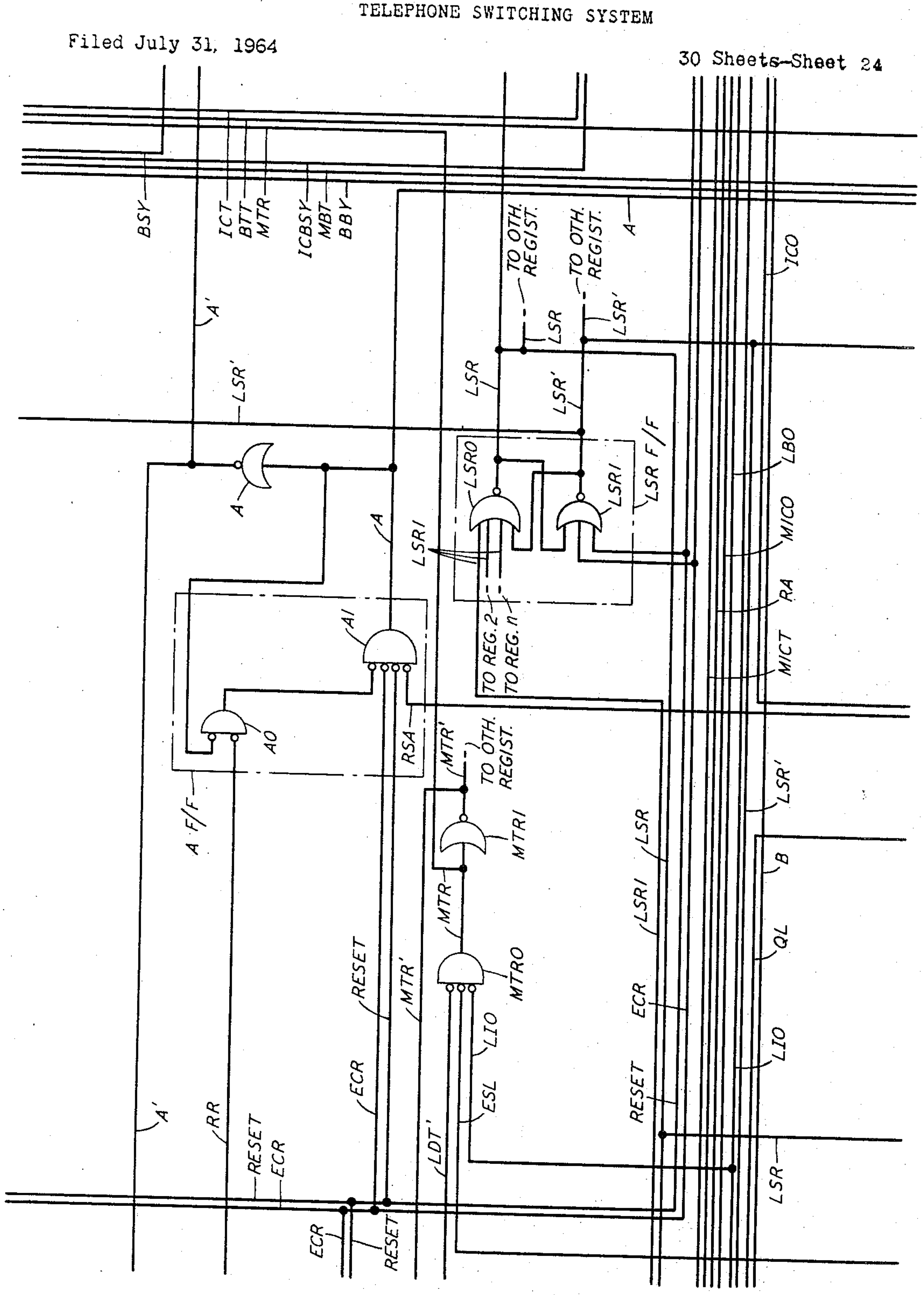

It has already been discussed how, at the time the line circuit scanner on FIGS. 21 and 25 scans line circuit 10, which is requesting service, that leads LDT′, LIO, and ESL on FIG. 31 went LOW, thereby making leads MTR HIGH and MTR′ LOW. MTR′ is connected to all of the registers and on FIG. 13 applies a LOW potential to the idle register select gate MTR. The MTR lead together with the HIGH thereon is extended to the ICSCA OR gate on FIG. 29. This HIGH is propagated through the ICSCA and ICSCC gates and a differentiating circuit, and finally appears as a positive going pulse on one input of the "0" section of the HCIC flip-flop. The other input of this portion of the flip-flop is already LOW since the flip-flop is currently set in its RESET stage. The positive going pulse applied to the input of the "0" stage turns this stage on, which, in turn, applies a LOW to the upper input of the "1" portion of the flip-flop, thereby turning it OFF. The HCIC flip-flop is now in its SET state. The LOW from the "0" portion of the flip-flop is applied to the HCIC lead, thereby, due to considerations already discussed, enabling the HCIC AND gate to start the scanner. The scanner now steps, under control of the output pulses of the clock pulse generator, and as it steps from position to position, it drives the output of the lead of the OR gate associated with its current position LOW. The XIC output lead from the scanner is connected to register 1 on FIG. 13, and therefore this lead is driven LOW at the time the scanner steps to its position X. The LOW on this conductor appears on the lower input of the MTR AND gate on FIG. 13. The SUP lead input of the MTR AND gate is held LOW at this time by the register.

All three inputs of the MTR AND gate are now LOW, thereby turning it OFF and causing its output to go HIGH. The output of this gate is applied to the MTS gate whose other input is also LOW at this time, thereby turning it ON and operating the MTS relay. The HIGH on the input of this gate is also applied to the RT lead, which extends from FIG. 13 of the register to one input of the RLTA OR gate on FIG. 29, thereby turning it ON and driving its output LOW. This low is propagated through the ITTC OR gate to turn it OFF and drive its output HIGH. This HIGH is, in turn, propagated through the SSICA and SSIC OR gates and appears as a HIGH on the SSIC lead. This lead is connected to one input of the "1" portion of the ICFF flip-flop which, as will be recalled, is set in its SET state at this time. The HIGH on the SSIC lead resets the flip-flop to its RESET condition thereby driving the HCIC lead HIGH and stopping the scanner. Thus, at this time, the HIGH and the LOW potential on the MTR and MTR' leads, respectively, together enabled the common control circuit to select register 1 in cooperation with the idle circuit scanner. The selection of register 1, in turn, operated its MTS relay and, at the same time, returned a HIGH potential on the RT lead to the common control circuit on FIG. 29, which, in turn, stopped the scanner in its position X.

Figure 33:
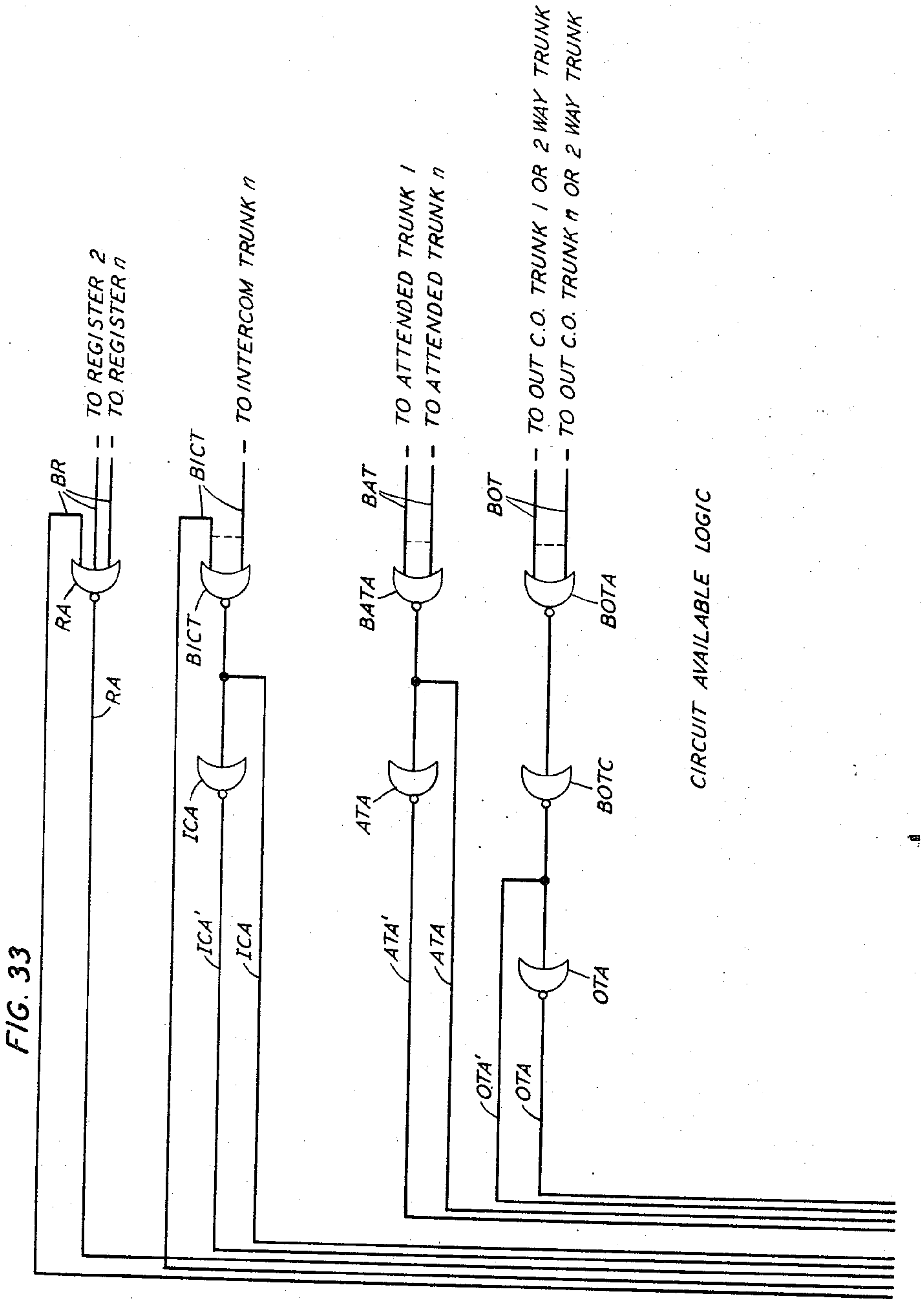

At this point, a few words might be said regarding the circuit on FIG. 33 entitled "Circuit Available Logic." This circuit comprises a plurality of OR gates whose inputs are fed by the various circuits for which the common control can bid, via the idle circuit scanner. The outputs of these OR gates are extended over various leads to different portions of the common control circuit in order to indicate to the common control whether or not there is currently an idle circuit in the various groups of circuits for which the common control may bid. Referring to the RA gate on FIG. 33, its upper input is connected to the register circuit shown on register FIG. 13. This BR lead is connected to resistance battery at any time the COLS or CTTS relays of this register are unoperated. The nonoperation of both of these relays indicates that the register is idle. Thus, a resistance battery is applied to the BR lead any time a register is idle, while a ground is applied to the lead any time a register is busy. The inputs of the RA OR gate on FIG. 33 terminates the BR leads from all registers. The BR leads having positive potentials thereon represent idle registers while the grounded BR leads represent busy registers. With this arrangement, it may be seen that the output of the RA OR gate is driven LOW any time a positive potential is applied to at least one of its inputs. A LOW on the RA output lead indicates that a register is available, while a HIGH on the lead indicates that no register is currently available. The RA lead extends from FIG. 33 to FIG. 27, where it is applied to one input of the LDTC AND gate on the portion of the mode control which controls the bidding for a register. Thus, if during the preceding description pertaining to the mode control a register had not been available, the RA input to the LIO gate would have been HIGH, and this would have by itself inhibited any further action by the common control towards connecting the calling line circuit to a register at this time.

*Register circuit*

The circuit details of one of the registers is shown on FIGS. 12, 13, and 16 through 18. The register may be functionally subdivided into a counter as shown on FIG. 16, a steering circuit as shown on FIG. 17, and a loop and loop control circuit as shown on FIG. 12. It also includes miscellaneous control circuitry as shown on FIGS. 12, 13, 17, and 18.

When a register is attached to a calling line circuit, the T, R, and S leads of the register shown on the upper right-hand portion of FIG. 22 are interconnected via the switching network with the correspondingly designated conductors of the line circuit to which the register is connected. The calling station is off-hook at this time, and therefore a loop is completed between the T and R conductors of the register extending from FIG. 22 to FIG. 12 where these conductors are further extended through make contacts of relay CTTS and through the windings of transformer T to a resistance ground for the T conductor and to a negative battery for the R conductor through the winding of the LR relay. The LR relay, in the conventional manner, monitors the loop open and closures, follows the dial pulses transmitted to the register from the calling station, and controls the operation of the register by means of its contacts. The pulses transmitted to the register are repeated by contacts of the LR relay and applied to the two-order counter shown on FIG. 16. This counter is similar to that of the line circuit scanner shown on FIGS. 21 and 25 in that it has two orders, i.e., a tens and a units order, each of which operates in accordance with the 3 by 4 code of FIG. 5. Each order has operative sections A, B, C, D, X, Y, and Z. The two orders together can register a maximum of two digits.

The units counter is driven by a gate DRVU and the tens counter is driven by gate DRVT. The input pulses generated by the pulse source are repeated by the contacts of the LR relay connected to terminal 101 on FIG. 18 and are applied over the conductor LD extending from FIG. 18 to one input on each of gates DRVU and DRVT on FIG. 16. The other two input conductors to each of these AND gates supply control potentials which together, in conjunction with the steering circuit on FIG. 17, enable and disable the DRVU and DRVT gates at the proper time so that the pulse trains representing the tens and units digits are steered into the appropriate orders of the counter.

Figure 16:
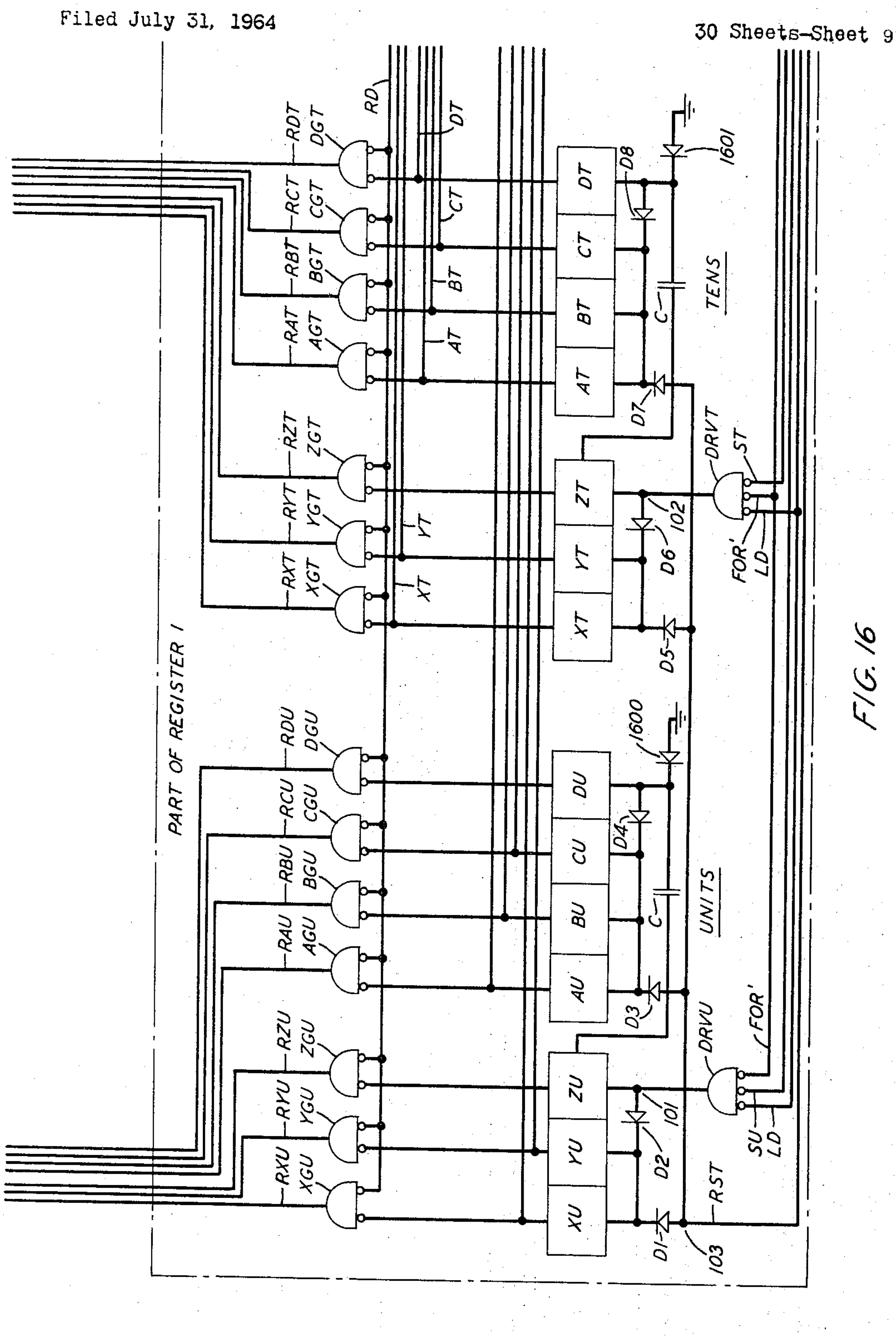

The output of each section of each counter is connected to one input of an associated AND gate on FIG. 16. The AND gates for the units counter are designated XGU through DGU while the AND gates for the tens counter are designated XGT through DGT. The other input of each of these AND gates is connected to a control conductor RD which disables and enables the AND gates at the appropriate times so as to allow the digits stored in the register to be gated through these AND gates to the outputs thereof which, in turn, are connected to the noninverting OR gates of FIGS. 21 and 25. These noninverting OR gates, in turn, gate the output of the register counters onto the line circuit code leads in the same manner that the output of the line circuit scanner can be gated onto the code leads.

Figure 17:
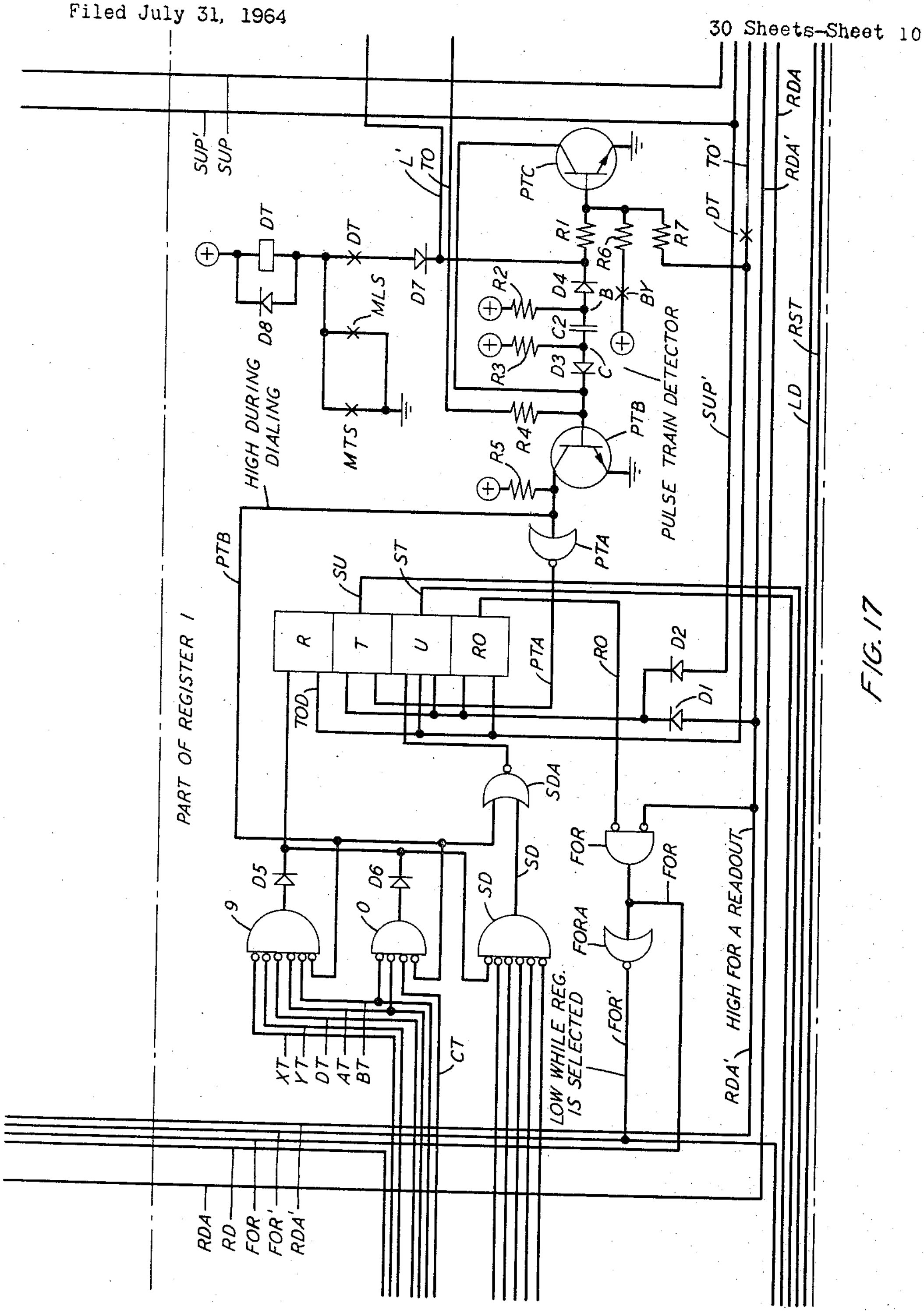

The outputs of certain sections of the register counters are connected to the inputs of the 9, 0, and SD AND gates on FIG. 17 in order to enable the register to detect the dialing of a single digit of 9 or a single digit of 0, as well as to provide an indication that the units counter has stepped out of its reset position.

The steering circuit is shown on FIG. 17 and basically comprises a four-section counter having sections R, T, U, and RO, which represent the following conditions of the register: reset, tens, units, and readout, respectively. This counter is basically similar to the counter shown in FIGS. 2 and 3, except that it has capacitive coupling only between its T and U sections and between its U and RO sections. There is no capacitive coupling between the R and the T sections or between the RO and the R sections. The conductors connected to the left portion of each counter section comprise the inputs, with each section having a plurality of inputs in the manner shown in FIG. 6. The conductors connected to the right side of the T, U, and RO sections comprise the output of each section.

When the register is in a rest state, the steering circuit is in the R, or reset state, in which the transistor of that stage is OFF while the transistor in each of the other stages is ON. This being the case, the output conductors SU, ST, and RO are LOW at this time. The TOD input conductor extending to the input of the R, the U, and the RO stages goes HIGH, as subsequently described, when a register is first seized thereby advancing the counter one step and forcing it into its T state since it is the only section whose input remains low. Thus, the transistor of the T section is then turned OFF while the transistor in each other section is turned ON. This makes the SU output conductor HIGH and the ST and RO output conductors LOW. The SU conductor extends to one input of the DRVU gate on FIG. 16 and the HIGH on this conductor at this time holds the gate ON and blocks from the input of the units counter the series of pulses received for the first digit. The ST conductor extends to the input of the DRVT AND gate on FIG. 16, and the LOW on this conductor at this time partially enables the DRVT AND gate so that the first series of pulses received by the register will be applied through this gate to the terminal 102 input of the tens counter. The FOR′ conductor extending to one input of both the DRVU and DRVT AND gates is LOW during the time the register is seized. The train of pulses representing the first digit dialed by the calling party is repeated by the contacts of the LR relay on FIG. 18 and transmitted via the LD conductor to both AND gates on FIG. 16. Only the DRVT AND gate is enabled at this time, and therefore these pulses are transmitted only through this gate and applied to the input of the tens counter, which then counts the pulses in the conventional manner in accordance with the code of FIG. 5.

At the end of the pulse train representing the tens digit, the output of the PTA gate on FIG. 17 goes HIGH, as subsequently described, and in so doing applies a HIGH signal to one input of the T section of the steering circuit. This HIGH potential turns the transistor of this section from an OFF to an ON condition and the capacitive coupling between the T and U states turns the transistor of the U section OFF in the manner described in connection with the pulse counter of FIG. 2. Thus, once the pulses have been received for the tens digit, the steering circuit advances one step whereby the transistor for the U stage is turned OFF and the transistor for each other stage either remains or is turned ON. Once this action has taken place, output conductor ST is HIGH and output conductors SU and RO are LOW. The HIGH on conductor ST extends to FIG. 16, where it disables the DRVT AND gate. The LOW on conductor SU enables the DRVU AND gate and prepares it for the reception of the next pulse train. The pulse train for the units digit of the dialed number is then received by the LR relay of FIG. 12, repeated by its contacts on FIG. 18, and applied to conductor LD extending from FIG. 18 to FIG. 16. The pulses on the LD lead do not pass through the DRVT gate since it is disabled at this time by the HIGH potential on the ST conductor. The DRVU gate is enabled at this time due to the LOW on the SU conductor, and therefore the LD lead pulses pass through this gate and are applied to input terminal 101 of the units counter which, in turn, counts the pulses of the train in accordance with the 3 by 4 code of FIG. 5.

The SD gate on FIG. 17 indicates when the units counter has stepped out of its reset position. The inputs of this gate are connected to every section of the units counter except the Z and D sections, which are associated with the reset position. Therefore, once the counter steps out of its reset state, at least one of the sections of the counter to which the SD gate is connected will have its transistor turned OFF thereby driving its output HIGH. This HIGH potential is applied to the SD gate and thereby turns it ON and drives its output LOW to the input of the SDA gate. The PTB input of the SDA gate is HIGH during the reception of a pulse train and is LOW at all other times. Therefore, once the units digit has been received, the PTB conductor goes LOW and, with conductor SD already being LOW, turns the SDA gate OFF and drives its output HIGH. The output of this gate is connected to one input of the U stage of the steering circuit and thereby causes the transistor of this stage to switch from OFF to ON. This, in turn, steps the steering circuit from its U to its RO, or readout, state. This turns the transistor in the RO state OFF and drives its RO output conducor HIGH extending to the FOR gate on the same figure. This HIGH potential turns the FOR gate ON, drives the FOR conductor LOW and, by means of the FORA gate, make the FOR′ conductor HIGH. The potentials on the FOR and FOR′ leads inform the common control that the register has received all the digits that are to be expected on the present call and instructs the common control to take whatever further action is necessary in connection with the completion of the call.

The preceding has described the operation of the counters and the steering circuit for a conventional two-digit call. The 9 and the 0 gates on FIG. 17 are provided to detect the dialing of a single digit of 9 and 0, respectively, and in turn to force the steering circuit immediately to the readout state. All inputs of the 9 AND gate, evcept for the PTB input, are connected to those sections of the tens counter, which will be in an ON condition in the event a 9 is dialed for the tens digit. Similarly, all inputs to the 0 AND gate, except for the PTB input, are connected to every section of the tens counter that will be in an ON condition whenever a 0 is reecived for the tens digit. The PTB input to each of these gates is HIGH during the reception of a pulse train and goes LOW shortly after the termination of each pulse train. Thus, if a 9 or a 0 is dialed for the first digit, all inputs to either the 9 or the 0 gate, respectively, will be LOW and thereby turn the appropriate gate OFF and drive its output HIGH. The output of the 9 and the 0 gates extends to one input of the SD gate and, additionally, extends to one input of the R section of the steering circuit. The SD gate is now turned ON from the 0 or 9 gate. This drives its output extending to the SD input of the SDA gate LOW. The other input of this gate, i.e., PTB, is already LOW, and therefore the SDA gate turns OFF and drives its output HIGH. The output of this gate is connected to one input of the U section of the steering circuit. The LOW on conductor PTB, after the reception of the pulse train, turns gate PTA OFF and thereby extends a HIGH over the PTA lead to the T portion of the steering circuit. At this time, the R, the T and the U portions of the steering circuit all have a HIGH thereon. This forces the steering circuit immediately into its readout state. The common control is then signaled via the FOR and FOR′ leads in the same manner as already described for a conventional two-digit call.

Figure 26:
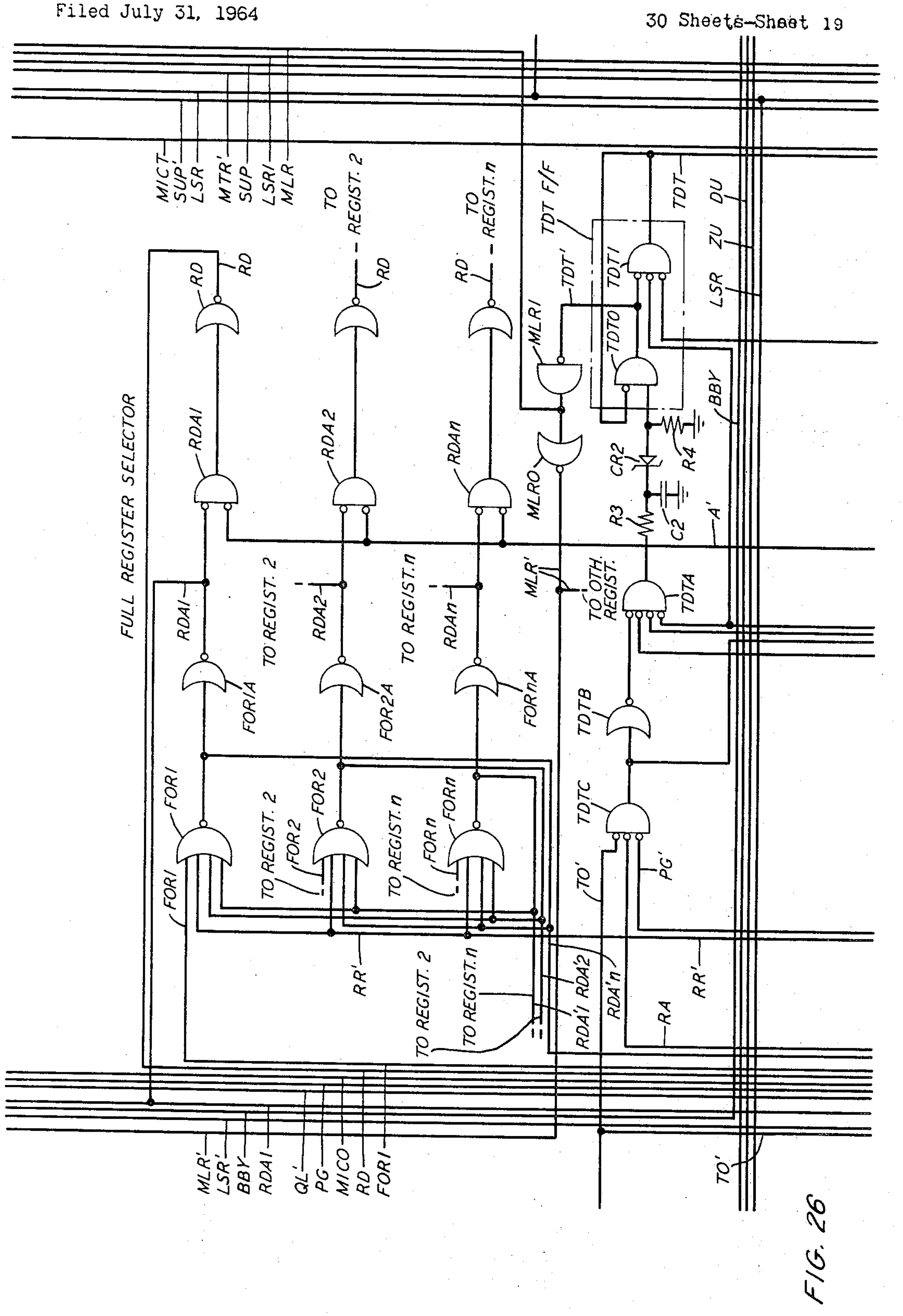

The RDA′ lead on FIG. 17 extends to FIG. 26 of the common control circuit. In a manner described elsewhere, the circuit of FIG. 26 applies a HIGH potential to the RDA′ lead extending to a register at the time it desires to read out the register onto the code leads of the line circuits. The HIGH potential to the RDA′ lead extends on FIG. 17 to one input of the FOR gate and through diode D1 extends to one input of the RO, the U, and the T portions of the steering circuit. The HIGH potential on these portions of the steering circuit forces it back into its reset condition. The HIGH potential on the input of the FOR gate holds it ON, thereby maintaining the proper potentials on the FOR′ and FOR conductors extending back to the common control circuit.

Figure 18:
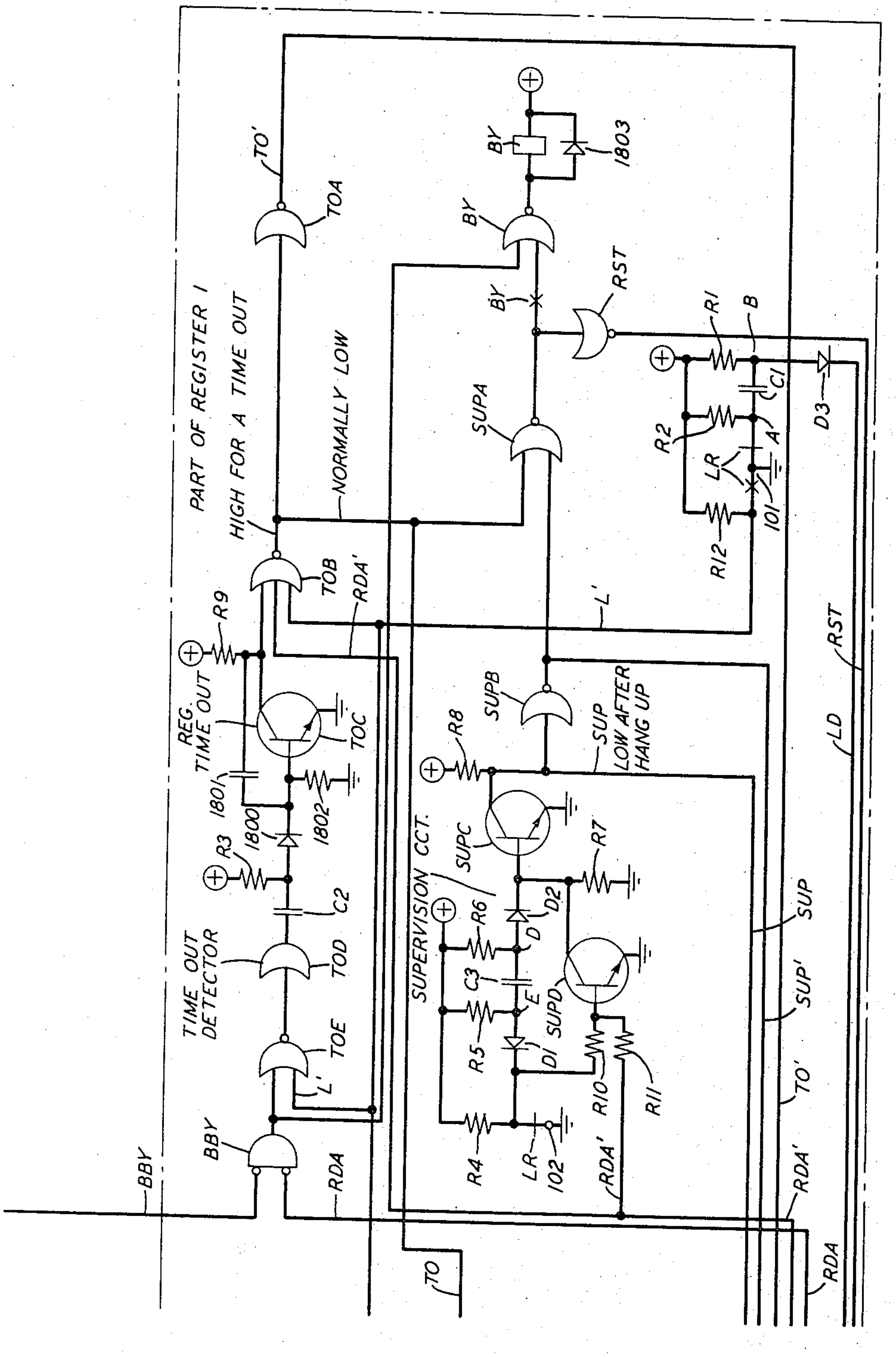

As already mentioned, the circuitry associated with the contacts of the LR relay connected to terminal 101 on FIG. 18 generates the dial pulses which are applied to the inputs of the register counters. The LR relay is normally operated once the register is connected to a calling line circuit. At this time, the break contacts of the relay connected to terminal 101 are open while the make contacts are closed. This removes the ground from terminal A and allows the positive battery potential to be applied through resistor R1 and diode D3 to the LD conductor extending to an input on each of the AND gates on FIG. 16, thereby holding them ON and their outputs LOW. The IR drop at this time across resistor R1 charges the condenser C1 so that its right plate is negative with respect to its left plate.

Relay LR alternately releases and reoperates as it follows the dial pulses received from the calling station. The break contacts connected to terminal 101 on FIG. 18 close upon each release of the LR relay and, in so doing, ground terminal A. The charge on capacitor C1 drives terminal B negative during each release of the LR relay, and this negative potential is applied through diode D3 to the LD conductor extending to the DRVU and DRVT gates. Depending upon whether the received pulses represent the tens or the units digit, one or the other of these gates will be enaabled at this time, and therefore the negative potential on the LD lead turns OFF the appropriate one of these gates thereby driving its output HIGH and stepping the associated counter one step. The subsequent reoperation of the LR relay as the pulse ends removes the ground from terminal A on FIG. 18 and, in turn, permits the positive potential to be reapplied to conductor LD thereby turning ON the appropriate gate on FIG. 16 and driving its output LOW to terminate the pulse. The circuitry of FIGS. 18 and 16 together cooperate in a similar manner for the reception of subsequent pulses so that the tens or units counter is stepped one position in response to each release of relay LR.

It has already been mentioned that the output conductor RO of the readout portion of the steering circuit is HIGH once the steering circuit has stepped to its readout position. This HIGH potential is applied to the input of the FOR gate which, by means of the FOR gate, drives the FOR′ lead HIGH extending both to the common control circuit on FIG. 26, as already described, as well as to the DRVU and DRVT gates on FIG. 16. The HIGH on this lead at this time holds gates DRVT and DRVU ON, thereby clamping their outputs LOW so as to prevent the erroneous subsequent stepping of either counter in the event that further pulses or loop interruptions should be detected by the LR relay due to attempted further dialing by the calling party or due to switchhook jiggling.

The over-all function of the circuit associated with the PTA, PTB, and PTC gates on FIG. 17 is to hold the PTB lead HIGH and the PTA lead LOW during the interval of time a pulse train is being received. The PTB lead is also held HIGH and the PTA lead LOW from the time the register is seized until the first pulse of the first digit is received. Thus, the PTB lead is held HIGH and the PTA lead is held LOW from the time the register is seized until the termination of the pulse train for the first digit. At this time, a circuit change of state occurs and the PTB lead goes LOW while the PTA lead goes HIGH until the second pulse train is received. Once the first digit of the second pulse train is received, the PTB once again goes HIGH and the PTA once again goes LOW until all pulses of this train are received, at which time the two leads once again undergo a reversal of polarity. These changes of polarity on these two leads together, as already described, control the steering circuit so that each pulse train is entered into the appropriate section of the register counter and so that the register steering circuit will be advanced to a readout state once it is ascertained that no further digits are to be received on the call.

Once the register is seized, and prior to the time the pulses representing the first digit are received, a HIGH appears on the TO′ lead on FIG. 18, as subsequently described, and is applied via the make contacts of relay DT on FIG. 17, via resistor R7, to the base of the PTC transistor to turn it ON. The HIGH on the TO′ lead is also extended to the TOD lead to step the steering circuit out of its reset (R) and into its tens position as already described. The PTC transistor in turning ON grounds the base of the PTB transistor and turns it OFF. This holds the PTB conductor HIGH and the PTA conductor LOW. The circuit remains in this condition until the first digit is dialed, at which time the DT relay releases, as elsewhere described, and removes the HIGH from the PTC transistor. Relay LR is normally operated and is held operated once the register is seized up until the time the first loop interruption occurs. The L′ conductor extending from FIGS. 18 to 17 is grounded whenever relay LR is operated. However, it does not affect the circuit functions already described since prior to the reception of the first pulse the PTC transistor is held ON by means of the HIGH on the TO′ lead.

The LR relay and the DT relay release when the first pulse of the first digit is received. The release of relay LR applies a HIGH potential to the L′ lead which, by means of resistor R1, holds the PTC transistor ON, the PTB transistor OFF, lead PTB HIGH, and lead PTA LOW. The base of the PTB transistor is effectively grounded at this time, which, in turn, effectively grounds the left plate of capacitor C2. The capacitor charges from the HIGH through resistor R2 at this time, so that its right plate is positive with respect to its left plate. Next, the L′ conductor is again grounded, once the LR relay recloses upon the termination of the first pulse. This turns transistor PTC OFF. However, the capacitor C2 holds the base of transistor PTB negative for the discharge time of capacitor C2, which time is substantially longer than the interpulse time. Therefore, transistor PTB remains OFF and transistor PTA remains ON for the length of time relay LR remains operated between the reception of two subsequent dial pulses. Relay LR releases when the second pulse is received, its make contacts open and thereby reapply a positive potential to the L′ conductor. This turns transistor PTC ON, once again grounds the base of PTB transistor to hold it OFF, and recharges capacitor C2 in the manner already described.

The circuit operations continue in a similar manner as the LR relay closes and reoperates in response to the reception of subsequent pulses of a pulse train, and the charge on capacitor C2 holds the PTB transistor OFF for the duration of time the pulse train persists. Then, once the last pulse of the first digit is received and relay LR reoperates, capacitor C2 discharges and permits transistor PTB to turn ON and, in turn, drives the PTB conductor LOW and the PTA conductor HIGH. The circuit remains in this condition until the pulses representing the second digit are received, at which time transistor PTB is held OFF once again for the duration of the pulse train, following which it is once again turned ON. This change of state of the PTB and PTA transistors controls the potentials applied to the PTA and PTB leads in such a manner that the steering circuit is advanced at the appropriate times to perform the functions already discussed in connection with the description of that circuit.

A portion of the circuitry on FIG. 18 comprises a time-out circuit which governs the action of the register in the event that a subscriber holds the register without dialing, or dials a first digit other than a 0 or a 9, and then fails to dial a second digit within a predetermined time interval. The time-out circuit on FIG. 18 measures the predetermined time interval in each instance and, upon the termination of such an interval, resets the register counters to their reset position and, additionally, forces the steering circuit of FIG. 17 into its readout position in which the common control is called back in.

Normally, the LR relay is released when the register is not seized. At this time, the L′ lead on FIG. 18 is HIGH, which causes the output of the TOE gate to be LOW and the output of the TOD gate to be HIGH. The HIGH on the output of the TOD gate, together with the IR drop across resistor R3 which holds transistor TOC, ON, charges the C2 capacitor so that its left plate is positive with respect to its right plate. Once the register is seized, the LR relay operates, grounds the L′ lead, and causes the output of the TOE gate to be HIGH and the output of the TOD gate to be LOW. This effectively grounds the left plate of capacitor C2 and, in turn, causes the negative potential on its right plate to be applied to the TOC gate to hold it OFF so that its output is HIGH.

The TOC gate then remains OFF for a period of time determined by the discharge time of the C2–R3 combination. The TOC gate will turn back ON once the charge on C2 falls to a sufficient level. The turn-on of the TOC gate drives its output LOW and initiates the circuit actions required to reset the register counters and to drive the steering circuit to its readout position. The output of the TOC gate going LOW causes the output of the TOB gate to go HIGH and turns gate SUPA ON. This turns the RST gate off and thereby drives the RST conductor HIGH. This conductor extends from FIG. 18 back to the reset circuitry of the counters on FIG. 16 and, in the manner described in connection with the counters of FIGS. 4, causes the counters to be reset in the event that they are not already in that position.

The steering circuit is forced into the readout state in the following manner on a time-out. When the output of the TOB gate on FIG. 18 goes HIGH, the output of TOA goes LOW and removes the HIGH from the TO′ lead, which at this time is connected via the make contacts of relay DT and resistor R7 to the PTC gate on FIG. 17. This causes the PTC gate to turn OFF which, in turn, turns the PTB gate ON and the PTA gate OFF. This drives the PTB lead LOW and the PTA lead HIGH so that there is now a HIGH input to the T portion of the steering circuit. Once the counters are reset, the SD gate and the SDA gate together cooperate to apply a HIGH to the U portion of the steering circuit, thereby forcing it into its readout state. The common control is then called in by means of potentials on the FOR and FOR′ leads in the manner already described.

There are several other inputs to the time-out circuit on FIG. 18 which deserve comment. The L′ lead is driven HIGH upon the reception of the first dial pulse and, at this time, it turns the TOE gate back ON, the TOD gate OFF, and stops the operation of the time-out circuit by recharging capacitor C2. There is also an L′ lead input to the TOB gate. This input is there to hold the output of the TOB gate LOW during the release time of the relay LR. This holds the RST lead LOW to prevent any timing problems in connection with the steering circuit or the pulse counters. This also ensures that the release of relay LR for a pulse will hold ON the TOB gate, keep its output LOW, and preclude the capacitor C2, which may be approaching a time-out condition, from turning the TOC gate ON and the TOB gate off. The TOB gate also has an RDA′ input which is supplied with a HIGH from the common control during the time the register is being read out. This potential inhibits the time-out circuits so that the counters will not be reset by a time-out during the time the common control is reading out the registers.

The TOE gate on FIG. 18 also has an input from the BBY gate. The function of the BBY gate is to control the operation of the register once the register is signaled by the common control that the called line is busy, that no busy tone trunks are available, and that the register should therefore provide busy tone back to the calling subscriber. The register, prior to this time, is in the condition of being read out, and therefore a LOW is on the RDA lead extending to one input of the BBY gate at this time. The BBY input to this gate is also made LOW by the common control at the time it determines that busy tone is to be provided by the register rather than by the busy tone trunk. Both inputs to the BBY gate are then LOW which makes its output HIGH. The output of this gate extends to the input of the TOE gate to turn it ON. This recharges the C2 capacitor and ends the time-out operation. The output of the BBY gate also extends to one input of the BY gate to turn it ON and operate the BY relay. The BY relay then locks up through its own contact to the output of the SUPA gate. The busy tone relay operated sends busy tone back to the calling subscriber from the tone source shown on FIG. 12.

The winding of relay BY (FIG. 18) is in series with the collector of the transistor comprising the BY gate and is part of the circuit path over which this transistor is connected to the positive supply potential. Therefore, relay BY operates whenever the transistor comprising gate BY is turned ON in response to the application of a HIGH potential to one of its inputs. As already explained, the output of AND gate BBY extends a HIGH potential to the upper input of OR gate BY to turn it ON and, in turn, operate relay BY. The operation of relay BY closes its make contacts to interconnect the output of the SUPA gate and the lower input of the BY gate. The output of the SUPA gate is HIGH at this time since both of its inputs are currently LOW, as described elsewhere in the specification. Therefore, the HIGH on the output of the SUPA gate is extended through the make contacts of the BY relay to the lower input of the BY gate. This path comprises an effective holding path for the BY relay at this time since the relay will remain operated as long as the HIGH from the output of the SUPA gate remains applied to the lower input of the BY gate.

The supervision circuit is shown on FIG. 18, and it comprises the SUPA, SUPB, SUPC, and SUPD gates. This circuit supervises the status of the register connection, as the name implies. The output of the supervision circuit tells the remainder of the register whether the calling party has hung up or whether the calling party is still on the line. This circuit functions in such a manner that the SUPC gate is held ON once the register is seized, and remains ON until a register time-out occurs after the calling party hangs up. The input to the supervision circuit comprises the break contacts of the LR relay connected to terminal 102 on FIG. 18. Prior to the time the register is seized, the LR relay is released and terminal E is grounded through diode D1 and the break contacts of the LR relay to terminal 102. Once the register is seized, the LR relay is operated and terminal E is permitted to go positive through the resistor R5. This positive potential turns the gate SUPD ON. This grounds the base of transistor SUPC and holds it OFF. This causes the output of the SUPC transistor to be held HIGH and the output of the SUPB gate to be held LOW. Capacitor C3 charges at this time in such a manner that its right plate is negative with respect to its left plate. When the LR relay releases, the E terminal is grounded and a negative potential from capacitor C3 is applied to the input of the SUPC gate, thereby holding it OFF. This maintains the output of the SUPC gate HIGH and the output of the SUPB gate LOW. When the LR relay operates again, the SUPD transistor turns back ON and by itself continues to hold the SUPC gate OFF and the SUPB gate ON.

Thus, it may be seen from the foregoing that the SUPD transistor holds the SUPC transistor OFF whenever the LR relay is operated, while capacitor C3 holds the SUPC transistor OFF for a predetermined time whenever the LR relay is released. The discharge time of capacitor C3 is such that it holds transistor SUPC OFF for the duration of time the LR relay is released during the reception of a dial pulse. However, once the calling party hangs up, capacitor C3 discharges and permits the potential of terminal D to go somewhat positive. Once this occurs, transistor SUPC turns ON, making its output LOW and the output of the SUPB gate HIGH. There is also an RDA′ input into the SUPD gate. RDA′ goes HIGH when the common control is reading out the register. This causes the SUPD gate to be held ON and holds the output of the SUPC gate HIGH so that if a person hangs up while the common control is reading out the register, the register readout will be completed before further action is taken in connection with the hang-up. The turn-on of the SUPC gate and the turn-off of the SUPB gate upon the event of a hang-up condition applies a HIGH to the SUP′ lead which is transmitted back to FIG. 17 and then, via diode D2, is applied to the RO, the U, and the T states of the steering circuit to force this circuit back into its RESET condition. The HIGH on the output of the SUPB gate is applied through the SUPA and RST gates and appears as a HIGH on the RST conductor extending to the counters of FIG. 16 to reset them to their RESET condition in the manner already described. The output of the SUPA gate going LOW at this time turns the BY gate OFF, thereby driving its output HIGH and releasing the BY busy tone relay.

The RODR and the RO gates together with the RO relay on FIG. 18 are provided for the reorder function which is used when the common control determines that a reorder tone must be sent back to the calling party connected to the register. The common control is reading out the register at the time and therefore, the RDA lead will be LOW and the RODR lead will then be made LOW by the common control thereby making the output of the RODR gate HIGH. This turns ON the RO gate and operates the RO relay. This, in turn, through the associated contacts of the relay on FIG. 12, sends a reorder tone back to the calling party. Once the RO relay operates, it closes its contacts at the input of the RO gate on FIG. 18 back to the output of the SUPC gate on the same figure to hold the relay operated. It stays operated until the output of the SUPC gate goes LOW as already described.

The following describes the circuitry on FIG. 13, which is operative to control the seizure of the register. The MTR gate on this figure has three inputs designated XIC, SUP, and MTR′. A register is seized when all three of these inputs are driven LOW to turn this gate ON. The SUP input is internal to the register and is normally LOW when the register is idle. The MTR′ lead is driven LOW by the common control at the time its desires to initiate a register seizure. The XIC input is connected to the output of the register scanner, and it is driven LOW at the time the scanner scans this particular register. The XIC conductor going LOW at a time the other two inputs of the gates are LOW turns OFF the MTR gate and drives the RT conductor HIGH. The RT conductor goes back to the common control circuit and stops the scanner in the position associated with this register, thereby causing the XIC lead to be held LOW and the MTR gate to be held OFF. The RT lead going HIGH also turns the MTS gate ON and operates the MTS relay. This relay in operating closes its make contacts connected to terminal 101 on FIG. 12, which grounds the C lead extending to the switching network. It is this ground which enables the network to identify the circuits on each side thereof which desire interconnection and which, in response to the presence of the ground, establishes a path between the circuits desiring interconnection. The CTTS relay on FIG. 13 is connected, by means of make contacts of the MTS relay, to the PG lead which extends to the network control circuit on FIG. 22. Once the switching network establishes the requested path, the network control grounds the PG conductor to operate the CTTS relay. The operation of this relay closes its make contacts on FIG. 12 to ground the sleeve lead of the register through diode D1 to terminal 102. This operates the cutoff relay on the calling line circuit, as already described. The operation of the CTTS relay also closes its make contacts on FIG. 12 to complete the calling loop for the tip and ring and thereby permit the LR relay to operate. This causes the SUP conductor to go HIGH and the SUP′ conductor to go LOW on FIG. 13. Conductor SUP goes HIGH and conductor SUP′ goes LOW at this time because of the circuit shown on FIG. 18. Conductor SUP is connected to the collector of transistor SUPC (FIG. 18), which comprises a portion of the supervision circuit. The supervision circuit is described earlier in this same section of the specification. As stated therein, the operation of relay LR opens its make contacts connected to terminal 102 (FIG. 18). This holds transistor SUPD ON and transistor SUPC OFF at this time. The OFF condition of transistor SUPC applies a HIGH to conductor SUP extending to FIG. 13. The OFF condition of transistor SUPC holds gate SUPB ON, which maintains lead SUP′ LOW extending to FIG. 18. SUP going HIGH turns ON the MTR gate and allows the MTS relay to release. SUP′ going LOW turns OFF the CTTA gate and turns ON the CTTB gate which holds the CTTS relay operated, so that this relay is now operated under direct control of the SUP′ lead from the supervision circuit of FIG. 18. The CTTS relay remains operated during the time that the register is connected to a line. The functions of the DT relay on FIG. 17 are described in the specification in the section entitled Dialing of called station digits. As stated in detail therein, the operation of relay MTS closes a path to operate relay DT (FIG. 17). Relay MTS releases when relay CTTS (FIG. 13) operates in response to the interconnection of the register with the circuit seeking its services; for example, a calling line circuit. The operation of relay CTTS closes the tip-and-ring loop which operates relay LR (FIG. 12) as soon as the register and the calling station are interconnected. The closed contacts of relay DT at this time connect the tone source of FIG. 12, through capacitor C1 to the winding of transformer T. This applies dial tone to the line. After the release of relay MTS, relay DT remains operated by means of its own make contacts and diode D (FIG. 17) which is connected to the L′ conductor. This conductor extends by means of the make contacts of relay LR to ground on terminal 101 of FIG. 18. Relay LR remains operated until the calling party dials the first digit. At this time, the first release of relay LR opens its make contacts connected to ground on terminal 101 of FIG. 18. This removes ground from the L′ lead and permits the DT relay to release. The release of this relay removes dial tone from the calling line by means of the circuit shown on FIG. 12.

The RMKR gate on FIG. 13 permits the register to be re-marked. When the common control reads out the register, it may have dismissed the register and tried to connect the calling line to an intercom trunk and have found that the trunk is busy and also that all busy tone trunks are busy. In this case, busy tone must be supplied by the register. Therefore, the common control makes the BBY and the LSR lead go LOW. At this time, the RDA lead is also LOW so that the output of the RMKR gate goes HIGH. This turns on the MTS gate and operates the MTS relay so that the register is once again marked. The calling line is then re-marked and the common control makes the connection as for a normal call and reconnects the register to this calling line for the sole purpose of providing busy tone. The circuit in the right-hand portion of FIG. 13, i.e., the CTTS and COLS contacts going to ground and the BR lead, signifies when the CTTS relay is operated and when lead BR is grounded. This goes back to the common control and indicates that the register is busy.

Figure 12:
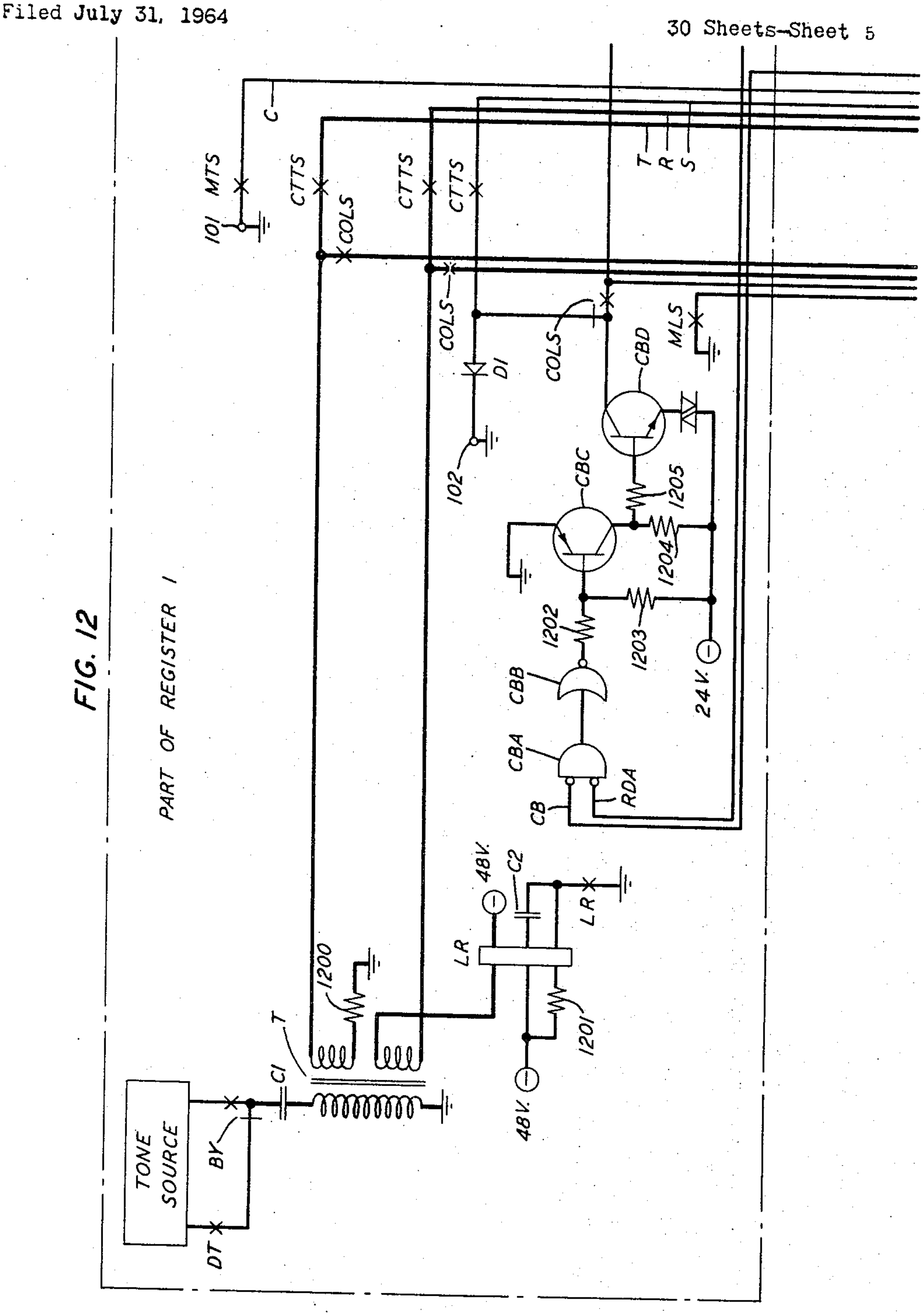

The call-back circuit on FIG. 12 comprises the gates CBA, CBB, CBC, and CBD. The purpose of this circuit is to identify the line which is connected to the register when the common control is ready to make a connection between the calling line and a called line. It does so by placing −24 volts on the sleeve lead. The common control, when it is in the process of reading out the register, has the RDA lead LOW. When it is ready to call back the line, it makes the CB lead LOW. This turns OFF gate CBA, turns ON gate CBB, and turns ON gate CBC which turns ON gate CBD. The CBC is a PNP transistor, so in turning ON it also turns ON gate CBD and applies a 24-volt negative potential through gate CBD to the sleeve lead thereby effecting a call-back operation of the calling line circuit as elsewhere described.

On calls from circuits on the trunk side of the network (right side), such as incoming trunks and attendants' trunks, the line side (left side) network appearance of an idle register must be connected through the switching network to the calling trunk circuit in order that the number of the called line may be transmited to and stored in the register. When common control determines that a calling trunk circuit must be connected to an idle register, it makes the MLR' conductor on FIG. 26 LOW and starts the operation of the register scanner of FIG. 29. Let it be assumed that register 1, shown in detail on FIGS. 12, 13, 16, 17, and 18 is to be connected to a calling trunk circuit. The SUP lead of a register is normally LOW when the register is in its idle state. This LOW potential on conductor SUP is connected to the lower input of the MLR AND gate on FIG. 13. The LOW on the MLR' lead is connected to the upper input of the MLR AND gate. Conductor XIC from the output of the scanner on FIG. 29 extends to the middle input of the MLR AND gate on FIG. 13. The XIC lead is driven LOW when the scanner advances to its state X to scan register 1.

Gate MLR on FIG. 13 turns OFF when all three of its input conductors are driven LOW. The turn-off of the MLR gate makes the RL conductor LOW extending from the output of the MLR gate on FIG. 13 to the input of the RLTA OR gate on FIG. 29. This LOW on the input of the RLTA gate stops the scanner of FIG. 29 in its X position associated with register 1, as described elsewhere in the specification. This causes the XIC conductor extending to the input of the MLR gate to be held LOW and the MLR gate to be held in an OFF state. The HIGH potential on the RL conductor is extended through resistor 1301 to turn ON the MLS transistor on FIG. 13 and operate relay MLS. The operation of the MLS relay of FIG. 13 closes its make contacts on FIG. 12 to ground the C lead extending to the line side of the switching network on FIG. 22. As already described for a call initiated by a calling line circuit, the ground on a C lead on each side of the network enables the network to identify the circuits which are to be interconnected by the network. The network responds to the presence of the C lead grounds and establishes a path between the circuits whose C leads are grounded. After the switching network has established a path between the register and a calling trunk circuit, the network shown on FIG. 22 grounds the PG conductor to operate the cut-through relay in the calling trunk circuit. The circuit of the calling trunk circuit may be assumed to be similar to that shown on FIGS. 19 and 20. The cut-through relay is CTO on FIG. 20. The operation of cut-through relay CTO in the calling trunk circuit closes its make contacts CTO on FIG. 19 to apply a ground to the sleeve conductor ITOS1 extending from FIG. 19 to the right side of the switching network on FIG. 22. Since this trunk circuit is currently connected by the network to register 1, the ground on conductor ITTS1 is extended through the network to the S conductor extending from the left side of the network on FIG. 22 to FIG. 12 of the register. This ground is further extended to FIG. 13, where it is extended through diode 1307 to the upper input of the COLS AND gate. This potential turns the COLS gate OFF. The turnoff of this gate turns ON gate COLSA and operates relay COLS on FIG. 13. The ground on the S conductor extending to FIG. 13 is also applied to the lower input of the SUPLS AND gate. This potential turns the SUPLS gate OFF since its upper input, conductor SUP, is currently in a LOW potential state. The turnoff of the SUPLS gate maintains the MLS transistor of FIG. 13 in an ON state to hold relay MLS operated.

The operation of relay COLS on FIG. 13 closes its make contacts on FIG. 12 to complete the calling loop for the T and R conduuctors of the register to permit the LR relay of FIG. 12 to operate. Relay LR in operating opens its break contacts on FIG. 18 to disconnect the terminal 102 ground from the rest of the circuit. This causes transistor SUPD to turn ON and transistor SUPC to turn OFF, as described elsewhere in the specification. The turn-off of transistor SUPC applies a HIGH potential to conductor SUP extending from FIG. 18 to FIG. 13, where this HIGH potential turns ON gates MLR and SUPLS on FIG. 13. The turn-on of gates MLR and SUPLS turns OFF transistor MLS on FIG. 13 and releases the MLS relay. The COLS relay remains operated as long as the register remains connected to the trunk circuit and the S conductor remains grounded.

The state of the LSR gate on FIG. 13 indicates to the common control whether a register is currently connected to a line side circuit or a trunk side circuit. This is required so that the common control may determine the circuit operations required to serve a call. When the information stored in the register is not being read out by the common control, conductor RDA extending from FIG. 26 to FIG. 13 is maintained HIGH by the common control. This holds gate LSR on FIG. 13 ON and makes its output conductor LSR1 LOW. Relay CTTS on FIG. 13 is currently in an operated state if the register is connected by the trunk side of the network to a line side circuit. Conductor RDA is made LOW by the common control when it reads out the information in the register. This has already been described earlier in the specification. When relay CTTS is in an operated state, and conductor RDA on FIG. 13 is made LOW by the common control, gate LSR on FIG. 13 turns OFF and makes lead LSR1 HIGH. The HIGH on the LSR1 conductor is extended to the input of the LSR flip-flop on FIG. 31. This signals the common control that the register is connected via the trunk side of the network to a line side circuit. Relay CTTS is not in an operated state whenever a register is not connected via the line side of the network to a trunk side circuit. When relay CTTS is not operated, the lower input of gate LSR on FIG. 13 is not at a LOW potential and thus conductor LSR1 stays LOW when the common control reads out the register. This indicates that the register is connected to a trunk side circuit.

The common control releases the register after it reads out the information stored in the register. The common control then attempts to establish a network connection to the called line circuit. Sometimes the called line is busy, or no path is available through the network. In this case, busy tone must be supplied to the calling circuit by the register. Therefore, the common control makes the BBY and LSR' conductors LOW on FIG. 13. The RDA conductor is currently LOW. Thus, gate RMKLR turns OFF and its output goes HIGH. This turns ON the MLS gate and operates the MLS relay, so that the line side network appearance of the register is once again marked with a ground potential. This ground potential is applied from the make contacts on FIG. 12 of the MLS relay, and extends to the C lead network appearance of the register on FIG. 22. The calling trunk circuit is then re-marked by the common control and the network control establishes a new connection between the trunk circuit and the register, so that the register may provide busy tone to the calling connection over the trunk circuits.

*Connection of register and calling line circuit*

The operation of relay MTS in register 1, as already described, closes its make contacts thereby extending a ground to the C lead on FIG. 12 of the register. This C lead extends from the register to the switching network on FIG. 22. At this time, the C lead of the line circuit 10 is grounded, via contacts of operated relay LMR and break contacts of released relay CO. The LMR relay in line circuit 10 is connected in such a manner that it is operated by the LM transistor whenever the L transistor of the line circuit is OFF, provided relay CO is unoperated. The LMR relay is not operated any time its associated L transistor is ON, or any time the CO relay in the same line circuit is operated. Thus, the network is marked on its left-hand side by the C lead representing the line circuit requesting a connection to the register, while the network is marked on its right-hand side by the C lead of an available register as selected by the common control circuit. This switching network is of the end-marked type and, as a consequence, it completes a path therethrough, interconnecting the circuits associated with the left-hand C mark and the right-hand C mark solely as a consequence of the appearance of the two ground marks, without any further assistance being required by the commmon control circuit. A network of this type is shown in the H. H. Abbott application, Ser. No. 220,832, filed Aug. 31, 1962.

The switching network shown diagrammatically on FIGS. 22 and 23 now closes a path interconnecting the T, R, S, and C conductors of line circuit 10 with the correspondingly designated conductors of register 1. The network control grounds the PG lead to the register, once it has interconnected the calling line and the register, thereby operating relay CCTS on FIG. 13 of the register. The operation of this relay closes its make contacts on FIG. 12, thereby grounding the S lead of the register. The ground on this lead is extended through the switching network to operate the cutoff relay CO of line circuit 10. The operation of this relay closes its make contacts and opens its break contacts, thereby removing the off-hook sensing circuitry of line circuit 10 from its T and R conductors and, in turn, connecting subset 10 to the T and R conductors extending to the switching network.

The removal of the off-hook sensing circuitry from line 10 interrupts the current flowing through the resistor R12 and raises the potential on terminal A thereby turning transistor L of line circuit 10 back ON. The transistor in turning ON causes its LB10 lead to go LOW. Also, the LI10 lead is LOW since the operation of the CO relay removed its connection to the collector of transistor L. By means of the LBO gate on FIG. 24, the LOW on the LB10 lead causes the LBO lead to go HIGH and also causes the LO lead to go HIGH. Also, the LOW on the LI10 lead causes the LIO' lead to go LOW, enabling the LO lead to go HIGH. The HIGH on the LO lead is extended to the scan control circuit on FIG. 28, where it is propagated through the LOO gate and appears as a LOW on the upper input of the HCLO AND gate. The other two inputs to this gate are LOW at this time, and therefore the gate is energized and drives the HCL' lead HIGH thereby starting the scanner. Assuming that no other lines are in an off-hook condition at this time, the scanner will continue to scan until it reaches its end-of-scan state, in which the Z and D portions of both the units and tens scanner are energized. At this time, all the inputs to the end-of-scan gate ESL on FIG. 25 go LOW, thereby causing the ES lead to go LOW extending to the scan control circuit. The LOW on this lead drives the ESL input to the hunt control gate HCLO HIGH, thereby causing the scan to stop. The HIGH on the output of the ESL1 AND gate on FIG. 28 is transmitted over the ESL lead and propagated through the ESLO OR gate to appear as a LOW on the ESL' lead. This LOW is extended to the input of the LDTD AND gate on FIG. 27 of the mode control circuit. The other input to this gate is LOW at this time since the LDT flip-flop is set to its SET state at this time. Both of its inputs being LOW causes the output of the LDTD gate to go HIGH and reset the LDT flip-flop to its RESET state. This, in turn, causes the LDT lead to go LOW which, by means of the LSCA OR gate on FIG. 28 of the scan control circuit together with the LSCB OR gates extending to the LSG and RLS leads of the scanner, drives these two leads HIGH. The LSG lead going HIGH removes the gating signal from the line scanner to the code lead amplifiers. The RSLS lead going HIGH resets the line scanner to its end-of-scan state. This operation serves no useful function at this time since the scanner is already in its reset condition.

The R1, R2, C1 network on the mode control circuit extending to the input of the LDTD gate serves as a delay so that the gate will not be enabled in response to the setting of the LDT flip-flop to its "0" condition until the scanner has had a chance to start scanning and step off its end-of-scan condition. If this were not the case, the lower input to the LDTD gate would immediately be driven LOW and, since the ESL' input to the gate is already LOW due to the fact that the scanner is currently in an end-of-scan condition and has not yet started scanning, the LDTD gate would immediately be turned OFF, thereby driving its output HIGH and resetting the LDT flip-flop back to its reset state and, in turn, turning off the scanner before it has even had a chance to start.

At this point of the call, the calling station is connected through the network to the idle register, the line scanner is in its reset condition, and the common control circuit is now available to receive a request from another calling line circuit, or to take whatever further action is necessary in connection with the serving of the present call.

*Dialing of called station digits*

The operation of relay MTS on FIG. 13 of the register closes an obvious circuit to operate relay DT on FIG. 17 of the register. This closes an obvious path on FIG. 12 to apply dial tone to the calling line by means of the primary and secondary windings of transformer T shown on FIG. 12. The calling subscriber, upon hearing dial tone, dials the digits representing the called station. Assuming that the present call is of the PBX type and with the PBX having 80 line circuits numbered 10 through 89, two digits are dialed at this time by the calling party. Let it be assumed that station 89 is the called station and therefore the calling party dials the digits 89. The dial impulses from the calling station are transmitted through line circuit 10, through the switching network, to the register and are applied to the upper winding of the LR relay on FIG. 12. This relay follows the dial pulses in the conventional manner and, by means of its contacts shown on register FIGURE 18, applies a positive pulse to the LD lead for each dial pulse received by the register.

The remainder of the register is elsewhere described in detail. The pulses on the LD lead are applied to the counter portion of the register shown on FIG. 16. The first digit dialed (8) is applied to and registered in the tens counter portion of this circuit, while the second digit dialed (9) is transmitted to and registered in the units portion of the register counter. By means of circuits that are described in detail elsewhere, when the two dialed digits have been received, the FOR lead of the register as shown on its FIG. 17, which was previously HIGH when the register was not full, now goes LOW thereby signifying that the register has received all the digits that are to be dialed on the call and that it is ready for further service by the common control. The steering circuit shown on FIG. 17 controls the potential of the FOR lead since the steering circuit steps to its RO state, thereby making the output of this state HIGH and, in turn, the FOR lead LOW and the FOR' lead HIGH.

*Register readout and called station selection*

The HIGH on the FOR' lead is extended to one input of the FOR OR gate on FIG. 27, while the LOW on the FOR6 lead is extended to one input of the FOR1 OR gate on FIG. 26. The HIGH on the FOR' lead is propagated through the FOR OR gate and applied as a LOW on the FOR lead extending to the mode control circuit on FIG. 27. The gates in the upper row of the mode control circuit serve register requests in the same manner as that already described for the gates immediately in the row below which serve line requests. The other input of the RRC AND gate is LOW at this time, and therefore the LOW on the FOR lead to the mode control circuit sets the RR flip-flop to the set state via gates RRB and RRA. The normal condition of this flip-flop is that it is in its reset state.

The PG' lead is LOW at this time, and therefore the FOR signal was propagated through the RRC AND gate to set the read register flip-flop to its SET state. This flip-flop remains set in this condition during the completion of the call, and is ultimately reset by a HIGH on the end-of-call reset lead ECR, which resets the flip-flop to its RESET state and returns the mode control to an idle condition. The significance of the PG′ lead is that this lead goes HIGH after the network path has been completed and remains HIGH for approximately 20 milliseconds thereafter, until the network control has recovered and is ready to accept another call. At this time, the PG′ lead goes LOW and enables another call to be handled by the system.

The setting of the RR flip-flop to its SET state drives the RR lead, which is connected to the input of the "1" stage, HIGH. The HIGH signal on this lead is extended to FIG. 31, and from there through the circuitry shown to set the A flip-flop to its SET state. This, in turn, by means of the A OR gate, causes the A′ lead to go LOW. The LOW on the A′ lead is extended back to FIG. 26 to the inputs of the three RDA– AND gates shown. The LOW on the FOR1 lead from register 1, and the LOW on the RR′ lead from the RR flip-flop from FIG. 27 enable the FOR1 gate, as the other inputs to the FOR1 gate are LOW. The HIGH on the RDA1′ lead from the FOR1 gate inhibits the FOR2 and FOR*n* gates, preventing other registers from being selected, and causes the RDA1 lead to go LOW through the FOR1A gate. Both of the inputs to the RDA1 AND gate are LOW at this time, thereby driving lead RD to register 1 LOW. The LOW on the RD lead is extended to FIG. 16 of the register, where it is further extended to one input of each of the AND gates, thereby causing the digits registered in the tens and units portions of the register counters to be gated out of the register and applied to the common control over the sets of leads designated RXT through RDT for the tens information, and RXU through RDU for the units information.

As the register being read out is connected to a line, it is considered as a trunk side register. The lower input on the LSR gate on FIG. 13 will be low since the CTTS relay is operated. Therefore, the LOW on the RDA lead causes the LSR1 lead to go HIGH. This HIGH signal propagates to turn ON the LSRO gate which causes the LSR flip-flop to be SET. This causes the LSR lead to go LOW and the LSR′ lead to go HIGH. These signals are used subsequently to indicate whether a trunk side or line side register is being read out.

It has been assumed that the called station for the present call is station 89. Both the units and tens orders of the register counter on FIG. 16 comprise each a 3 by 4 counter which operates in accordance with the code of FIG. 5, as has been priorly described for the counters comprising the line circuit scanners. An "8" is represented in this code by the letters YC while a "9" is represented by the letters ZC. Therefore, the YT and CT portions of the register 10 counter are OFF to signify a tens digit of "8," while the ZU and CU portion of the units portion of the register counter are OFF to represent a units digit of "9." Register 1 is read out by making the RD lead to the AND gates in register 1 LOW, as was priorly explained. This causes the output of the AND gates to go HIGH, unless the AND gates are held ON by the second input to the gate. The outputs of the sections of the counter that currently OFF are HIGH; the HIGH output from each section is supplied to one input of the associated following AND gate, thereby driving the output of its associated AND gate LOW. The output of each of these AND gates on FIG. 16 is connected to one input of an associated OR gate on FIG. 21 or 25. AND gates YGT, CGT, ZGU, and CGU are now turned ON, driving their outputs LOW, thereby effectively grounding leads RYT, RCT, RZU, and RCU. The grounds on these leads are propagated through the associated noninverting OR gates on FIG. 21 and FIG. 25, thereby grounding the four code leads associated with line circuit 89, namely, YT, CT, ZU, and CU. All other code leads are HIGH.

Figure 36:
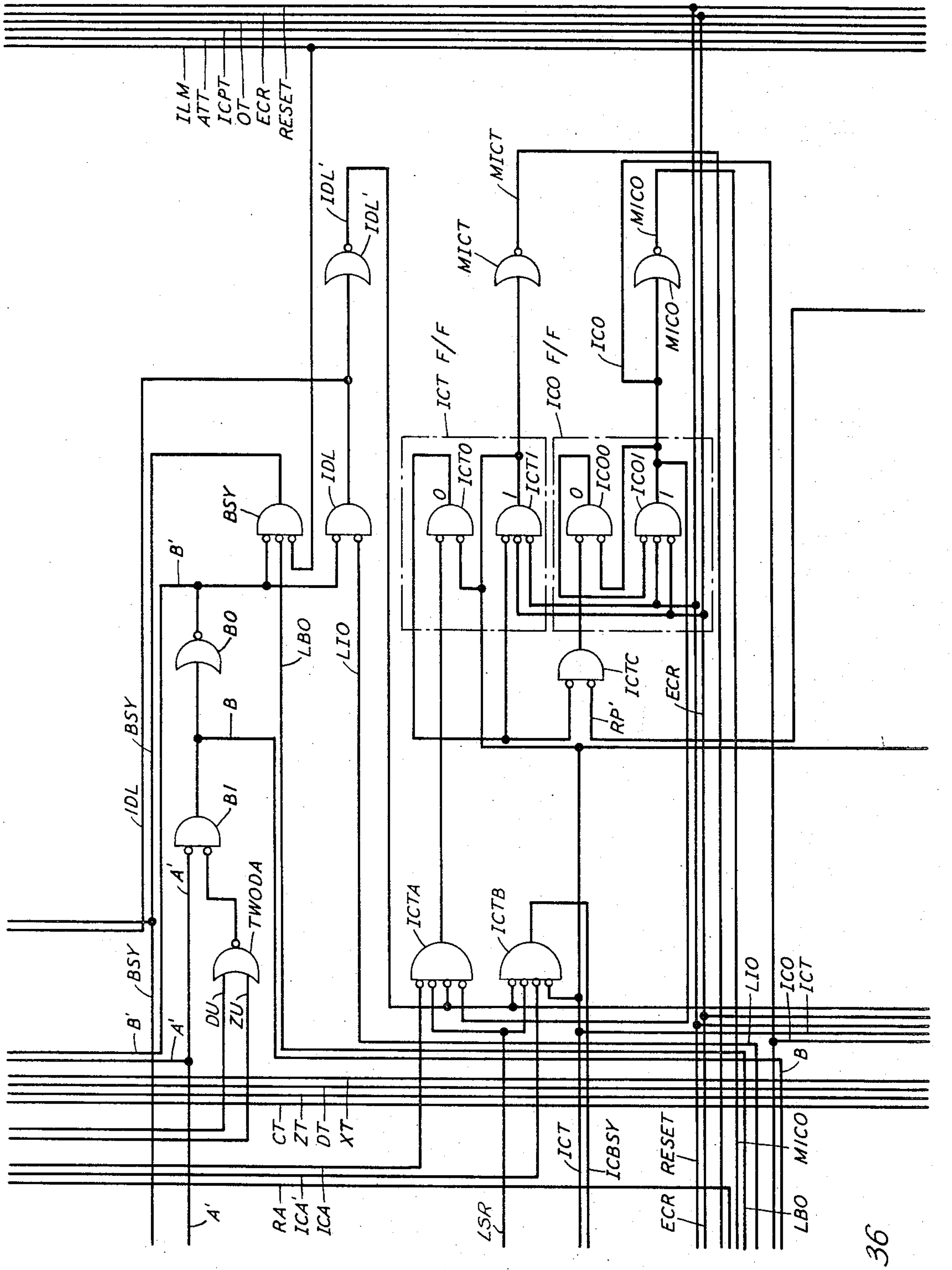

The logic circuit on FIG. 36 is provided in order to instruct the common control equipment regarding the type of call that has just been dialed. This information is obtained by examining the combination of digits dialed into the register. A single digit of "0" being dialed would indicate a dial 0 operator call, while a dial 9 call would represent a request for a central office trunk. Similarly, the dialing of the two digits 89 indicates a two-digit call of the intra-PBX type.

A determination is initially made regarding whether one or two digits were dialed by examining the output of the units portion of the register counter. Recalling that the RESET position of each order of the counter is its ZD state, it may be appreciated that if a single digit were dialed, such as a "9" or a "0," this digit would be entered into the tens counter of the register and that the units counter would still be in its RESET position. This condition, in turn, would be manifested by a HIGH on the RDU and RZU output leads of the register and, in turn, by a low potential on the ZU and DU output leads of the code lead amplifiers.

It has been assumed that two digits were dialed in connection with the present call, and therefore either one or both of leads ZU and DU will be HIGH since the units portion of the register counter will be out of its RESET position at this time. The HIGH potential on one or both of the DU and ZU leads is extended to the circuit of FIG. 36, where it is applied to the input of the TWODA OR gate, thereby maintaining the output of this gate at a LOW potential. A LOW potential at the output of the TWODA gate indicates that two digits were dialed into the register. If two digits had not been dialed into the register, the units portion of the register counter would be in its ZD state, representing the RESET condition thereof, and, accordingly, the DU and ZU leads would both be LOW and, in turn, would hold the output of the TWODA gate on FIG. 36 at a HIGH potential. However, for the present call, a "9" was dialed into the units portion of the register counter thereby advancing it to its ZC state, as a consequence of which the DU lead, but not the ZU lead, is driven HIGH, thereby driving the output of the TWODA gate LOW to signify that the units portion of the register counter has been stepped out of its RESET condition, i.e., two digits have been dialed into the register.

The output of the TWODA OR gate is connected to an input of the B1 AND gate whose other input is connected to the A′ lead. The LOW potential on the A′ lead as a consequence of the setting of the A flip-flop of FIG. 31 to its SET state, in turn, enables the B1 AND gate on FIG. 36, since both of its inputs are now LOW, thereby driving the B′ lead LOW via the BO OR gate. The LOW on the B′ lead is applied to one input of each of the BSY and IDL AND gates on FIG. 36, thereby preparing them for a busy and idle test of the called line, as is subsequently discussed.

At this time, the output of the register is gated onto the code leads of the line circuits via the code lead amplifiers of FIGS. 21 and 25. Therefore, the four code leads of line circuit 89 are at a LOW potential at this time, i.e., leads YT, CT, ZU, and CU, since the digits 89 are currently stored in the register. Only the four code leads for line circuit 89 are at a LOW potential. At least one code lead of every other line circuit is held HIGH at this time. The HIGH potential on the code leads of every other line circuit maintains the L transistors in these line circuits ON. The L transistor for line circuit 89 would turn OFF at this time since all of its code leads are grounded, except for the fact that the positive potential supplied at this time over the F lead from the source shown on FIG. 24 holds the transistor ON. The potential of the FC lead on FIG. 24 controls the source that supplies potential to the F lead extending to all line circuits. The F lead is at a positive potential when the FC lead is held positive, while the F lead is grounded through a resistor whenever the FC lead is grounded. Both inputs to the B1 AND gate on FIG. 36 are LOW at this time, as already described, and therefore the output of the AND gate is HIGH, making the potential on the B lead HIGH. The B lead extends from the output of this AND gate back to the input of the FC OR gate on FIG. 24. The HIGH potential on the B lead at this time turns the OR gate ON thereby driving conductor FC LOW and, in turn, removing the battery potential from the F lead and driving it to approximately a ground potential. The removal of battery potential from the F lead has no effect on all line circuits other than line circuit 89 since one or more of the code leads for each of these line circuits is held at a HIGH positive potential at this time from the register output gated through the code lead amplifiers. The HIGH on the code leads of all such line circuits is applied to the base of the L transistor in each such line circuit to hold the transistor ON. However, the removal of the battery from the F lead removes the sole means currently holding ON the L transistor in line circuit 89, thereby permitting it to turn OFF, since all four of its code leads are grounded at this time by means of the output of the register being gated through to the code lead amplifiers.

The turn-off of the L transistor for line circuit 89 at this time drives its collector positive. This positive potential is used by the common control circuit to determine whether the line circuit 89 is in an idle or a busy condition. If the line circuit is busy, its CO relay will be operated and the positive potential on the L collector will then be applied through the D3 diode and the make contacts of the relay SO to the LB89 conductor for line circuit 89. This positive potential is then extended to the LB89 input of OR gate LBO on FIG. 24. If line circuit 89 is idle, its CO relay will be normal and the positive potential on the L collector will then be extended through the break contacts of its relay CO and through the D4 diode to the LI89 output conductor for line circuit 89 extending to the LI89 input of the LIO OR gate on FIG. 24. Thus, the LB89 input to gate LBO will be driven positive if the called line circuit is busy, while the LI89 input to OR gate LIO will be driven positive if the called line circuit is idle. Assuming the line circuit is idle, the LIO′ lead goes HIGH, the LO lead goes LOW, and the LIO lead goes LOW.

The settng of the RR flip-flop on FIG. 27 to its SET state, as already described, drives the RR lead HIGH, extending from the "1" output of the RR flip-flop to the GC OR gate on FIG. 24. The GC lead output of this OR gate is driven LOW thereby causing the negative potential to be removed from the G lead at this time and the lead to be placed at a ground potential. This prevents any other line going off-hook at this time from interfering with the completion of a call by initiating a service request.

Referring to FIG. 36 and recalling that the B′ lead is LOW at this time, a LOW on the LIO lead turns OFF the IDL AND gate thereby driving its output HIGH. The output of this AND gate comprises the IDL lead which extends to gate circuits on FIGS. 34 and 35. If line circuit 89 were busy at this time, the HIGH on the input of the LBO gate would drive lead LBO LOW. A LOW on the LBO lead represents a line busy condition, while a LOW on the LIO lead represents a line idle condition. The LOW on the LBO lead extending to FIG. 36 from FIG. 24 would enable the BSY AND gate since the B′ lead is already LOW, thereby driving the output of this gate, which comprises the BSY lead, HIGH. The BSY lead extends to the input of an AND gate on FIG. 30, and its operation is subsequently described.

*Connection of called station to intercom trunk*

The next function of the common control is to determine whether or not an idle intercom trunk is available in the event that it is determinned that the called line is idle. The intercom trunks are connected to the trunk side of the switching network as shown on FIG. 1 and on FIG. 22. Each intercom trunk has two appearances to the switching network, and a call of the presently described type is completed by first connecting the called line circuit to one terminating end appearance of the selected intercom trunk, and subsequently by connecting the calling line circuit, via the switching network, to the originating end appearance of the selected intercom trunk thereby completing the interconnection of the calling and called stations.

The common control now makes a determination as to whether an idle intercom trunk is available. This determination is made in connection with the circuit available logic shown on FIG. 33. It operates in a similar manner to that already explained for the registers. Referring to the intercom trunk circuit, FIGS. 19 and 20, it may be seen that an intercom trunk applies a positive 24-volt potential to its BICT lead when it is idle and grounds its BICT lead, via contacts CTT or CTO, when it is busy. The BICT lead from the various intercom trunks connects to the input of the BICT OR gate shown on FIG. 33, and thus, with this arrangement, each input to the OR gate is at a positive potential if the related trunk is idle while the inputs to the OR gate associated with busy intercom trunks are grounded. It may be seen from the foregoing that, with this arrangement, at least one input to the OR gate will be at a positive potential if an intercom trunk is available, and this in turn will drive the output of the OR gate to a ground potential thereby making lead ICA LOW and ICA′ HIGH. These two leads extend from FIG. 33 to the circuitry shown on FIG. 36.

Assuming that the called line is idle, and also assuming that an idle intercom trunk is available, the IDL′ conductor on FIG. 36 goes LOW, as already described, thereby driving one input LOW of each of the AND gates ICTA and ICTB. The ICA input to the ICTA AND gate is LOW at this time, while the ICA′ input to the ITCB and gate is HIGH. The third input to the ICTA AND gate is also LOW at this time since the ICO flip-flop is set to its RESET state. The fourth input to the ICTA gate, the LSR lead, is LOW since this is a trunk side register call. Thus, the four inputs to the ICTA AND gate are all LOW thereby enabling the gate and driving its output HIGH. The HIGH signal on its output sets the ICT flip-flop to its SET state which drives the MICT lead to the intercom trunk LOW.

The setting of the ICT flip-flop to its SET state drives its "1" output HIGH thereby driving the ICT lead HIGH. The HIGH on the ICT lead is extended from FIG. 36 to the input of the ICSCA OR gate on FIG. 29 thereby driving the output of the OR gate LOW. This LOW appears as a HIGH on the output of the ICSCC OR gate and, in turn, sets the HCIC flip-flop to its SET state. The setting of this flip-flop drives its "0" output LOW, driving the HCIC input to the HCIC gate LOW and, in turn, starting the scanner in the manner described in connection with the register scanning operation.

Each intercom trunk circuit is connected, on a coded combinational basis, with certain outputs of the scanner in the same manner that the line circuits are connected to the line circuit scanner. The intercom trunk circuits are interconnected with the scanner in such a manner that each operative position of the scanner is unique to a single intercom trunk circuit. The intercom trunk circuit whose details are shown on the present drawings is interconnected, via its scan or code leads, with positions Y and A of the scanner, and therefore when the scanner is in position YA, the corresponding YIC and AIC code leads will be LOW and no other combination of code leads extending to any other intercom trunk circuit will be LOW at this time.

The scanner on FIG. 29 starts its scanning operation as soon as the HCIC lead is driven LOW, and it progresses with its scanning operation until it reaches its position YA, at which time both of the code leads extending to the intercom trunk 1 are driven LOW thereby constituting a bid for the services of this intercom trunk in the event that it is idle.

The MICT lead on FIG. 36, and extending to all intercom trunks, was previously driven LOW as a signal to all intercom trunks that a trunk bidding operation is about to begin. This MICT lead is applied to an input of the MTG AND gate on the intercom trunk circuit FIG. 19. The lower input of this AND gate is LOW at all times when the trunk is idle. The remaining two inputs to this AND gate comprise the code leads extending to the idle circuit scanner, and therefore when the scanner advances to its position YA, both of these leads are driven LOW thereby enabling the AND gate, driving its output HIGH, and operating the MT relay through its MT transistor drive. The operation of this relay extends a ground on FIG. 20 over break contacts of relay CTT and make contacts of relay MT to the ITTC lead extending to the switching network. This ground marks the network on its right-hand side as shown on FIG. 1 and FIG. 22. The turning OFF of the L transistor in line circuit 89 operated its LM transistor thereby operating the associated LMR relay. The operation of this relay, in turn, closes its make contacts to extend a ground, via the C lead of line circuit 89, to the left-hand side of the switching network. The switching network, therefore, is marked by ground potentials on its left-hand side by line circuit 89 and by a ground potential on its right-hand side by the terminating side of the intercom trunk 1. The switching network responds to the presence of these grounds as priorly described and as shown in the priorly mentioned H. H. Abbott application, Ser. No. 220,832, filed Aug. 31, 1962, and in response thereto, establishes a path therethrough interconnecting called line circuit 89 with the terminating portion of intercom trunk 1.

The network control circuit grounds the PG lead extending to the intercom trunk as soon as it has established a path between the trunk and the called line circuit. The ground on this PG lead operates trunk cut-through relay CTT, which then closes a locking path for itself under the control of the make contacts of relay MT. The operation of the relay CTT removes the ground potential from the ITTC lead thereby causing the network control to remove ground from the PG lead. The operation of the CTT relay applies a ground to the ITTS1 lead, which comprises the sleeve of the terminating side of this trunk circuit. The ground on this sleeve is extended through the switching network to the sleeve lead of trunk circuit 89, where it operates the CO cutoff relay in that line circuit. The operation of this relay, in turn, disconnects the off-hook sensing circuitry for line circuit 89 from its tip and ring conductors and connects the subset at station 89 to the tip and ring conductors now connected to the intercom trunk.

It is described earlier in this same section of the specification how conductor ICT on FIG. 36 goes HIGH when the ICT flip-flop is set to its "1's" state. The ICT conductor extends from FIG. 36 to the upper input of the ILMO gate on FIG. 37. The HIGH potential that is now on conductor ICT turns gate ILMO ON and drives its output LOW. The LOW on its output turns the ILM gate OFF to drive the ILM conductor connected to its output HIGH. This conductor extends from FIG. 37 to the lower input of the BSY AND gate on FIG. 36. The HIGH on the ILM conductor turns the BSY gate ON and prevents its output (the BSY conductor) from going HIGH. The LBO conductor extending to the middle input of the BSY AND gate is LOW at this time since the operation of the CO relay for line circuit 89 causes a HIGH to appear on lead LB89 which, in turn, causes a LOW to appear on lead LBO. The upper input of the BSY gate is LOW at this time since gate BO on FIG. 36 is currently in an ON state. Thus, the HIGH on the lower input of the BSY gate prevents the gate from turning OFF and driving its output HIGH. It is desired that its output (the BSY conductor) not go HIGH at this time since this would apply a HIGH to the BSY input of the BT flip-flop on FIG. 30. This, in turn, would present a false busy indication to the system at this time. The function of the LVI and LVB gates on FIGS. 34 and 35, respectively, both of which are also connected to the ILM lead, is subsequently described.

The enabling of the MTG AND gate on FIG. 19 drives its output HIGH, as already explained, thereby applying a HIGH potential to the ITC lead, which is connected to the ITCA OR gate shown in FIG. 29. The HIGH on the input of this OR gate drives its output LOW, thereby, in a manner similar to that already described for the register, resetting the HCIC flip-flop to its "1" state thereby disabling the scanner and stopping it in its position YA.

*Sequence timing circuit*

Figure 37:
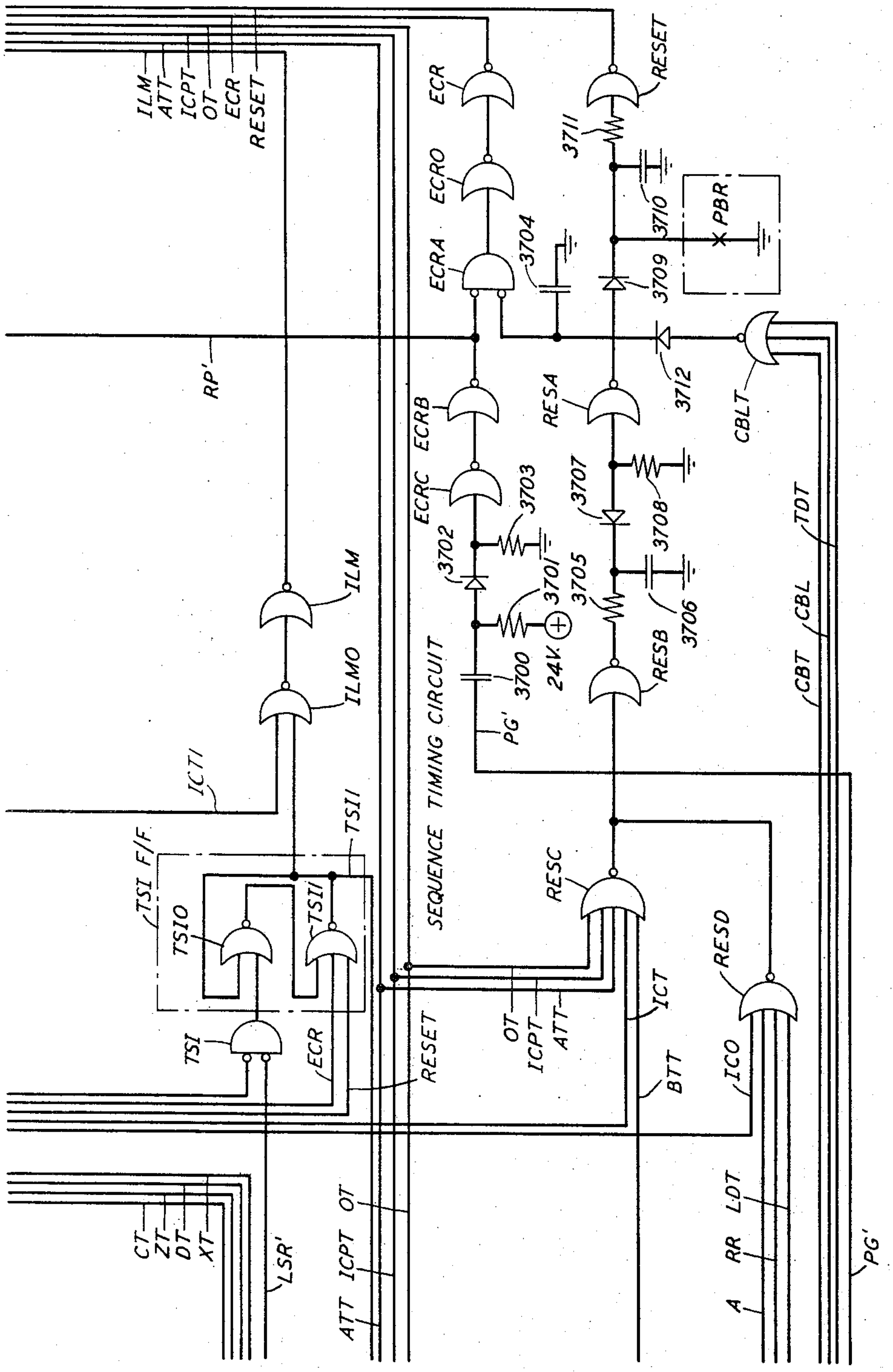

The operation of the sequence timing circuit on FIG. 37 should be considered briefly at this point. This circuitry generates signals which indicate to the remainder of the common control either the completion of the call or of certain portions of the call. The timing signals are initially generated by a signal from the switching network, which is applied to the PG lead on FIG. 20. The PG lead is grounded by the switching network at the time the requested path is completed. After the connection is cut through, the PG lead again goes HIGH. This signal is used to indicate that this portion of the call is completed and that the common control may proceed with the serving of the next portion of the call. The PG lead on FIG. 20 goes through the PGO OR gate on FIG. 27 and then via lead PG1 to a pulse generating circuit on FIG. 37 which is used to generate a negative-going pulse on the RP′ lead. This signal on the RP′ lead is applied to the circuitry of FIG. 36, where it indicates that the terminating end of the intercom call has been completed and that the originating end should now be completed.

The negative-going pulse on the RP′ lead is applied to one input of AND gate ICTC on FIG. 36. The other input of this AND gate is LOW at this time since it is connected to the "O" portion of the ICT flip-flop, which is now set into a SET state. Therefore, the AND gate is now enabled, since both of its inputs are LOW, thereby driving its output HIGH and setting the ICO flip-flop to its SET state. The setting of this flip-flop initiates the circuit actions required to connect to the originating portion of the same intercom trunk to which a connection has just been made to its terminating portion.

The MICO lead on FIG. 36 is now LOW since the "1" output of the ICO flip-flop is HIGH. The LOW on the MICO lead drives one input of the MOG AND gate LOW on FIG. 19. The other two inputs are already LOW, since they are the same idle circuit scan leads that were driven LOW during the scanning of the MTG gate.

*Callback of calling line*

Calling line circuit 10 cannot be immediately connected with the originating end of the intercom trunk for two reasons. First of all, this line circuit is currently still connected to the register and, secondly, since the common control serves a plurality of line circuits, it has no way of identifying the calling line circuit in order that the line circuit may, in turn, supply a mark to the network to complete a path therethrough to the intercom trunk. Therefore, as is described in the subsequent paragraphs, the common control now initiates a register call-back operation, by means of which the register supplies a potential through the network to enable the common control to identify the calling line circuit, after which the common control releases the register and takes the further action necessary to connect calling line circuit 10 to the originating end of the intercom trunk.

Figure 32:
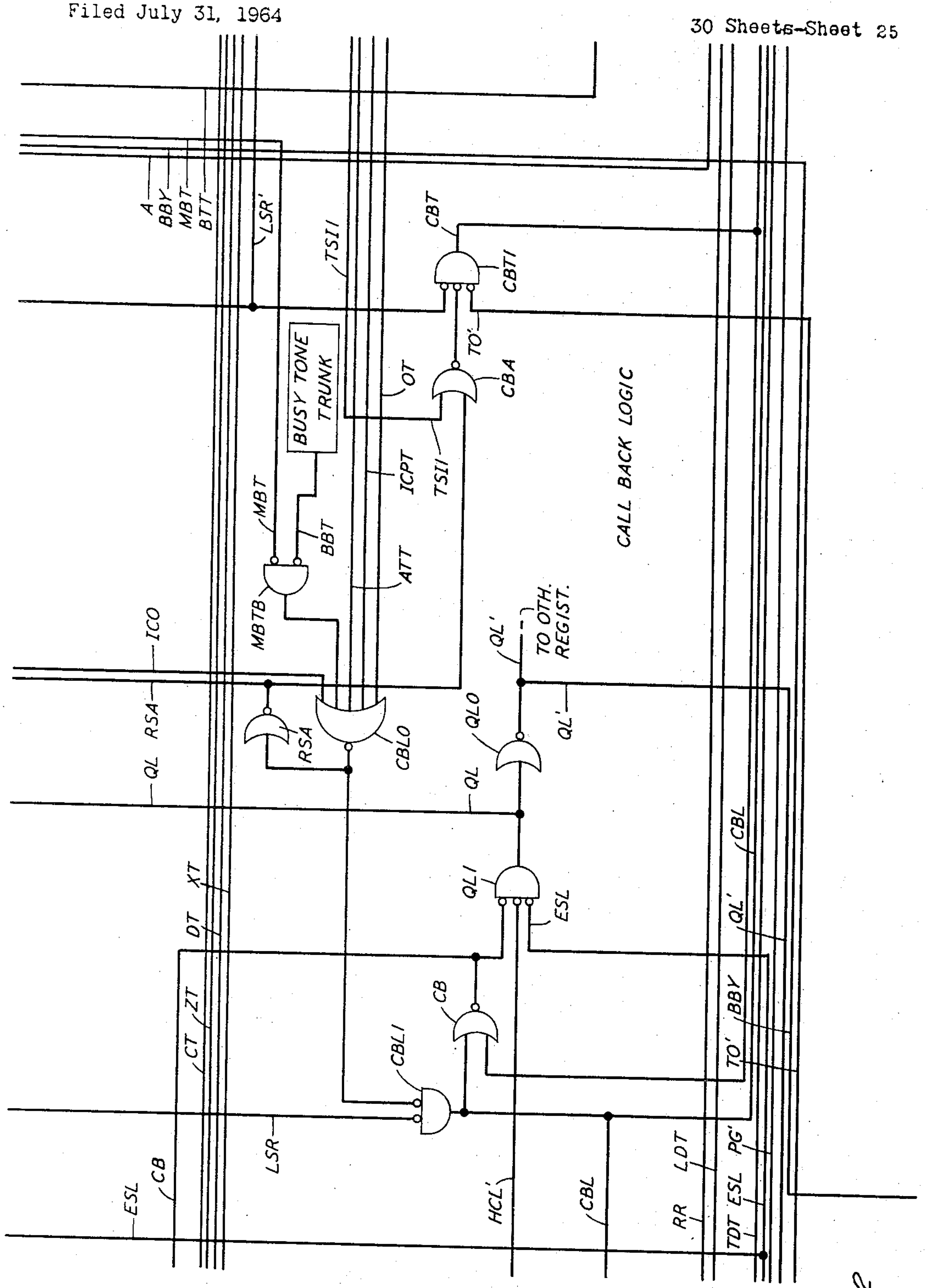

The call-back logic circuit is shown on FIG. 32. It will be recalled, in connection with the preceding description, that the ICO flip-flop on FIG. 36 has been set to its SET state thereby driving the output of its "1" state HIGH.

This HIGH output is connected to the ICO lead extending from FIG. 36 to the input of the CBLO OR gate shown on FIG. 32. The input of this OR gate going HIGH drives its output LOW. Its output is connected to the CBL1 AND gate. As this is a trunk side register call, LSR is also LOW thereby causing the CBL lead to go HIGH and the CB lead to go LOW through the CB gate. The LOW on the CB lead extends to the register circuit, where it is applied to one input of the CBA AND gate whose other input is lead RDA, which comes from FIG. 26 of the common control. At this time, the RDA lead is also LOW, and therefore both inputs to the CBA AND gate on FIG. 12 are LOW, thereby enabling it and driving its output HIGH.

The output of the CBA AND gate going HIGH on FIG. 12 of the register drives the output of the following CBB OR gate LOW. This output was formerly HIGH, or at a HIGH positive potential, and therefore the lowering of the output of this gate to ground effectively drives the base of the CBC transistor more negative thereby allowing it to turn ON. The turn-on of this transistor effectively grounds its collector thereby turning ON the following CBD transistor. The turn-on of this transistor, in turn, applies the negative 24-volt supply through the varistor and through the emitter collector circuit of the transistor, through the break contacts of the COLS relay and the make contacts of the CTTS relay to the S lead of the register. The S lead of the register is connected through the switching network to the calling line circuit 10 at this time and therefore, the negative potential on the register S lead is applied to the sleeve lead of line circuit 10. This negative potential is extended through the resistor R8 and the diode D5 of the line circuit to drive point A to a ground or to a slightly negative potential.

In the meantime, the LOW potential on the output of the CBLO gate causes the output of the RSA gate to go HIGH. This HIGH extends to the A flip-flop on FIG. 31 thereby resetting it to its RESET state. The output of the "1" portion of the A flip-flop is now LOW, thereby making the A′ lead extending to the full register select circuit on FIG. 26 HIGH. The HIGH on this lead disables the RDA1 AND gate thereby making its output LOW and the potential on its RD lead HIGH. The HIGH on the RD lead, which extends to FIG. 16 of the register, disables the output gates of the register counter, thereby removing the output of the register from the code leads of the line circuits via the code lead amplifiers on FIGS. 21 and 25.

The HIGH potential on the A′ lead on FIG. 31 is also extended to FIG. 36, where it is applied to one input of the B1 AND gate, thereby turning the AND gate ON and driving its output LOW. This output is connected to the B lead, which extends back to FIG. 24 where it is applied to one input of the FC OR gate thereby driving its output HIGH. The HIGH potential on this OR gate is applied to the FC lead, which, in turn, controls the potential applied to the F lead extending to all line circuits from the common control. The operation of this circuit is such that the HIGH potential now applied to the FC lead causes the positive voltage to be reapplied to the F lead extending to all line circuits. The negative potential formerly supplied from the G lead on FIG. 24 has been priorly removed, under control of the RR lead, in order to prevent any requests from other line circuits at this time. The loss of the negative potential on the G lead to line circuit 10 is of no consequence since its cut-off relay is currently operated.

As a partial review, it should be mentioned at this time that the battery potential was removed from the F lead in connection with the readout of the register information. During that time, the code leads of all but the called line circuit, i.e., called line 89, were HIGH, thereby maintaining the L transistors in all these line circuits ON. The four code leads for line circuit 89 only were grounded by the register output thereby permitting its L transistor to turn OFF. Now, as the register call-back operation takes place, the battery is reapplied to the F lead thereby turning back ON the L transistor in called line circuit 89 and, simultaneously therewith, driving lead RD to the register HIGH in order to disconnect the output of its counters from the line circuit code leads. Thus, for a moment anyway, the L transistor in every line circuit is held ON under control of the battery on the F lead. Negative 24 volts is not reapplied to the G lead in order to prevent the off-hook sensing circuitry in any other line circuit from initiating a service request at this time. Next, as previously described, the register applies the negative potential to its S lead which, in turn, is transmitted to the S lead of the calling line circuit.

The CB lead on FIG. 32 is now LOW, thereby making the CBL lead, extending to FIG. 28, HIGH. The HIGH on this lead drives the output of the LSCA OR gate LOW, thereby making the LSCA input to the HCLO hunt control gate LOW. The ESL input to this gate is LOW from the positive pulse generated from the LSCC gate as was priorly discussed in the discussion of the line dial tone mode. The line scanner is gated onto the code leads at this time by the HIGH on the RLS–LSG lead. Since the scanner is in the end-of-scan state, all L transistors will be ON. LB10 is at a LOW potential, and this potential extending through the LBO, LBO′, LO, and LOO gates will cause LOO to be LOW.

The line scanner is now in its RESET position, and the gating of the scanner output onto the code leads holds the L transistor ON in each line circuit as described priorly for the line scanning operation. The battery on the F lead also maintains each L transistor, except for that of line circuit 10, in an ON condition. The negative potential applied by the register over its S lead back to line circuit 10 offsets the battery from the F lead and thereby leaves its L transistor in an ON condition solely under control of the line scanner. Thus, at this time, the transistor of every line circuit other than line circuit 10 is held ON by both the F lead potential and the output of the scanner on the code leads. The transistor of line circuit 10 is held ON only from the scanner output, since its F lead potential is canceled by the negative voltage on the S lead from the register. Once the scanning operation starts, as subsequently described, the F lead potential holds the transistor ON in each line circuit other than line circuit 10 as each line circuit is scanned. However, since the L transistor of line circuit 10 is held ON solely by the output of the scanner, it turns OFF when it is scanned. Thus, at this time, all the inputs to the hunt control gate are LOW thereby enabling it and starting the scanner, via a LOW on the HCL lead, in the manner previously described. The scanner now proceeds with its scanning operation and stops when it reaches the position associated with line circuit 10, at which time a ground is applied to the code designated XT, AT, XU and DU. The grounds on these four leads turn transistor L of line circuit 10 OFF, thereby driving the top input of the hunt control gate HIGH and stopping the scanner in the position associated with line circuit 10.

*Disconnection of register from calling line circuit*

Now that the calling line has been identified by the scanner, the register must be disconnected from this line circuit so that the line circuit may be, in turn, connected to the originating end of intercom trunk 1, whose terminating end already has been connected to called line circuit 89. The circuitry on the lower portion of FIG. 32 controls the disconnection of the register from the calling line circuit at this time. The QL1 AND gate shown on this figure has three inputs, namely, CB, ESL, and HCL′. HCL′ is LOW at this time since the scanner is stopped; ESL is LOW since the scanner is not in the end-of-scan state; while CB is LOW because the ICO flip-flop on FIG. 36 is set to its SET state. Thus, all of the three inputs of this AND gate are LOW, thereby enabling the AND gate in driving its output HIGH. This makes the QL lead HIGH and the QL' lead LOW. The LOW on the QL' lead extends to the register FIG. 13, where it enables the QL AND gate, since RDA is also LOW at this time, thereby by means of the CTTA and CTTB OR gates causing relay CTTS to release and, in turn, releasing the register. The release of the register removes its connection, via the switching network, to the calling line circuit and, in turn, removes the negative potential from the S lead of calling line circuit 10.

*Connection of calling line circuit to intercom trunk*

Simultaneously with the release of the register, the HIGH on the QL lead on FIG. 32 is extended to FIG. 24 to drive the output of the FC OR gate LOW thereby making the potential on the FC lead LOW. The LOW on this lead, by means of the F lead control circuitry, removes battery from the F lead and places it at approximately ground potential. The removal of battery from the F lead at this time prevents the L transistor in calling line circuit 10 from turning back ON when the negative potential is removed from the S lead of this line circuit. The LOW on the FC lead at this time is propagated through the FCO gate to cause a HIGH input on the HCLO gate. This locks up the scanner in the position it is in, no matter how the LOO lead may change while line 10 is being connected to the intercom trunk.

The disconnection of the register from line circuit 10 together with the consequent removal of the negative potential from the line circuit's S lead causes its CO relay to release. The release of this relay closes its break contacts thereby extending a path to ground through make contacts of relay LM to the C lead of the line circuit. The LMR relay is operated at this time since, under control of its drive transistor LM, it operates whenever transistor L is OFF, provided that the CO relay is released. Thus, the switching network is now marked on its left-hand side by the C lead of the calling line circuit that is to be interconnected with the originating end of the intercom trunk, i.e., trunk 1, whose terminating end has already been connected to called line circuit 89.

It was previously described how the setting of the ICO flip-flop on FIG. 36 to its "0" state drove the output of its "1" state HIGH and, in turn, the potential on the MICO lead extending from FIG. 36 to the intercom trunk on FIG. 19 LOW. The MICO lead is connected to the MOG AND gate whose other two inputs comprise the connections to the trunk and register scanner of FIG. 29. The scanner is still in its position XIC and AIC, which position uniquely identifies this intercom trunk circuit, and therefore these two scanning leads are LOW. Thus, the three inputs to the MOG AND gate are LOW, thereby making its output HIGH and turning ON the MO transistor to operate the MO relay. The MO relay, in operating, extends a ground through break contacts of relay CTO, makes contacts of relay MO, to the ITOC lead extending to the switching network. The ground on this lead comprises a mark for the switching network. The network is now marked on its left-hand side by the C lead of calling line circuit 10 and on its right-hand side by the ITOC lead representing the originating end of intercom trunk 1. It now proceeds to establish a path therethrough interconnecting line circuit 10 with the originating side of intercom trunk 1. The network control now makes the PG lead of the intercom trunk HIGH, thereby operating its relay CTO on FIG. 20 through the make contacts of relay MO, which was priorly operated. The operation of relay CTO grounds the ITOS1 lead through its make contacts. This lead comprises the S sleeve lead for the originating side of the trunk and is now connected, via the switching network, to the S lead of calling line circuit 10 thereby operating the cutoff relay in line circuit 10. The operation of this relay connects the calling subset to the originating loop of the intercom trunk circuit provided by transformer T on FIG. 19. The current now flowing over this loop turns the SUP gate on FIG. 19 OFF thereby driving its output HIGH. This holds transistor MO ON momentarily, via elements C1, R1, and D1, which, in turn, holds the MO relay operated for the same length of time.

The operation of relay CTO of FIG. 20 also opens its break contacts to turn the MTG gate on FIG. 19 ON, thereby making the ITC lead to the common control go LOW. The closure of the make contacts of relay CTO at this time also provides a path to hold relay MT operated through the make contacts of relay MT and resistor R2. The LOW signal on the ITC lead of the common control circuit serves no useful function at this time.

The operation of the cutoff relay in calling line circuit 10 removes the ground mark to the switching network on the C lead, while the operation of relay CTO in the intercom trunk removes the ground mark on the ITOC lead thereby removing the C lead mark to the switching network for the originating end of this trunk. The network control responds to the removal of the C lead marking grounds and, in turn, removes the ground from the PG lead extending to the intercom trunk, and also from the same PG lead extending to the common control. The HIGH on the PG lead to the common control on FIG. 27 produces a negative going pulse on the RP' lead on FIG. 37, as priorly described. The CBL lead on FIG. 32 is HIGH, causing the output of the CBLT lead to be LOW. After a delay generated by the diode and capacitor, the delayed input to the ECRA gate goes LOW, and therefore the negative going pulse on the RP' lead enables the ECRA AND gate, driving its output HIGH. This HIGH is propagated through the ECRO and SCR OR gates and appears as a HIGH on the ECR lead. The HIGH on this lead constitutes a signal to the common control, informing it that it has completed all the functions required of it in connection with the serving of the present call. The HIGH on this lead is extended to FIG. 36 to reset the ICO and ICT flip-flops to their RESET state. This lead is further extended to FIG. 27 to reset the RR flip-flop to its RESET state. The resetting of the aforementioned flip-flops effects the necessary circuit actions within the common control so that it will be reset to its normal or idle state, in which it awaits subsequent service requests pertaining to other calls. Included in these circuit actions are the driving of the CBL lead LOW extending from FIGS. 32 to 28, thereby making the RLS–LSG lead LOW, which removes the line scanner from the code leads and resets the scanner to the end-of-scan state. The driving of the CBL lead LOW on FIG. 32 drives conductor CB HIGH extending from FIG. 32 to the upper input of the CBA AND gate on FIG. 12. This HIGH turns ON the CBA gate. The turn-on of the CBA gate turns OFF the CBB gate, which turns OFF gate CBC. The turn-off of gate CBC turns OFF gate CBD.

The operation of relay CTO in the trunk circuit applies steady ringing to the terminating line from the PR lead on FIG. 19, via the make contacts of relays MO, CTO, and MT. Ringback is returned to the originating line through capacitor C2 and the make contacts of relay MT. About one second after the SUP gate on FIG. 19 turned OFF, capacitor C1 is charged enough to reduce the current from the SUP gate into the base of the transistor MO sufficiently so that the MO relay releases. The release of the MO relay changes the ringing signal applied to the terminating line from a steady ringing to an interrupted ringing. It also connects the output of the SUP gate to the input of transistor CTO. Since the SUP gate is OFF, its output is HIGH thereby turning transistor CTO ON and holding relay CTO operated.

When the called line goes off-hook as it answers the call, loop current then flows in the called loop through the secondary of the transformer T on FIG. 19. This makes terminal 1901 sufficiently negative to turn transistor MT OFF to release relay MT. The release of relay MT opens the ringing path as well as the ringback path.

The intercom trunk is now connected to the terminating and originating lines, relay CTO and CTT are operated, relays MO and MT are released, leads MICO and MICT are HIGH, and leads ITC and BICT are LOW.

If the terminating line goes on-hook, this has no effect on the trunk circuit. If the originating line goes on-hook at any time after the SUP gate has turned OFF (the originating loop has been completed), gate SUP turns ON, thereby releasing relay CTO. The release of relay CTO releases relay CTT, thereby restoring this trunk to its idle state.

*Dial 0 and dial 9 calls*

Figure 34:
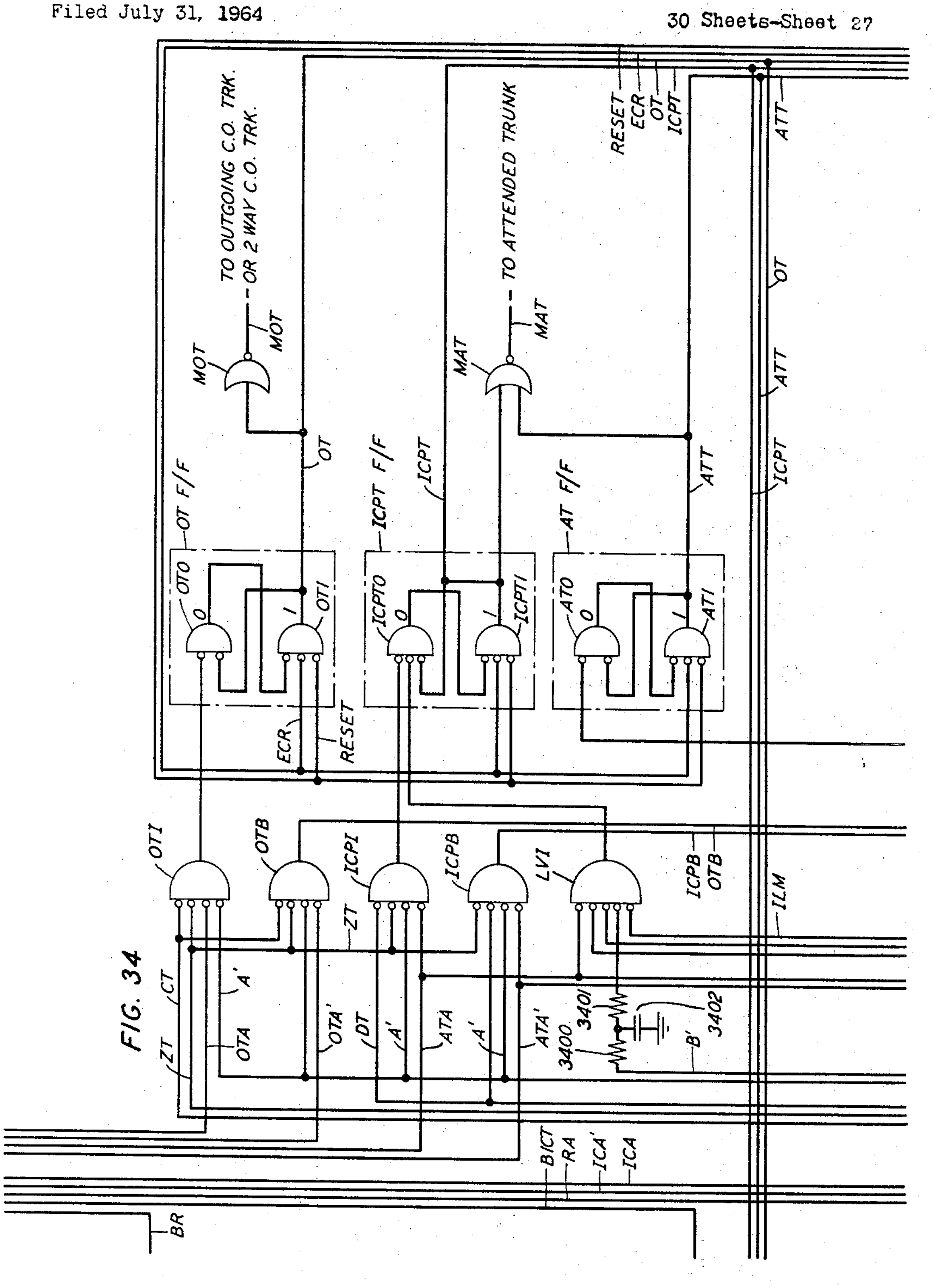
Figure 35:
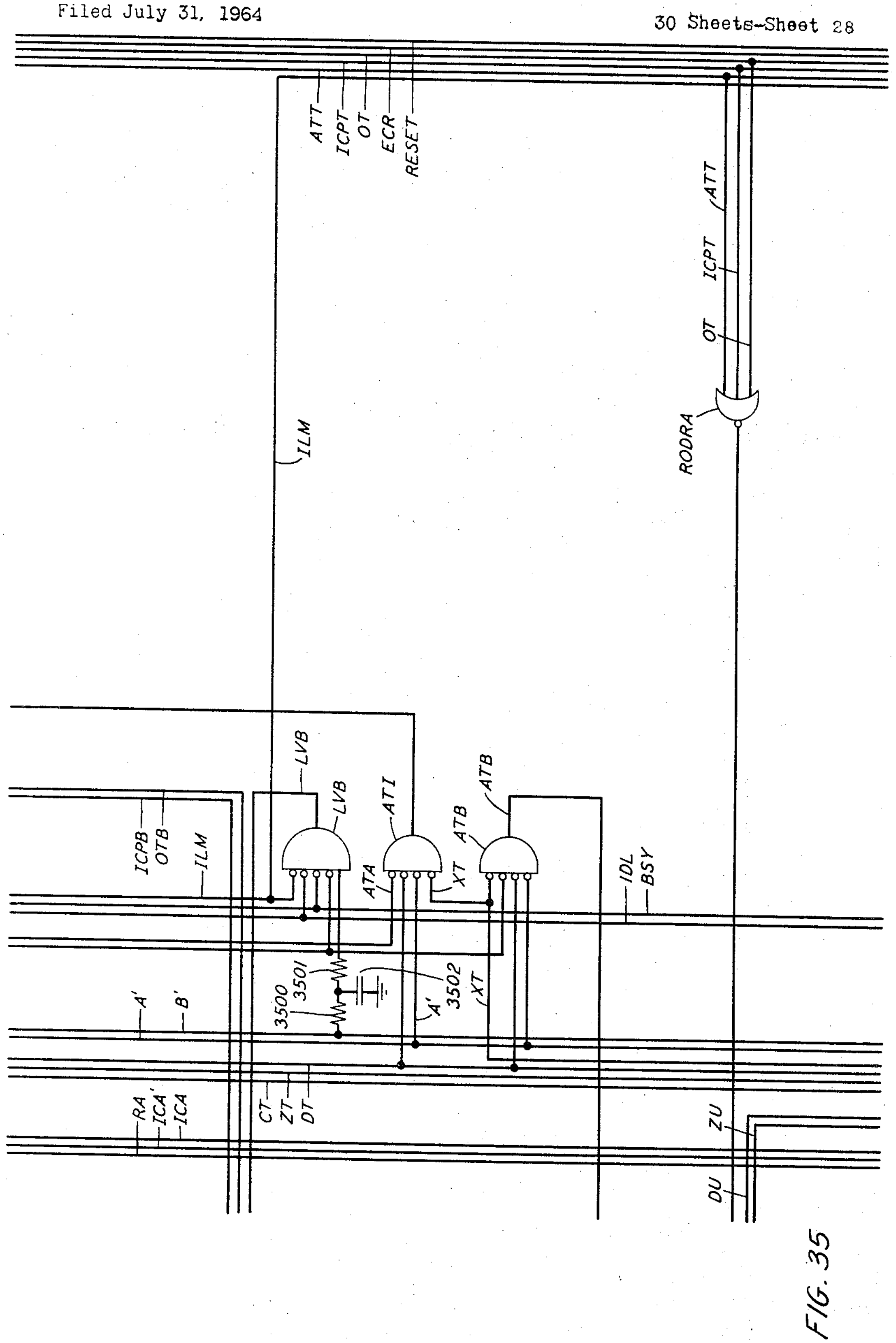

The following discussion initially pertains to FIGS. 34 and 35. This circuit is a part of the call complete control circuit and is used in the serving of dial 9 outgoing trunk calls and dial 0 and intercept type calls. Discussing first the dial 9 outgoing trunk type of call, the OT flip-flop is normally reset to its RESET state. For a dial 9 call, only the digit 9 is dialed and entered into the tens counter of the register, and no digits are entered into the units portion of the register counter. The "9" is manifested by a LOW on the C and Z portions of the counter. The register is designed to recognize a single digit "9" or "0" dialed into it and immediately make a service request without waiting for a second digit. The HIGH signal on the FOR1 lead causes the mode control to go into the read register mode and gate the register output onto the code leads, as in the two-digit intercom call. Therefore, the A and LSR flip-flops on FIG. 31 are in their SET state. The CT and ZT leads extend to FIG. 34 to the inputs of the OTI AND gate whose other two inputs are LOW at this time. Of these other two inputs, the OTA input is LOW to indicate that an outgoing trunk is currently available. The LOW on this lead is present as a consequence of a HIGH on one of the inputs to the BOTA OR gates on FIG. 33. The A′ input to the OTI AND gate of FIG. 34 is LOW since the A flip-flop on FIG. 31 is set to its SET state, during which time its "1" input is HIGH. The OTI AND gate is therefore enabled at this time, thereby driving its output HIGH and setting the OT flip-flop to its "0" state. The HIGH on the "1" output portion of the OT flip-flop is fed to the MOT gate on FIG. 34, thereby driving the MOT lead LOW. The LOW on the MOT lead constitutes a bid for the services of an idle outgoing trunk in much the same manner that the LOW on the MICT lead comprised a bid for the services of an intercom trunk. Subsequently, in a manner similar to that described for the intercom trunks, the common control initiates a scanning action to select a particular one of the idle outgoing trunks. The selected trunk applies a ground on its associated C lead on the trunk side of the switching network marking the trunk. The HIGH on the "1" side of the OT flip-flop is propagated on the OT lead to the CBLO OR gate. This causes a register call-back operation to be initiated, as was discussed priorly, with the completion of the originating portion of the intercom call. By a similar means, the calling line is marked and a connection is completed through the switching network between the calling line and the outgoing trunk.

If no outgoing trunks were available at the time the "9" in the tens portion of the register was read out, the OTA lead from FIG. 33 would be HIGH and the OTA′ lead would be LOW. This, in turn, would enable the OTB AND gate on FIG. 34, thereby giving a HIGH on the OTB lead which extends to the BT AND gate on FIG. 30. This will result in the station being connected to a busy tone trunk, the operation of which will be discussed subsequently.

Let it next be assumed that the calling subscriber had dialed a "0" in order to reach the attendant. In this case, a "0" will be stored in the tens portion of the register counter and no digits will be entered into the units portion of the register counter. The digit "0" is manifested by an "X" and a "D," and therefore the XT and the DT leads from the code lead amplifiers on FIGS. 21 and 25 are LOW at this time. The XT and DT leads extend to FIG. 35, where they cause LOW potentials to be applied to two inputs of the ATI AND gate. One of the two remaining inputs of this gate is the A′ lead, which is LOW at this time since the register is being read out. The other input to this AND gate is the ATA lead which, by means of the same considerations previously described for other trunks, is LOW at this time if an idle attendant trunk is now available. Assuming that such a trunk is available, the four inputs of this AND gate are all LOW, thereby turning OFF the gate and driving its output HIGH. The output of this gate extends to one input of the "0" portion of the AT flip-flop on FIG. 34, and therefore the HIGH now on the lead sets the flip-flop to its SET state. The AT flip-flop, in being set, drives the AT lead HIGH and, by virtue of the MAT OR gate, causes the MAT lead to go LOW. The MAT OR gate has input conductors extending both from the output of the AT flip-flop and the ICPT flip-flop which is involved in intercept calls, as subsequently discussed.

The ICPT flip-flop gets set under two conditions: (1) If a vacant code has been dialed into the register, and (2) if the register times out, i.e., the dialing has not been completed within fifteen seconds. In case of a time-out, the counter in the register is in the end-of-scan state and the DT lead is LOW, as well as the ZT. Then, when the register is read out, it causes the ICPT flip-flop to be set since two of the four inputs of the ICPI AND gate have as their inputs the DT and ZT outputs of the register. In the event a vacant code is dialed, there is no signal on the LI or LB gates from the line circuits. In other words, no L transistor in a called line circuit will turn OFF as a consequence of the grounding of its code leads from the output of the register, and thus no LI– or LB– output, as the case may be, will go HIGH on any line circuit. Thus, referring to FIG. 36, neither the LBO nor the LIO will be driven LOW to indicate a busy or idle signal, respectively, and consequently there will be no HIGH output on either the BSY or the IDL lead on FIGS. 35 and 36. The B′ signal is delayed to allow the code lead signals to come to a rest state before sampling to see whether the line is vacant or idle. If the line is vacant, the IDL and BSY leads will both be LOW. This, in turn, causes the ICPT flip-flop to be SET via the LVI gate on FIG. 35. The ILM lead into the LVI and LVB gates goes HIGH whenever the ICT or TSI flip-flops are set. The TSI flip-flop is discussed elsewhere with regard to attendant handled calls. This HIGH signal prevents false line vacant indications if both IDL and BSY should go LOW during the completion of the connection to the called station. The "1" side of the flip-flop also goes to the MAT OR gate which causes the MAT lead to go LOW. The LOW on the MAT lead extends to the attendant's trunk and, in conjunction with a subsequent scanning operation, causes an attendant's trunk to be selected and marked in a manner similar to that described for intercom trunks. The connection to the calling station is completed as was priorly described for outgoing trunks. Also referring to the LVI and ICPB gates, if the attendant trunks are all busy, a signal will be given on the ICPB or the LVB leads extending to the circuit on FIG. 30, causing busy tone to be returned to the station.

The BT flip-flop on this circuit is set under several conditions. First of all, if the attendant trunks are all busy and a line vacant signal, intercept signal, or dial 0 signal is received, then the LVB, ICPB, or ATB leads, respectively, will be HIGH, thereby setting the BT flip-flop to its SET state. Likewise, if the outgoing trunks are all busy and a request is given for an outgoing trunk, the OTB lead goes HIGH, or, in case of intercom trunks, the busy condition causes the ICBSY lead to go HIGH, thereby setting the BT flip-flop. Likewise, if the called station is busy in an intercom call, the BSY lead will go HIGH, thereby setting the BT flip-flop. The setting of this flip-flop causes the MBT lead to go LOW, thereby marking the busy tone trunk if it is idle. The connection to the calling station is completed as was priorly described for the outgoing trunk. If the busy tone trunk is busy at this time, the calling subscriber receives a busy tone by means of the register circuit, as described in connection therewith. If the busy tone trunk is busy, the BBT lead goes HIGH; and when the MBT lead goes LOW, the BBYB AND gate is enabled, thereby causing the BBY lead to go LOW. This causes the register which is being read out at this time to return busy tone to the originating station.

*Attendant originated calls*

Incoming calls to the PBX from central office trunks are handled by the PBX attendant. If the party on a calling central office trunk desires to be connected with a PBX station, the attendant takes the action necessary to connect the trunk to the PBX station as described in the following paragraphs.

A locking key and a lamp are associated with each incoming central office trunk at an attendant position. When a call appears on an incoming trunk, the lamp associated with the incoming trunk flashes. The attendant connects herself to the trunk by operating the associated key. She can then talk to the party on the trunk. If the party on the trunk desires to be connected to a PBX station, the attendant operates a START key. This is a request for a line side register, and causes the mode control to go into the trunk dial tone mode. The common control then selects and marks an idle register on the line side of the switching network and marks the trunk on the trunk side of the switching network. The network control then completes the connection between the trunk and the line side register. Operation of the START key also "splits" the trunk, placing the central office end on hold and connecting the attendant console to the PBX end. The attendant hears dial tone and can now dial the two-digit number associated with the called station. After the trunk is connected to the line side register, the mode control returns to idle. After the register receives the two digits it requests read out, as with the trunk side register, and the mode control goes into the read register mode. The register information is gated out and the state of the called line is determined. If the called line is idle, it is marked, the register calls back the trunk, causing the trunk to be marked and release the trunk cutthrough relay, and the network control connects the called line to the trunk. The trunk supplies ringing to the called station and ringback to the attendant.

The attendant may wait for the party to answer and then press a RELEASE key, which removes the hold and reconnects the PBX and CO ends of the trunk. The attendant may release before the called party answers, in which case the trunk party hears ringback. If the station is busy, a vacant code was dialed, or a "0" or "9" was dialed, busy tone is returned to the trunk from the register.

*Trunk dial tone mode*

The trunk dial tone mode is the mode which allows the line side registers to be connected to incoming trunks so that the attendant can complete the call into the PBX from an incoming trunk. The request generated by the attendant pressing a start key puts a HIGH into the TOA gate on FIG. 23, causing the TO′ lead to go LOW into the TDTC gate. The other two inputs, which are RA and PG′, are already LOW, causing the output of the TDTC gate to go HIGH and setting the TDTA flip-flop, which consists of the TDTO and TDT1 gates. Therefore, the TDT lead is HIGH and the TDT′ lead is LOW. The TDT′ lead going LOW into the MLR1 gate on FIG. 26 causes MLR to go HIGH and, through the MLRO lead, the MLR′ lead to go LOW. This causes a line side register appearance to be marked. The attendant then gets connected to the register, receives dial tone, and dials into the register. After the two digits have been received, the register puts out a readout request as in the trunk side register circuit. When the register is read out, say on register 1, the LSR1 lead would not go HIGH; therefore, the LSR flip-flop on FIG. 31 would not be set. This indicates to common control that a line side register is now being read out, and common control responds accordingly. If the line whose number is on the code lead is idle, there will be a LOW on the LIO lead going into FIG. 36. This will cause a LOW on the IDL′ lead on FIG. 36 into the TSI gate on FIG. 37. Since the LSR′ lead is LOW, the TSIO flip-flop will be set, causing the ILM lead to go HIGH.

It is now necessary to call back the trunk to which the register is connected. This signal is generated by the LOW on the LSR′ lead into the CBT1 gate on FIG. 32. The TO′ lead is LOW at this time, and the output of the CBA gate is LOW. Because the TSI1 flip-flop is set, this causes the CBT lead to go HIGH, which inhibits a call-back trunk operation by the input to the CB gate. This causes the CB lead to go LOW, as in the call-back from a trunk side register. When the trunk is called back, the cut-through relay in the trunk will be released, releasing the register from the trunk and automatically marking the trunk. As a mark is now on the trunk and the called line is marked, the network control completes the path between the trunk and the called line. After the network is complete, the PG lead will go to ground, causing the output of the ECRB gate on FIG. 37 to go LOW. Because the equipment is now in the call-back trunk mode, the CBT lead into the CBLT gate will be HIGH, enabling one input to the ECRA gate. The other input is LOW because this is the output of the ECRB gate. Therefore, a HIGH is present on the ECR lead, resetting the common control from this mode.

Figure 30:
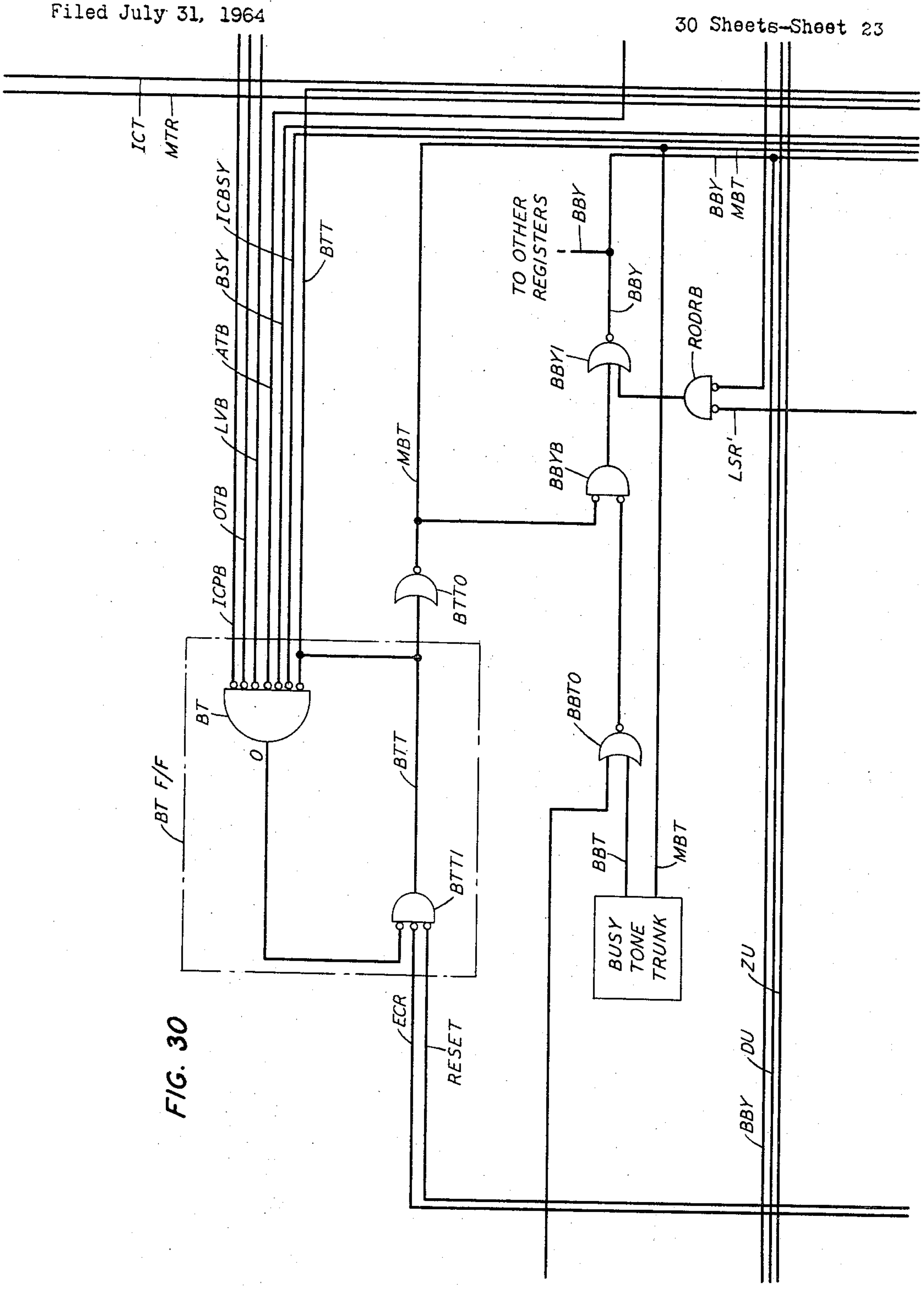

In case a busy station has been dialed, the HIGH on the BSY lead into the BT gate on FIG. 30 would have set the busy tone flip-flop. This would cause the MBT lead to go LOW into the BBY B gate. On the line side register, at this stage of the call, the LSR lead into the BBTO gate will be HIGH, causing the output of the BBTO gate to be LOW. This causes the output of the BBY B gate to be HIGH and the BBY gate to be LOW. Therefore, busy tone is returned from the register. In case the attendant had dialed a "9" or a "0," or a vacant code, there will be a HIGH on one of the leads into the RODR A gate on FIG. 30. This is a reorder condition and causes the output of the RODR A gate to go LOW, enabling the RODR B gate. On the line side register, at this stage of the call, the LSR lead is LOW, causing the output of the RODR B gate to be HIGH, making the BBY gate LOW. Previously, it has been stated that the LSR lead into the RODR B gate was LOW. Actually, this should have been the LSR′ lead. Therefore, in this case the BBY lead goes LOW, causing the register to be reconnected to the trunk returning busy tone.

*Reset circuit*

The gates on FIG. 37, in particular, gates RESA, RESB, RESC, RESD, and RESET, function to provide a RESET signal to the common control in the event the common control is held in a particular state (mode) beyond a predetermined time. This condition is detected by extending an output from the state determining flip-flops of the system to the inputs of either gates RESC or RESD on FIG. 37. Thus, the output of flip-flop OT on FIG. 34 is connected by means of conductor OT to the upper input of gate RESC on FIG. 37. The output of flip-flop ICPT on FIG. 34 is connected by conductor ICPT to the next input of gate RESC. The output of flip-flop AT on FIG. 34 is connected by conductor ATT to the middle input of gate RESC. The output of flip-flop ICT on FIG. 36 is connected by conductor ICT to the next input of gate RESC.

The output of flip-flop BT on FIG. 30 is connected by conductor BTT to the lower input of gate RESC. The output of flip-flop ICO on FIG. 36 is connected by conductor ICO to the upper input of gate RESD. The output of flip-flop A on FIG. 31 is connected by conductor A to the next input of gate RESD. The output of flip-flop RR on FIG. 27 is connected by conductor RR to the next input of gate RESD. The output of flip-flop LTD on FIG. 27 is connected by conductor LTD to the lower input of gate RESD. When any of the preceding flip-flops is in a SET state, its output conductor extending to the input of either gate RESC or RESD is HIGH. This causes the gate to conduct and its output to go LOW. This LOW causes gate RESB to turn OFF and its output to go HIGH. The resistor-capacitor diode combination following the RESB gate is a delay circuit for the propagation of the HIGH on the output of RESB to the input of RESA. If the HIGH on the output of RESB remains for longer than, say, half a second, the output of the RESA gate is LOW, causing the output of the RESET gate to go HIGH, thereby generating a reset pulse which will reset all flip-flops in the common control. The contact labeled PBR will also generate a reset pulse by the operation of this contact, grounding the cathode end of the diode connected to the output of RESA. Therefore, the over-all operation of this portion of the circuit is to generate a reset pulse which will return all flip-flops into common control to normal, if it should take longer than half a second to complete any portion of the call. The PBR contact is operated by operating a push-button switch.

While the equipments of this invention have been described with reference to a particular embodiment of a telephone line circuit, it is to be understood that such an embodiment is intended to be illustrative of the present invention and that numerous other arrangements may be devised by those skilled in the art without departing from the spirit and scope of the invention.

What is claimed is:

1. In a switching system, a line circuit, a bistable element in said line circuit, means for normally maintaining said bistable element in a first state during an on-hook condition of said line circuit, means for switching said bistable element to a second state upon an off-hook condition of said line circuit to signify a call service request thereby, means for subsequently returning said bistable element to said first state, and line identification means subsequently operative for switching said bistable element back to said second state to effect an identification of said calling line circuit.

2. The invention recited in claim 1, wherein said first state comprises an ON condition of said bistable element and wherein said second state comprises an OFF condition thereof.

3. The invention recited in claim 2 in combination with a called line circuit, and means operative subsequent to said identification for completing a connection between said calling line circuit and said called line circuit.

4. The invention recited in claim 2 in combination with a pluralty of other line circuits each having a bistable circuit normally in an ON condition, means effective upon the subsequent dialing of called station digits by a subscriber served by said calling line circuit for selecting a called one of said line circuits under control of the dialed digits, means responsive to said selection for turning OFF the bistable circuit in said called line circuit, and means responsive to said turn-off for completing an interconnection between said calling line circuit and said called line circuit.

5. The invention recited in claim 2 in combination with a plurality of other line circuits each having a bistable circuit therein, means for normally maintaining said bistable circuit in said other line circuits in an ON condition during the on-hook condition of said circuits, a register, means responsive to the identification of said calling line circuit for connecting said register thereto, means responsive to said connection for turning ON said bistable circuit in said calling line circuit, said register being subsequently effective to store called station digits dialed by the party served by said calling line circuit, means responsive to the storage of said digits in said register for selecting a called one of said other line circuits, means for turning said bistable circuit OFF in said called line circuit in response to the selection thereof, and means responsive thereto for interconnecting said calling and called line circuits.

6. The invention recited in claim 2 in combination with a plurality of other line circuits each having a bistable circuit therein, means for normally maintaining said bistable circuit in said other line circuits in an ON condition during the on-hook condition of said circuits, a register, means responsive to the identification of said calling line circuit for connecting said register thereto, means responsive to said connection for turning ON said bistable circuit in said calling line circuit, said register being subsequently effective to store called station digits dialed by the party served by said calling line circuit, means responsive to the storage of said digits in said register for selecting a called one of said other line circuits, means for turning said bistable circuit OFF in said called line circuit in response to the selection thereof, a two-ended trunk, means responsive to said last-named turn-off for connecting said called line circuit to one end of said trunk, and means operative under control of said register upon the selection of said called line circuit for connecting said calling line circuit to the other end of said trunk, thereby completing a connection between said calling and called line circuits.

7. The invention recited in claim 2 in combination with a plurality of other line circuits each having a bistable circuit therein, means for normally maintaining said bistable circuit in said other line circuits in an ON condition during the on-hook condition of said circuits, a register, a two-ended trunk, a switching network having said line circuits connected to one side thereof and said register and both ends of said trunk connected to the other side thereof, means responsive to the identification of said calling line circuit for marking the appearance on said switching network of said calling line circuit and said register, said switching network being effective to interconnect said calling line circuit and said register in response to the application of said marks, means responsive to said connection for turning ON said bistable circuit in said calling line circuit, said register being subsequently effective to store called station digits dialed by the party served by said calling line circuit, means responsive to the storage of said digits in said register for selecting a called one of said other line circuits, means for turning said bistable circuit OFF in said called line circuit in response to the selection thereof, means responsive to said last-named turn-off for applying a marking potential to the appearance on said switching network of said called line circuit and one end of said trunk, said switching network being effective upon the application of said marking potentials to interconnect said called line circuit and said one end of said trunk, means subsequently effective for applying a marking potential to the appearance on said switching network of said calling line circuit and the other end of said trunk, said switching network being operable upon the application of said marking potentials thereto interconnect said calling line circuit with the other end of said trunk and thereby complete a connection between said calling and called circuits.

8. The invention recited in claim 1 in combination with means for subsequently switching said bistable element back to a first state, means subsequently operable for switching said bistable element back to said second state to effect a request for a second identification of said line circuit, means subsequently operable for switching said bistable element back to said first state, and means subsequently operable for switching said bistable element back to said second state to effect the second identification of said line circuit.

9. The invention recited in claim 8 in combination with a called line circuit having a bistable element therein, means for normally maintaining said bistable element in said called line circuit in a first state during an off-hook condition of said called line circuit, means for switching said bistable element of said called line circuit to a second state preparatory to completing an interconnection between said first-mentioned line circuit and said called line circuit, and means subsequently operative for interconnecting said first-mentioned and said called line circuit.

10. In a telephone switching system, a plurality of line circuits each of which has a transistor, a control circuit, means for normally maintaining in an ON condition the transistor of each line circuit in an on-hook condition, means effective upon the initiation of an off-hook condition at a calling line circuit for turning its transistor OFF to signify a service request signal to said control circuit, means including said control circuit effective upon the receipt of said service request signal for restoring said transistor of said calling line circuit to an ON condition, means including said control circuit subsequently operative for turning OFF the transistor in said calling line circuit to effect an identification of said line circuit, means including said control circuit subsequently operative for turning ON the transistor in said calling line circuit, and means subsequently operative in response to the dialing of called station digits from the subset served by said calling line circuit for selecting one of said line circuits as the called line circuit.

11. The invention recited in claim 10 in combination with means responsive to said selection for turning OFF the transistor in the selected called line circuit, means responsive to the turn-off of the transistor in said called line circuit for preparing a path to interconnect said calling and called line circuits, means for turning OFF the transistor in said calling line circuit to effect a second identification of said calling line circuit, and means responsive to said second identification of said calling line circuit for completing an interconnection between said calling and called line circuits.

12. The invention recited in claim 10 in combination with means responsive to said selection for turning OFF the transistor in the selected called line circuit, a trunk, means responsive to the turn-off of the transistor in said called line circuit for interconnecting said called line circuit with said trunk, means for turning OFF the transistor in said calling line circuit to effect a second identification of said calling line circuit, and means responsive to said second identification of said calling line circuit for interconnecting said calling line circuit with said trunk, thereby completing an interconnection between said calling and called line circuits.

13. The invention recited in claim 10 in combination with means responsive to said selection for turning OFF the transistor in the selected called line circuit, a switching network having said line circuits connected thereto, means responsive to the turn-off of the transistor in said called line circuit for applying a marking potential to the appearance on said switching network of said called line circuit, means for turning OFF the transistor in said calling line circuit to effect a second identification of said calling line circuit, and means responsive to said second identification of said calling line circuit for applying a marking potential to the appearance on said switching network of said calling line circuit, said switching network being effective in response to the application of said marking potentials thereto for completing an interconnection between said calling and called line circuits.

14. In a telephone switching system, a plurality of line circuits, a transistor in each of said line circuits, means for normally maintaining in an ON condition the transistor in each line circuit in an on-hook condition, means responsive to an off-hook condition of a calling line circuit for turning its transistor OFF, a common control circuit including a line circuit scanner, means responsive to the turn-off of the transistor in said calling line circuit for transmitting a service request signal from said calling line circuit to said common control circuit, means in said common control circuit responsive to the reception of said service request signal for turning ON the transistor in said calling line circuit, means effective upon the turn-on of said transistor in said calling line circuit for transmitting a turn-on signal to said common control circuit, means in said common control circuit responsive to the reception of said turn-on signal for actuating said scanner to initiate a line scanning operation, means effective as said scanner scans said calling line circuit for turning OFF the transistor therein, means responsive to said turn-off of said calling line circuit transistor for transmitting a signal to said common control circuit to stop said scanner, and further means responsive to said turn-off of said calling line circuit transistor for identifying said line circuit.

15. The invention recited in claim 14 in combination with a register, means operative under control of said common control circuit and responsive to said identification for interconnecting said calling line circuit with said register, means effective upon said interconnection for turning ON the transistor in said calling line circuit, and means in said register operative for registering called station digits dialed by a subscriber served by said calling line circuit.

16. The invention recited in claim 15 in combination with means responsive to the storage of said digits in said register for transmitting an indication of said digits to said common control circuit, means responsive to the reception of said digital indication by said common control circuit for turning OFF the transistor in the called line circuit signified by said digits, means in said common control circuit responsive to said digit registration for initiating a second scanning operation of said calling line circuit, means effective when the scanner scans said calling line circuit for turning OFF the transistor therein, means for releasing said register from said calling line circuit, and means operative under control of said common control circuit for interconnecting said calling and called line circuits.

17. The invention recited in claim 15 in combination with means responsive to the storage of said digits in said register for transmitting an indication of said digits to said common control circuit, means responsive to the reception of said digital indication by said common control circuit for turning OFF the transistor in the called line circuit signified by said digits, a trunk circuit, means responsive to said last-named turn-off for connecting said trunk circuit to said called line circuit, means in said common control circuit responsive to said digit registration for initiating a second scanning operation of said calling line circuit, means effective when said calling line circuit is scanned for turning OFF the transistor therein, means for releasing said register from said calling line circuit, and means effective upon the release of said register and operative under control of said common control circuit for interconnecting said calling line circuit with said trunk, thereby completing an interconnection between said calling and called line circuits.

18. The invention recited in claim 14 in combination with a register, a trunk circuit, a switching network having said line circuits connected to one side thereof and said register and said trunk connected to the other side thereof, means responsive to said identification for applying a marking potential to the appearances on said switching network of said calling line circuit and said register, said switching network being effective in response to the application of said marking potentials thereto for completing an interconnection between said calling line circuit and said register, means effective upon said interconnection for turning ON the transistor in said calling line circuit, means in said register operative for registering called station digits dialed by a subscriber served by said calling line circuit, means responsive to the storage of said digits in said register for transmitting an indication of said digts to said common control circuit, means responsive to the reception of said digital indication by said common control circuit for turning OFF the transistor in the called line circuit signified by said digits, means responsive to the turn-off of the transistor in said called line circuit for applying a marking potential to the appearance on said switching network of said called line circuit and said trunk, said switching network being effective in response to the application of said marking potentials thereto for completing an interconnection between said called line circuit and said trunk, means in said common control circuit responsive to said digit registration for initiating a second scanning operation of said calling line circuit, means effective when said calling line circuit is scanned for turning OFF the transistor therein to effect a second identification thereof, means for releasing said register from said calling control circuit, and means effective upon said second identification for applying marking potentials to the appearances on said switching network of said calling line circuit and said trunk, said switching network being effective in response to the application of said marking potentials thereto for completing an interconnection between said calling and called line circuits over said trunk.

19. In a telephone switching system, a plurality of line circuits each of which has a transistor, means for normally maintaining in an ON condition the transistor in each line circuit when in an on-hook condition, a control circuit, means responsive to an off-hook condition of a calling line circuit for turning its transistor OFF to signify a service request to said control circuit, means in said common control circuit responsive to the reception of said service request signal for turning ON the transistor in said calling line circuit, means in said common control circuit responsive to said turn-on for initiating a line scanning operation, and means effective as said calling line circuit is scanned for turning OFF the transistor therein to effect an identification of said calling line circuit.

20. The invention recited in claim 19 in combination with a register, means responsive to said identification for interconnecting said calling line circuit with said register, means effective upon said interconnection for turning ON the transistor in said calling line circuit, means in said register operative for registering called station digits dialed by a subscriber served by said calling line circuit, means responsive to said registration for turning OFF the transistor in a called line circuit signified by said digits, means responsive to said registration for initiating a second scanning operation of said calling line circuit, means effective when said calling line circuit is scanned for turning OFF the transistor therein, means for releasing said register from said calling line circuit, and means effective upon the release of said register and operative under control of said common control circuit for interconnecting said calling and called line circuits.

21. In a telephone switching system, a plurality of line circuits; a transistor in each of said line circuits, a common control circuit, bias control conductors interconnecting each of said line circuits with said common control circuit, means including said bias control conductors and said common control circuit for normally maintaining in an ON condition the transistor in each line circuit in an on-hook condition, off-hook detection circuitry responsive to an off-hook condition of a calling one of said line circuits for turning its transistor OFF, a line circuit scanner in said common control circuit, means effective upon the turn-off of a transistor in a calling line circuit for transmitting a service request signal from said calling line circuit to said common control circuit, code leads interconnecting said line circuits and said scanner with each line circuit having a unique combination of code leads individual thereto, means including said scanner and said common control circuit responsive to the reception of said service request signal for combinationally applying potentials to said code leads to turn ON the transistor in said calling line circuit, means effective upon the turn-on of said transistor in said calling line circuit for transmitting a turn-on signal to said common control circuit, means in said common control circuit responsive to the reception of said turn-on signal for actuating said scanner to initiate a sequential scanning of said line circuits, means effective as said scanner scans said calling line circuit for applying potential to the combination of code leads unique to said calling line circuit to turn OFF the transistor therein, means effective upon the turn-off of said transistor in said calling line circuit for transmitting a signal to said common control circuit to stop said scanner, and further means effective upon the turn-off of said calling line circuit transistor for effecting the identification of said calling line circuit.

22. The invention recited in claim 21 in combination with a plurality of registers, means including said common control circuit effective upon the identification of said calling line circuit for selecting one of said registers, a switching network having said line circuits connected to one side thereof and registers connected to the other side thereof, means responsive to the identification of said calling line circuit and the selection of said register for applying marking potentials to the network appearances of said calling line circuit and said selected register, said network being effective upon the application of said marking potentials thereto for interconnecting said calling line circuit and said selected register, means responsive to the interconnection of said calling line circuit and said selected register for restoring to an ON condition the transistor in said calling line circuit, and means in said selected register for storing called station digits dialed by a party served by said calling line circuit.

23. The invention recited in claim 22 in combination with, means responsive to the storing of said called station digits in said register for transmitting an indication of said digits to said control circuit, means in said control circuits for selectively applying potentials to said code leads under control of said digital indication, means responsive to the application of said last named potential to said code leads for turning OFF the transistor in the called line circuit represented by said digital indication, and means responsive to the turn-off of said transistor in said called line circuit for signifying the identity of said called line circuit.

24. The invention recited in claim 23 in combination with, trunk circuits each having at least two ends, each of said trunk circuits being connected to said other side of said switching network, means responsive to the identification of said called line circuit for selecting one of said trunks, means responsive to the identification of said called line circuit and to the selection of said trunk for applying marking potentials to the network appearances of said called line circuit and one end of said selected trunk, said switching network being effective in response to said marking potentials for interconnecting said called line circuit with said one end of said trunk, means responsive to the interconnection of said called line circuit and said selected trunk for applying a signal from said register via said switching network to said calling line circuit to turn OFF the transistor therein, means including said control circuit subsequently operative for turning back ON the transistor in said calling line circuit and for disconnecting said calling line circuit from said register, means effective upon the disconnection of said register from said calling line circuit for initiating a second operation of said scanner thereby causing it to sequentially scan said line circuits, means effective as said scanner scans said calling line circuit for applying potential to the combination of code leads unique to said calling line circuit to turn OFF the transistor therein, means effective upon the turn-off of said transistor in said calling line circuit for effecting a second identification of said calling line circuit, and means responsive to said second identification of said line circuit for applying marking potentials to the network appearance of said calling line circuit and the other end of said selected trunk, said switching network being responsive to the application thereto of said marking potentials for interconnecting said calling line circuit with the other end of said selected trunk, thereby completing an interconnection between said calling and called line circuits.

25. In a switching system having line circuits, a common control circuit, and a switching network for establishing call connections between calling and called line circuits under control of said common control circuit with each connection requiring a plurality of different types of usages of said common control circuit, said common control circuit comprising; means for receiving different types of call service requests, and means for serving said different types of requests in a predetermined order of preference whereby a plurality of simultaneously received requests are served sequentially, type by type, in accordance with said ordered preference.

26. In a switching system for completing connections between calling and called stations under control of a common control circuit with each connection requiring a plurality of different types of usages of said common control circuit and with each type of usage being initiated by a service request signal individual thereto, said common control circuit comprising; a plurality of input circuits each of which is individual to a different type of call service that may be provided by said common control circuit, means for providing a highest order of preference for call service request signals received by a first one of said input circuits whereby said common control circuit always serves the requests received by said first input circuit in the event of simultaneous receipt of call signals by a plurality of said input circuits, means for providing an intermediate order of preference for call service request signals received by another one of said input circuits whereby call requests received thereby are served only during the absence of call signals on said first input circuit, and means for providing a lowest order of preference for call service request signals received by a last one of said input circuits whereby call requests received thereby are served only during the absence of call signals on said other input circuits.

27. In a switching system, a plurality of line circuits, a control circuit including a scanner, means effective upon the off-hook condition of a calling one of said line circuits for actuating said scanner to initiate a line scanning operation, a register, means effective upon the scanning of said calling line circuit for interconnecting said calling line circuit with said register, said register being effective to store called station digits dialed by the calling party served by said calling line circuit, means effective upon the storage of said digits in said register for initiating a second operation of said scanner, means effective as said calling line circuit is again scanned for signifying the identity of said calling line circuit, and means responsive to the identification of said calling line circuit for interconnecting it with the called one of said line circuits represented by the digits stored in said register.

28. In an electronic telephone system, a subscriber line, a line circuit connected to said subscriber line and including electronic switching means, control means including scanner means, first means for determining the state of said switching means responsive to the condition of said subscriber line, second means for determining the state of said switching means responsive to said scanner means, and third means responsive to said control means and independent of said scanner means for determining the state of said switching means.

29. In an electronic switching system, a line circuit including a transistor, first means for altering the conductive state of said transistor to indicate a service request by said line circuit, second means responsive to said service request for altering the conductive state of said transistor to identify said line circuit having said service request, and third means responsive to said identification for altering the conductive state of said transistor for completing a connection to said line circuit having had said service request.

30. In a private branch exchange comprising a switching network; a plurality of subscriber lines; a plurality of registers terminating at said switching network; a control unit connected to said registers and said switching network; a plurality of line circuits each connecting one of said lines to said control unit and to said switching network; said control unit including scanning means both for scanning said line circuits to identify a calling line circuit having gone off-hook to originate a service request and to identify a calling line circuit being called back by a register after the completion of a dialing operation, said control unit further including means for preventing the origination of service requests whenever said scanning means is scanning said line circuits to identify the line circuit of a party having completed a dialing operation.

31. A private branch exchange in accordance with claim 30 wherein each of said line circuits includes a transistor element, and means responsive to both the origination of an off-hook condition of its associated line and the reception of a call-back potential from an originating register through said switching network for enabling said transistor element to be responsive to said scanning means to alter its conductive condition.

32. In a telephone switching system, a plurality of line circuits each of which has a transistor, means for normally maintaining in an ON condition the transistor in each line circuit when in an on-hook condition, a control circuit, means responsive to an off-hook condition of a calling line circuit for turning its transistor OFF to signify a service request to said control circuit, means in said common control circuit responsive to the reception of said service request signal for turning ON the transistor in said calling line circuit, means in said common control circuit responsive to said turn-on for initiating a line scanning operation to identify said calling line circuit, a register, means responsive to said identification for interconnecting said calling line circuit with said register, means in said register operative for registering called station digits dialed by the subscriber served by said calling line circuit, means responsive to said registration for turning OFF the transistor in the called line circuit signified by said registered digits, means responsive to said registration for initiating a second scanning operation of said line circuits to identify said calling line, means effective when said calling line circuit is scanned for turning OFF the transistor therein, means for preventing the turn-off of a transistor in any other calling line circuit during said second line scanning operation, and means operative under control of said common control circuit for interconnecting said calling and called line circuits.

33. In a switching system, a plurality of subscriber line circuits, a plurality of registers, a control unit, said control unit including scanning means both for scanning said line circuits to identify a calling line circuit having gone off-hook to originate a service request and to identify a calling line circuit being called back by a register after the completion of a dialing operation, said control unit further including means for preventing the origination of service requests whenever said scanning means is scanning said line circuits to identify the line circuit of a party having completed a dialing operation.

34. A private branch exchange in accordance with claim 30 wherein each of said line circuits includes a transistor element, and means responsive to both the origination of an off-hook condition of its associated line and the reception of a call-back potential from an originating register for enabling said transistor element to be responsive to said scanning means.

35. In a telephone switching system, a plurality of line circuits each having a transistor, means for normally maintaining in an ON condition the transistor in each line circuit in an on-hook condition, means responsive to an off-hook condition of a calling line circuit for turning its transistor OFF, a common control circuit including a line circuit scanner, means subsequently operative for turning ON the transistor in said calling line circuit, means effective upon the turn-on of said transistor in said calling line circuit for actuating said scanner to initiate a line scanning operation, means effective as said scanner scans said calling line circuit for turning OFF the transistor therein, and means responsive to said turn-off of said calling line circuit transistor for identifying said calling line circuit.

No references cited.

WILLIAM C. COOPER, *Primary Examiner.*